United States Patent
Yamada et al.

(10) Patent No.: US 7,838,611 B2
(45) Date of Patent: Nov. 23, 2010

(54) ETHYLENE POLYMER, CATALYST FOR ETHYLENE POLYMER PRODUCTION, AND METHOD FOR PRODUCING ETHYLENE POLYMER

(75) Inventors: Satoru Yamada, Mie (JP); Kei Inatomi, Yokkaichi (JP); Yasutake Wakabayashi, Shunan (JP); Shigehiko Abe, Yokkaichi (JP); Morihiko Sato, Yokkaichi (JP); Masao Tanabiki, Yokkaichi (JP); Satoshi Hamura, Yokkaichi (JP); Ryuji Ikeda, Yokkaichi (JP)

(73) Assignee: Tosoh Corporation, Shunan-Shi (JP)

( * ) Notice: Subject to any disclaimer, the term of this patent is extended or adjusted under 35 U.S.C. 154(b) by 48 days.

(21) Appl. No.: 12/158,216

(22) PCT Filed: Dec. 19, 2006

(86) PCT No.: PCT/JP2006/325306

§ 371 (c)(1),
(2), (4) Date: Jun. 19, 2008

(87) PCT Pub. No.: WO2007/077732

PCT Pub. Date: Jul. 12, 2007

(65) Prior Publication Data

US 2009/0137755 A1 May 28, 2009

(30) Foreign Application Priority Data

Dec. 19, 2005 (JP) .............................. 2005-365428
Dec. 19, 2005 (JP) .............................. 2005-365430

(51) Int. Cl.
C08F 210/16 (2006.01)
C08F 210/02 (2006.01)
C08F 110/00 (2006.01)

(52) U.S. Cl. ..................... 526/348; 526/352; 526/348.2; 526/348.6; 526/352.2

(58) Field of Classification Search ................ 528/396; 526/348, 352, 161, 170, 113, 118
See application file for complete search history.

(56) References Cited

U.S. PATENT DOCUMENTS

| 5,272,236 | A | 12/1993 | Lai et al. | |
| 2004/0214953 | A1* | 10/2004 | Yamada et al. | 525/240 |
| 2006/0024519 | A1* | 2/2006 | Yamaguchi | 428/500 |
| 2006/0069173 | A1* | 3/2006 | Abe | 521/142 |

FOREIGN PATENT DOCUMENTS

| JP | 7-157508 | A | 6/1995 |
| JP | 7-224106 | A | 8/1995 |
| JP | 2002-530413 | A | 9/2002 |
| JP | 2004-521161 | A | 7/2004 |
| JP | 2004-292772 | A | 10/2004 |
| JP | 2004-536184 | A | 12/2004 |
| JP | 2006-131712 | * | 5/2006 |
| JP | 2006-297834 | * | 11/2006 |
| WO | 2004/104055 | A1 | 12/2004 |
| WO | 2005/070977 | A1 | 8/2005 |

OTHER PUBLICATIONS

JP 2006-131712 (Furuta; May 2006) abstract and translation in English.*
JP 2006-297834 (Watanabe; Nov. 2006) abstract and translation in English.*
Chinese Office Action dated Feb. 26, 2010 in Chinese Application No. 200680047876.5.

* cited by examiner

Primary Examiner—Rip A. Lee
(74) Attorney, Agent, or Firm—Sughrue Mion, PLLC

(57) ABSTRACT

An object of the present invention relates to provide an ethylene polymer having excellent mechanical strength and excellent molding processability in a wide molding processing temperature range. The invention relates to use an ethylene polymer comprising a repeating unit derived from ethylene, or a repeating unit derived from ethylene and a repeating unit derived from a $C_{3-8}$ α-olefin, the ethylene polymer being satisfied with the following (A) to (F). (A) Density (d (kg/m³)) is from 910 to 970, (B) MFR (g/10 min)) is from 0.01 to 50, (C) terminal vinyl number is 0.2 or less per 1,000 carbon atoms, (D) melt strength ($MS_{160}$ (mN)) measured at 160° C. and MFR are satisfied with $MS_{160}>90-130\times\log(MFR)$, (E) melt strength ($MS_{190}$ (mN)) measured at 190° C. and $MS_{160}$ are satisfied with $MS_{160}/MS_{190}<1.8$, and (F) fluidized activation energy ($E_a$ (kJ/mol)) and d are satisfied with $127-0.107d<E_a<88-0.060d$.

3 Claims, No Drawings

ETHYLENE POLYMER, CATALYST FOR ETHYLENE POLYMER PRODUCTION, AND METHOD FOR PRODUCING ETHYLENE POLYMER

TECHNICAL FIELD

The present invention relates to an ethylene polymer having high melt strength, a catalyst for ethylene polymer production, and a method for producing an ethylene polymer. More particularly, it relates to an ethylene polymer having excellent thermal stability, excellent molding processability in a wide molding processing temperature range and high melt strength, a catalyst for producing an ethylene polymer having excellent mechanical strength and excellent molding processability in a wide molding processing temperature range, and a production method using the same.

BACKGROUND ART

Low density polyethylene (LDPE) produced by a high-pressure radical process is an ethylene polymer having high melt strength (MS). However, fluidized activation energy ($E_a$) is large, and temperature dependency of melt viscosity is large. Therefore, the polymer has high MS in only a specific molding processing temperature range, and it was necessary to select a processor suitable for a polymer to be processed in molding processing.

Furthermore, an ethylene polymer obtained using a Ziegler catalyst or a metallocene catalyst has small $E_a$, but MS is low. Therefore, there was the problem in molding processability.

For example, (a) an ethylene-α-olefin copolymer having long chain branch obtained using a specific metallocene catalyst under specific polymerization conditions (for example, see Patent Document 1), and (b) an ethylene-α-olefin copolymer having $E_a$ of 60 kJ/mol or more obtained using a specific metallocene catalyst (for example, see Patent Document 2) are proposed as an ethylene polymer having improved molding processability. However, those ethylene copolymers have large $E_a$ and large temperature dependency of melt viscosity, similar to LDPE. Therefore, it was necessary to strictly control temperature in molding processing.

An ethylene polymer having low $E_a$ and high MS is preferred to have stable processability in a wide molding processing temperature range. Such a polymer includes an ethylene polymer produced using a Cr-based catalyst. However, in the present inventors' investigations, there was the problem on thermal stability such as yellowing at the time of melt processing due to that terminal vinyl group is present in the ethylene polymer in an amount of 0.3 or more per 1,000 carbon atoms. Thus, an ethylene polymer having small number of unsaturated bonds such as terminal vinyl group and excellent thermal stability, and additionally having low $E_a$ and excellent molding processability in a wide molding processing temperature range has been desired.

Furthermore, the ethylene polymer produced using a Cr-based catalyst has the problem that a molecular weight distribution is wide, and as a result, mechanical strength of a molding is low. A catalyst for producing an ethylene polymer having excellent mechanical strength and excellent molding processability under wide molding processing conditions, and a production method using the same have been desired.

Patent Document 1: U.S. Pat. No. 5,272,236
Patent Document 2: JP-A-2004-292772

DISCLOSURE OF THE INVENTION

Problems that the Invention is to Solve

The present invention has been made to solve the above-described problems in the prior art, and is to provide an ethylene polymer having small terminal vinyl group number and excellent thermal stability, and additionally having low $E_a$ and high MS. The invention further provides a catalyst for producing an ethylene polymer having excellent mechanical strength and excellent molding processability under wide molding processing conditions, and a production method using the same.

Means for Solving the Problems

The present invention has been found as a result of extensive and intensive investigations to the above objects. Specifically, the invention relates to an ethylene polymer comprising a repeating unit derived from ethylene, or a repeating unit derived from ethylene and a repeating unit derived from an α-olefin having from 3 to 8 carbon atoms, the ethylene polymer being satisfied with the following (A) to (F).

(A) Density (d (kg/m$^3$)) is from 910 to 970,
(B) melt flow rate (MFR (g/10 min)) measured at 190° C. under a load of 2.16 kg is from 0.01 to 50,
(C) terminal vinyl number is 0.2 or less per 1,000 carbon atoms,
(D) melt strength ($MS_{160}$ (mN)) measured at 160° C. and MFR are satisfied with the following formula (1):

$$MS_{160} > 90 - 130 \times \log(MFR) \tag{1}$$

(E) melt strength ($MS_{190}$(mN)) measured at 190° C. and $MS_{160}$ are satisfied with the following formula (2):

$$MS_{160}/MS_{190} < 1.8 \tag{2}$$

(F) fluidized activation energy ($E_a$ (kJ/mol)) and d are satisfied with the following formula (3):

$$127 - 0.107d < E_a < 88 - 0.060d \tag{3}$$

Furthermore, the invention relates to a catalyst for ethylene polymer production using a transition metal compound having a specific structure (component (a)) and a transition metal compound having a specific structure (component (b)), as a metallocene compound, and a method for producing an ethylene polymer using the same.

Advantage of the Invention

An ethylene polymer having excellent thermal stability and excellent molding processability in a wide molding processing temperature range is obtained by the present invention. Furthermore, an ethylene polymer having excellent mechanical strength and excellent molding processability in a wide molding processing temperature range can be produced by using the catalyst for ethylene polymer production and the production method of the invention.

BEST MODE FOR CARRYING OUT THE INVENTION

The ethylene polymer of the present invention is an ethylene polymer comprising a repeating unit derived from ethylene, or an ethylene-α-olefin copolymer comprising a repeating unit derived from ethylene and a repeating unit derived from an α-olefin having from 3 to 8 carbon atoms.

The repeating unit derived from ethylene means a unit derived from ethylene as a monomer and contained in an ethylene polymer or an ethylene-α-olefin copolymer. The repeating unit derived from an α-olefin having from 3 to 8 carbon atoms means a unit derived from an α-olefin having from 3 to 8 carbon atoms as a monomer and contained in an ethylene-α-olefin copolymer. Examples of the α-olefin having from 3 to 8 carbon atoms include propylene, 1-butene, 1-hexene, 1-octene, 4-methyl-1-pentene and 3-methyl-1-butene. At least two kinds of those α-olefins having from 3 to 8 carbon atoms may be used together.

The density (A) (d (kg/m$^3$)) of the ethylene polymer of the invention is a value measured by a density gradient tube method according to JIS K6760 (1995), and is from 910 to 970 kg/m$^3$ and preferably from 910 to 940 kg/m$^3$. Where the density is less than 910, fusion temperature of a product becomes low, and only a product having poor heat resistance is obtained. Where the density exceeds 970, a product has excellent heat resistance and rigidity, but impact strength deteriorates.

The terminal vinyl number (C) of the ethylene polymer of the invention was obtained by hot pressing an ethylene polymer using Fourier transform infrared spectrophotometer (FT-IR), ice cooling the same to prepare a film, measuring the film in a range of from 4,000 to 400 cm$^{-1}$, and calculating using the following formula.

Terminal vinyl number per 1,000 carbon atoms(number/1000 C)=$a \times A/L/d$ wherein a is an absorbance index, A is absorbance at 909 cm$^{-1}$ assigned to terminal vinyl, L is thickness of a film, and d is density. a was obtained from a calibration curve prepared using a sample in which the terminal vinyl number per 1,000 carbon atoms had been confirmed by $^1$H-NMR measurement. $^1$H-NMR measurement was carried out at 130° C. in a mixed solvent of deuterated benzene and o-dichlorobenzene using GSX400, a product of JEOL Ltd. The terminal vinyl number per 1,000 carbon atoms was calculated from an integral ratio of a peak assigned to methylene and a peak assigned to terminal vinyl. Each peak was that a peak in which chemical shift is 1.3 ppm is assigned to methylene, and a peak of from 4.8 to 5.0 ppm is assigned to terminal vinyl, using tetramethylsilane as the standard (0 ppm). The terminal vinyl number (C) of the ethylene polymer of the invention is 0.2 or less and preferably 0.1 or less, per 1,000 carbon atoms. Where the terminal vinyl number exceeds 0.2 per 1,000 carbon atoms, the problem of thermal degradation, particularly yellowing, at the time of molding processing is caused.

The melt strength (MS$_{160}$ (mN)) of the ethylene polymer of the invention is a value measured using a die having a length of 8 mm and a diameter of 2.095 mm under the conditions of an inflow angle of 90°, a shear rate of 10.8 s$^{-1}$ and a draw ratio of 47 at a measurement temperature of 160° C. Where the maximum draw ratio is less than 47, the value measured at the maximum draw ratio before break was used as MS$_{160}$. Melt strength obtained by setting the temperature to 190° C. and measuring in the same manner was used as MS$_{190}$ (mN).

The melt flow rate (B) (MFR (g/10 min)) of the ethylene polymer of the invention is a value measured at 190° C. under a load of 2.16 kg, and is from 0.01 to 50. Where MFR is less than 0.01, load of an extruder at the time of molding processing is increased, resulting in decrease of production, which is not preferred. Furthermore, where MFR exceeds 50, melt strength is decreased, and additionally strength of a product is decreased, which are not preferred.

The MS$_{160}$ and MFR (D) of the ethylene polymer of the invention has the relationship satisfying the following formula (1)

$$MS_{160} > 90 - 130 \times \log(MFR) \tag{1}$$

and preferably the following formula (4)

$$MS_{160} > 110 - 130 \times \log(MFR) \tag{4}$$

Where MS$_{160}$ is in a range of (90–130×log(MFR)) or less, the problem is caused in molding processability.

The MS$_{190}$ and MS$_{160}$ (E) of the ethylene polymer of the invention has the relationship satisfying the following formula (2)

$$MS_{160}/MS_{190} < 1.8 \tag{2}$$

and preferably the following formula (5)

$$MS_{160}/MS_{190} < 1.7 \tag{5}$$

Where MS$_{160}$/MS$_{190}$ is in a range of 1.8 or more, melt strength greatly changes depending on temperature. As a result, it is necessary to strictly control molding processing temperature, resulting in narrowing moldable range.

The fluidized activation energy (F) (E$_a$ (kJ/mol)) of the ethylene polymer of the invention is a value obtained by assigning a shift factor obtained by dynamic viscoelasticity measurement at from 160 to 230° C. to Arrhenius equation, and is satisfied with the following formula (3)

$$127 - 0.107d < E_a < 88 - 0.060d \tag{3}$$

and preferably the following formula (6)

$$127 - 0.107d < E_a < 87 - 0.060d \tag{6}$$

Where E$_a$ is in a range of (127–0.107d) or less, the problem is caused in processability. On the other hand, where E$_a$ is in a range of (88–0.060d) or more, temperature dependency of melt viscosity is increased. As a result, it is necessary to strictly control molding processing temperature, resulting in narrowing moldable range.

(Mw/Mn) ratio (G) of a weight average molecular weight (Mw) and a number average molecular weight (Mn) measured by gel permeation chromatography (GPC) of the ethylene polymer of the invention is preferably from 2 to 6, and more preferably from 2 to 5. When Mw/Mn is decreased, mechanical strength of a product is improved.

The ethylene polymer of the invention satisfying the above requirements (A) to (F) and preferably further satisfying the requirement (G) can optionally be prepared by the production conditions themselves of the Examples described hereinafter, or minor variation of condition factors. Specific examples of the condition factor variation are described below. The optional ethylene polymer can be prepared by controlling the requirements regarding catalyst components, such as structure of the component (a) and the component (b) used, amount of the component (b) to the component (a), and kind of a co-catalyst component used, and the polymerization conditions such as polymerization temperature, ethylene partial pressure, amount of a molecular weight regulator such as hydrogen to be co-present, and amount of a comonomer added. Furthermore, it is possible to expand range of physical properties by the combination with multistage polymerization.

More specifically, it is possible to decrease the terminal vinyl number by, for example, lowering the ethylene partial pressure, decreasing the amount of a comonomer added, or changing the structure of the component (a). Furthermore, the melt strength can be increased by, for example, changing the structure of the component (a), increasing the terminal vinyl number, changing the structure of the component (b), lowering the ethylene partial pressure, increasing the long chain branch number, increasing long chain branch length, changing the amount of the component (b) to the component (a), or increasing Mw/Mn. The fluidized activation energy ($E_a$) can be controlled by the structure of the component (a), the terminal vinyl number, the structure of the component (b), the ethylene partial pressure, the long chain branch number, the long chain branch length or the amount of the component (b) to the component (a).

The ethylene polymer of the invention can be produced by a method of polymerizing ethylene or copolymerizing ethylene and an α-olefin having from 3 to 8 carbon atoms, in the presence of a metallocene catalyst which uses, for example, a crosslinking biscyclopentadienyl zirconium complex (component (a)) in which two cyclopentadienyl groups are crosslinked with a crosslinking group comprising a chain of two kinds or more of atoms or crosslinked with a crosslinking group comprising a chain of two or more atoms, and a crosslinking (cyclopentadienyl) (fluorenyl) zirconium complex and/or a crosslinking (indenyl)(fluorenyl)zirconium complex (component (b)), as a metallocene compound.

The ethylene polymer obtained in the invention can be applied to the fields that can conventionally be used. Examples of the field include injection molded products, films, sheets, blow, laminates, foamed products and fibers. The ethylene polymer can be molded by the ordinary molding processing method. Additives such as a stabilizer can use any additives that are used in the art of this field. Furthermore, the ethylene polymer can be used by mixing with other resins generally known, such as high density polyethylene, linear low density polyethylene, low density polyethylene, polypropylene, poly-1-butene, poly-4-methyl-1-pentene, ethylene-vinyl acetate copolymer, ethylene-vinyl alcohol copolymer, polystyrene, maleic anhydride-grafted products of those, or rubbers such as ethylene-propylene rubber, ethylene-butadiene rubber or ethylene-propylenediene rubber. The ethylene polymer can also be used by combining with nucleating agents, inorganic fillers, fibers and the like. Furthermore, it is possible to conduct modification such as graft reacting maleic anhydride or the like, crosslinking and the like, similar to the conventional polyolefin. The ethylene polymer of the invention can contain conventional additives such as heat-resistant stabilizers, weather-proof stabilizers, antistatic agents, anti-fog agents, antiblocking agents, slip agents, lubricants, nucleating agents, inorganic fillers or reinforcing agents such as pigments, carbon black, talc, glass powder or glass fibers; organic fillers or reinforcing agents, flame retardants, and neutron shielding agents.

The transition metal compound (component (a)) used in the catalyst for ethylene polymer production of the invention is a transition metal compound represented by the general formula (7)

[Chem. 1]

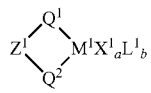

(7)

In the formula (7), $M^1$ represents titanium atom, zirconium atom or hafnium atom, and is preferably titanium atom or zirconium atom. $X^1$ each independently represents hydrogen atom, a halogen atom such as fluorine atom, chlorine atom, bromine atom or iodine atom; a $C_{1-20}$ hydrocarbon group such as methyl group, ethyl group, n-propyl group, isopropyl group, n-butyl group, isobutyl group, sec-butyl group, tert-butyl group, n-pentyl group, isopentyl group, 2-methylbutyl group, neopentyl group, tert-pentyl group, n-hexyl group, isohexyl group, 3-methylpentyl group, 4-methylpentyl group, neohexyl group, 2,3-dimethylbutyl group, 2,2-dimethylbutyl group, 4-methyl-2-pentyl group, 3,3-dimethyl-2-butyl group, 1,1-dimethylbutyl group, 2,3-dimethyl-2-butyl group, cyclohexyl group, vinyl group, propenyl group, phenyl group, methylphenyl group or naphthyl group; a $C_{1-20}$ hydrocarbon-substituted alkoxy group such as methoxy group or ethoxy group; a $C_{1-20}$ hydrocarbon-substituted amido group such as dimethylamino group, diethylamino group or di-n-propylamino group; a $C_{1-20}$ hydrocarbon-substituted silyl group such as trimethylsilyl group, triethylsilyl group, phenyl-dimethylsilyl group or diphenylmethylsilyl group; a $C_{1-20}$ silicon-containing hydrocarbon group such as trimethylsilylmethyl group, triphenylsilylmethyl group or trimethylsilylethyl group; a $C_{1-20}$ hydrocarbon group containing an atom of group 15 in the periodic table, such as dimethylaminoethyl group, dimethylaminopropyl group, dimethylaminophenyl group or diphenylphosphinomethyl group; a $C_{1-20}$ hydrocarbon group containing an atom of group 16 in the periodic table, such as methoxymethyl group, 2-methoxyethyl group or thiomethoxymethyl group; or a $C_{1-20}$ halogen-containing hydrocarbon group such as trifluoromethyl group, pentafluorophenyl group or chloromethyl group. a is an integer of from 0 to 2, and is preferably 2. L each independently represents a coordinate bonding compound such as tetrahydrofuran, diethyl ether, 1,4-dioxane, trimethylamine, triethylamine, trimethylphosphine, triphenylphosphine, acetonitrile, benzonitrile, ethylene, 1-propene, 1-butene, 1-hexene or tert-butylisocyanide. b is an integer of from 0 to 6. $Q^1$ and $Q^2$ each independently represents a ligand represented by the general formula (8), (9) or (10), and $Q^1$ and $Q^2$ form a sandwich structure together with $M^1$.

[Chem. 2]

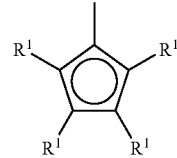

(8)

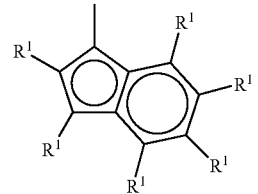

(9)

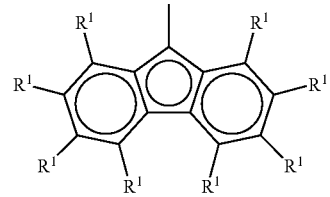

(10)

$R^1$ in the formulae (8) to (10) each independently represents hydrogen atom, a halogen atom such as fluorine atom, chlorine atom, bromine atom or a iodine atom; a $C_{1-20}$ hydrocarbon group such as methyl group, ethyl group, n-propyl group, isopropyl group, n-butyl group, isobutyl group, sec-butyl group, tert-butyl group, n-pentyl group, isopentyl group, 2-methylbutyl group, neopentyl group, tert-pentyl group, n-hexyl group, isohexyl group, 3-methylpentyl group, 4-methylpentyl group, neohexyl group, 2,3-dimethylbutyl group, 2,2-dimethylbutyl group, 4-methyl-2-pentyl group, 3,3-dimethyl-2-butyl group, 1,1-dimethylbutyl group, 2,3-dimethyl-2-butyl group, cyclohexyl group, vinyl group, propenyl group, phenyl group, methylphenyl group or naphthyl group; a $C_{1-20}$ hydrocarbon-substituted alkoxy group such as methoxy group or ethoxy group; a $C_{1-20}$ hydrocarbon-substituted amino group such as dimethylamino group, diethylamino group or di-n-propylamino group; a $C_{1-20}$ hydrocarbon-substituted silyl group such as trimethylsilyl group, triethylsilyl group, phenyl-dimethylsilyl group or diphenyl-methylsilyl group; a $C_{1-20}$ silicon-containing hydrocarbon group such as trimethylsilylmethyl group, triphenylsilylmethyl group or trimethylsilylethyl group; a $C_{1-20}$ hydrocarbon group containing an atom of group 15 in the periodic table, such as dimethylaminoethyl group, dimethylaminopropyl group, dimethylaminophenyl group or diphenylphosphinomethyl group; a $C_{1-20}$ hydrocarbon group containing an atom of group 16 in the periodic table, such as methoxymethyl group, 2-methoxyethyl group or thiomethoxymethyl group; or a $C_{1-20}$ halogen-containing hydrocarbon group such as trifluoromethyl group, pentafluorophenyl group or chloromethyl group. At least two $R^1$ may be linked to form a ring.

$Z^1$ in the formula (1) is represented by the general formula (11), (12), (13), (14) or (15), and acts so as to crosslink $Q^1$ and $Q^2$.

[Chem. 3]

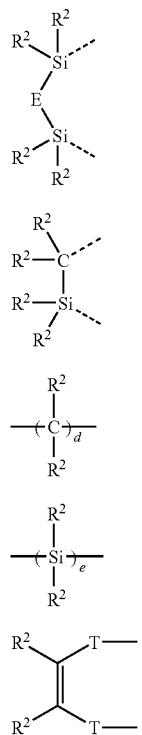

In the formulae (11) to (15), $R^2$ each independently represents hydrogen atom, a halogen atom such as fluorine atom, chlorine atom, bromine atom or iodine atom; a $C_{1-20}$ hydrocarbon group such as methyl group, ethyl group, n-propyl group, isopropyl group, n-butyl group, isobutyl group, sec-butyl group, tert-butyl group, n-pentyl group, isopentyl group, 2-methylbutyl group, neopentyl group, tert-pentyl group, n-hexyl group, isohexyl group, 3-methylpentyl group, 4-methylpentyl group, neohexyl group, 2,3-dimethylbutyl group, 2,2-dimethylbutyl group, 4-methyl-2-pentyl group, 3,3-dimethyl-2-butyl group, 1,1-dimethylbutyl group, 2,3-dimethyl-2-butyl group, cyclohexyl group, vinyl group, propenyl group, phenyl group, methylphenyl group or naphthyl group; a $C_{1-20}$ hydrocarbon-substituted alkoxy group such as methoxy group or ethoxy group; a $C_{1-20}$ hydrocarbon-substituted amino group such as dimethylamino group, diethylamino group or di-n-propylamino group; a $C_{1-20}$ hydrocarbon-substituted silyl group such as trimethylsilyl group, triethylsilyl group, phenyldimethylsilyl group or diphenylmethylsilyl group; a $C_{1-20}$ silicon-containing hydrocarbon group such as trimethylsilylmethyl group, triphenylsilylmethyl group or trimethylsilylethyl group; a $C_{1-20}$ hydrocarbon group containing an atom of group 15 in the periodic table, such as dimethylaminoethyl group, dimethylaminopropyl group, dimethylaminophenyl group or diphenylphosphinomethyl group; a $C_{1-20}$ hydrocarbon group containing an atom of group 16 in the periodic table, such as methoxymethyl group, 2-methoxyethyl group or thiomethoxymethyl group; or a $C_{1-20}$ halogen-containing hydrocarbon group such as trifluoromethyl group, pentafluorophenyl group or chloromethyl group. E represents an atom of group 16 in the periodic table, such as oxygen, sulfur, selenium or tellurium, and is preferably oxygen or sulfur. T represents a $C_{1-5}$ hydrocarbon crosslinking group such as methylene group, ethane-1,2-diyl group, propane-1,3-diyl group, butane-1,4-diyl group or pentane-1,5-diyl group. d is an integer of from 3 to 6, and e is an integer of from 2 to 6.

Specific examples of the component (a) used in the catalyst for ethylene polymer production of the invention include a dichloride such as (1,1,3,3-tetramethyldisiloxane-1,3-diyl-biscyclopentadienyl)-zirconium dichloride, (1,1,3,3-tetraisopropyldisiloxane-1,3-diyl-biscyclopentadienyl)zirconium dichloride, (1,1,3,3-tetraphenyldisiloxane-1,3-diyl-biscyclopentadienyl)zirconium dichloride, (1,1-dimethyl-1-silaethane-1,2-diyl-biscyclopentadienyl)zirconium dichloride, (1,1-diisopropyl-1-silaethane-1,2-diyl-biscyclopentadienyl)-zirconium dichloride, (1,1-diphenyl-1-silaethane-1,2-diyl-biscyclopentadienyl)zirconium dichloride, (propane-1,3-diyl-biscyclopentadienyl)zirconium dichloride, (1,1,3,3-tetramethylpropane-1,3-diyl-biscyclopentadienyl)zirconium dichloride, (2,2-dimethylpropane-1,3-diyl-biscyclopentadienyl)zirconium dichloride, (butane-1,4-diyl-biscyclo-pentadienyl)zirconium dichloride, (pentane-1,5-diyl-biscyclopentadienyl)zirconium dichloride, (cis-2-butene-1,4-diyl-biscyclopentadienyl)zirconium dichloride, (cis-5-decene-1,10-diyl-biscyclopentadienyl)zirconium dichloride, (1,1,2,2-tetramethyldisilane-1,2-diyl-biscyclopentadienyl)-zirconium dichloride, or (1,1,2,2-tetraphenyldisilane-1,2-diyl-biscyclopentadienyl)zirconium dichloride; and a dimethyl form, a diethyl form, a dihydro form, a diphenyl form or a dibenzyl form of the above transition metal compounds.

The transition metal compound (component (b)) used in the catalyst for ethylene polymer production of the invention is a metallocene compound (which differs from the component (a)) comprising titanium atom, zirconium atom or hafnium atom as a central metal. Examples of such a compound include transition metal compounds in which at least one of unsubstituted or substituted cyclopentadienyl group, unsubstituted or substituted indenyl group and unsubstituted or substituted fluorenyl group is coordinated to titanium atom, zirconium atom or hafnium atom as a central metal.

Above all, a transition metal compound represented by the general formula (16)

[Chem. 4] (16)

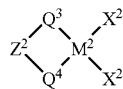

has high polymerization activity, making processability of an ethylene polymer obtained good, and is therefore preferred.

$M^2$ in the formula (16) represents titanium atom, zirconium atom or hafnium atom, and $X^2$ each independently represents hydrogen atom, a halogen atom, a $C_{1-20}$ hydrocarbon group, a $C_{1-20}$ silicon-containing hydrocarbon group, a $C_{1-20}$ nitrogen-containing hydrocarbon group or a $C_{1-20}$ oxygen-containing hydrocarbon group.

Examples of the halogen atom in $X^2$ include chlorine atom, fluorine atom, bromine atom and iodine atom. Examples of the $C_{1-20}$ hydrocarbon group include methyl group, ethyl group, propyl group, butyl group, pentyl group, hexyl group, heptyl group, octyl group, nonyl group, decyl group, norbornyl group, phenyl group, styryl group, biphenylyl group, naphthyl group, tolyl group, ethylphenyl group, propylphenyl group, butylphenyl group, dimethylphenyl group, diethylphenyl group, dipropylphenyl group, dibutylphenyl group, diphenylphenyl group, trimethylphenyl group, triethylphenyl group, tripropylphenyl group, tributylphenyl group, benzyl group, phenylethyl group, phenylpropyl group, phenylbutyl group, diphenylmethyl group, diphenylethyl group, diphenylpropyl group, diphenylbutyl group, vinyl group, propenyl group, butenyl group, butadienyl group, pentenyl group, pentadienyl group, hexenyl group and hexadienyl group. Examples of the $C_{1-20}$ silicon-containing hydrocarbon group include methylsilyl group, ethylsilyl group, propylsilyl group, butylsilyl group, pentylsilyl group, hexylsilyl group, phenylsilyl group, benzylsilyl group, dimethylsilyl group, diethylsilyl group, dipropylsilyl group, dibutylsilyl group, diphenylsilyl group, dibenzylsilyl group, trimethylsilyl group, triethylsilyl group, tripropylsilyl group, tributylsilyl group, triphenylsilyl group, dimethylphenylsilyl group, methyldiphenylsilyl group, trimethylsilylmethyl group, trimethylsilylethyl group, trimethylsilylpropyl group, trimethylsilylbutyl group, trimethylsilylphenyl group, bis(trimethylsilyl)methyl group, bis(trimethylsilyl)ethyl group, bis(trimethylsilyl)propyl group, bis(trimethylsilyl)butyl group, bis(trimethylsilyl)phenyl group and triphenylsilylmethyl group. Examples of the $C_{1-20}$ nitrogen-containing hydrocarbon group include methylamino group, ethylamino group, propylamino group, butylamino group, pentylamino group, hexylamino group, phenylamino group, benzylamino group, phenylethylamino group, phenylpropylamino group, phenylbutylamino group, naphthylamino group, dimethylamino group, diethylamino group, dipropylamino group, dibutylamino group, diphenylamino group, dibenzylamino group, dimethylaminomethyl group, dimethylaminoethyl group, dimethylaminopropyl group, dimethylaminobutyl group, dimethylaminophenyl group, bis(dimethylamino)methyl group, bis(dimethylamino)ethyl group, bis(dimethylamino) propyl group, bis(dimethylamino)butyl group, bis(dimethylamino)phenyl group, phenylaminomethyl group, diphenylaminomethyl group and diphenylaminophenyl group. Examples of the $C_{1-20}$ oxygen-containing hydrocarbon group include methoxy group, ethoxy group, propoxy group, butoxy group, phenoxy group, naphthoxy group, methylphenoxy group, ethylphenoxy group, propylphenoxy group, butylphenoxy group, biphenoxy group, methoxymethyl group, ethoxymethyl group, propoxymethyl group, butoxymethyl group, phenoxymethyl group, methoxyethyl group, ethoxyethyl group, propoxyethyl group, butoxyethyl group, phenoxyethyl group, methoxypropyl group, ethoxypropyl group, propoxypropyl group, butoxypropyl group, phenoxypropyl group, methoxybutyl group, ethoxybutyl group, propoxybutyl group, butoxybutyl group, phenoxybutyl group, methoxyphenyl group, ethoxyphenyl group, propoxyphenyl group, butoxyphenyl group and phenoxyphenyl group.

$Q^3$ in the formula (16) is a ligand represented by the general formula (17) or (18)

[Chem. 5]

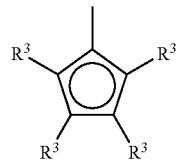
(17)

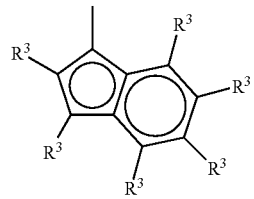
(18)

$R^3$ each independently represents hydrogen, a halogen, a $C_{1-20}$ hydrocarbon group, a $C_{1-20}$ silicon-containing hydrocarbon group, a $C_{1-20}$ nitrogen-containing hydrocarbon group or a $C_{1-20}$ oxygen-containing hydrocarbon group. At least two $R^3$ may be linked to form a ring.

Examples of the halogen atom of $R^3$ in the formula (17) or (18) include chlorine, fluorine, bromine and iodine. Examples of the $C_{1-20}$ hydrocarbon group include methyl group, ethyl group, propyl group, butyl group, pentyl group, hexyl group, heptyl group, octyl group, nonyl group, decyl group, norbornyl group, phenyl group, styryl group, biphenylyl group, naphthyl group, tolyl group, ethylphenyl group, propylphenyl group, butylphenyl group, dimethylphenyl group, diethylphenyl group, dipropylphenyl group, dibutylphenyl group, diphenylphenyl group, trimethylphenyl group, triethylphenyl group, tripropylphenyl group, tributylphenyl group, benzyl group, phenylethyl group, phenylpropyl group, phenylbutyl group, diphenylmethyl group, diphenylethyl group, diphenylpropyl group, diphenylbutyl group, vinyl group, propenyl group, butenyl group, butadienyl group, pentenyl group, pentadienyl group, hexenyl group and hexadienyl group. Examples of the $C_{1-20}$ silicon-containing hydrocarbon group include methylsilyl group, ethylsilyl group, propylsilyl group, butylsilyl group, pentylsilyl group, hexylsilyl group, phenylsilyl group, benzylsilyl group, dimethylsilyl group, diethylsilyl group, dipropylsilyl group, dibutylsilyl group, diphenylsilyl group, dibenzylsilyl group, trimethylsilyl group, triethylsilyl group, tripropylsilyl group, tributylsilyl group, triphenylsilyl group, dimethylphenylsilyl group, methyldiphenylsilyl group, trimethylsilylmethyl group, trimethylsilylethyl group, trimethylsilylpropyl group, trimethylsilylbutyl group, trimethylsilylphenyl group, bis(trimethylsilyl)methyl group, bis(trimethylsilyl)ethyl group, bis(trimethylsilyl)propyl group, bis(trimethylsilyl)butyl group, bis(trimethylsilyl)phenyl group and triphenylsilylmethyl group. Examples of the $C_{1-20}$ nitrogen-containing hydrocarbon group include methylamino group, ethylamino group, propylamino group, butylamino group, pentylamino group, hexylamino group, phenylamino group, benzylamino group, phenylethylamino group, phenylpropylamino group, phenylbutylamino group, naphthylamino group, dimethylamino group, diethylamino group, dipropylamino group, dibutylamino group, diphenylamino group, dibenzylamino group, dimethylaminomethyl group, dimethylaminoethyl group, dimethylaminopropyl group, dimethylaminobutyl group, dimethylaminophenyl group, bis(dimethylamino)methyl group, bis(dimethylamino)ethyl group, bis(dimethylamino)propyl group, bis(dimethylamino)butyl group, bis(dimethylamino)phenyl group, phenylaminomethyl group, diphenylaminomethyl group and diphenylaminophenyl group. Examples of the $C_{1-20}$ oxygen-containing hydrocarbon group include methoxy group, ethoxy group, propoxy group, butoxy group, phenoxy group, naphthoxy group, methylphenoxy group, ethylphenoxy group, propylphenoxy group, butylphenoxy group, biphenoxy group, methoxymethyl group, ethoxymethyl group, propoxymethyl group, butoxymethyl group, phenoxymethyl group, methoxyethyl group, ethoxyethyl group, propoxyethyl group, butoxyethyl group, phenoxyethyl group, methoxypropyl group, ethoxypropyl group, propoxypropyl group, butoxypropyl group, phenoxypropyl group, methoxybutyl group, ethoxybutyl group, propoxybutyl group, butoxybutyl group, phenoxybutyl group, methoxyphenyl group, ethoxyphenyl group, propoxyphenyl group, butoxyphenyl group and phenoxyphenyl group.

Specific examples of the general formula (17) or (18) include cyclopentadienyl group, methylcyclopentadienyl group, dimethylcyclopentadienyl group, trimethylcyclopentadienyl group, tetramethylcyclopentadienyl group, ethylcyclopentadienyl group, diethylcyclopentadienyl group, triethylcyclopentadienyl group, tetraethylcyclopentadienyl group, propylcyclopentadienyl group, dipropylcyclopentadienyl group, tripropylcyclopentadienyl group, tetrapropylcyclopentadienyl group, butylcyclopentadienyl group, dibutylcyclopentadienyl group, tributylcyclopentadienyl group, tetrabutylcyclopentadienyl group, phenylcyclopentadienyl group, diphenylcyclopentadienyl group, naphthylcyclopentadienyl group, methoxycyclopentadienyl group, trimethylsilylcyclopentadienyl group, indenyl group, methylindenyl group, dimethylindenyl group, trimethylindenyl group, tetramethylindenyl group, pentamethylindenyl group, hexamethylindenyl group, ethylindenyl group, diethylindenyl group, triethylindenyl group, tetraethylindenyl group, pentaethylindenyl group, hexaethylindenyl group, propylindenyl group, dipropylindenyl group, tripropylindenyl group, tetrapropylindenyl group, pentapropylindenyl group, hexapropylindenyl group, butylindenyl group, dibutylindenyl group, tributylindenyl group, tetrabutylindenyl group, pentabutylindenyl group, hexabutylindenyl group, phenylindenyl group, diphenylindenyl group, benzoindenyl group, naphthylindenyl group, methoxyindenyl group and trimethylsilylindenyl group.

$Q^4$ in the formula (16) is a ligand represented by the general formula (19)

[Chem. 6]

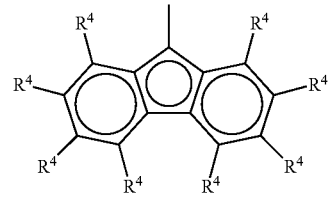

(19)

and the substituent $R^4$ each independently represents hydrogen atom, a halogen atom, a $C_{1-20}$ hydrocarbon group, a $C_{1-20}$ silicon-containing hydrocarbon group, a $C_{1-20}$ nitrogen-containing hydrocarbon group or a $C_{1-20}$ oxygen-containing hydrocarbon group. Specific examples of $R^4$ include the same groups as in $R^3$ described above.

Specific examples of the general formula (19) include fluorenyl group, methylfluorenyl group, dimethylfluorenyl group, trimethylfluorenyl group, tetramethylfluorenyl group, pentamethylfluorenyl group, hexamethylfluorenyl group, heptamethylfluorenyl group, octamethylfluorenyl group, ethylfluorenyl group, diethylfluorenyl group, triethylfluorenyl group, tetraethylfluorenyl group, pentaethylfluorenyl group, hexaethylfluorenyl group, heptaethylfluorenyl group, octaethylfluorenyl group, propylfluorenyl group, dipropylfluorenyl group, tripropylfluorenyl group, tetrapropylfluorenyl group, pentapropylfluorenyl group, hexapropylfluorenyl group, heptapropylfluorenyl group, octapropylfluorenyl group, butylfluorenyl group, dibutylfluorenyl group, tributylfluorenyl group, tetrabutylfluorenyl group, pentabutylfluorenyl group, hexabutylfluorenyl group, heptabutylfluorenyl group, octabutylfluorenyl group, phenylfluorenyl group, diphenylfluorenyl group, benzylfluorenyl group, dibenzylfluorenyl group, benzofluorenyl group, dimethylaminofluorenyl group, bis(dimethylamino)fluorenyl group, methoxyfluorenyl group and dimethoxyfluorenyl group.

$Q^3$ and $Q^4$ in the general formula (16) form a sandwich structure together with $M^1$.

$Z^2$ in the general formula (16) is represented by the general formula (20), and acts so as to crosslink $Q^3$ and $Q^4$.

[Chem. 7]

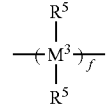

(20)

$R^5$ in the formula (20) each independently represents hydrogen atom, a halogen atom, a $C_{1-20}$ hydrocarbon group, a $C_{1-20}$ silicon-containing hydrocarbon group, a $C_{1-20}$ nitrogen-containing hydrocarbon group or a $C_{1-20}$ oxygen-containing hydrocarbon group. $M^3$ represents carbon atom, silicon atom, germanium atom or tin atom. Of those, carbon atom and silicon atom are preferred. f is an integer of from 1 to 5.

The halogen atom, $C_{1-20}$ hydrocarbon group, $C_{1-20}$ silicon-containing hydrocarbon group, $C_{1-20}$ nitrogen-containing hydrocarbon group or $C_{1-20}$ oxygen-containing hydrocarbon group of $R^5$ in the general formula (20) include the same atoms or groups as in $R^3$.

Specific examples of the general formula (20) include methylene group, ethylidene group, ethylene group, propylidene group, propylene group, butylidene group, butylene group, pentylidene group, pentylene group, hexylidene group, isopropylidene group, methylethylmethylene group, methylpropylmethylene group, methylbutylmethylene group, bis(cyclohexyl)methylene group, methylphenylmethylene group, diphenylmethylene group, phenyl(methylphenyl)methylene group, di(methylphenyl)methylene group, bis(dimethylphenyl)methylene group, bis(trimethylphenyl)methylene group, phenyl(ethylphenyl)methylene group, di(ethylphenyl)methylene group, bis(diethylphenyl)methylene group, phenyl(propylphenyl)methylene group, di(propylphenyl)methylene group, bis(dipropylphenyl)methylene group, phenyl(butylphenyl)methylene group, di(butylphenyl)methylene group, phenyl(naphthyl)methylene group, di(naphthyl)methylene group, phenyl(biphenyl)methylene group, di(biphenyl)methylene group, phenyl(trimethylsilylphenyl)methylene group, bis(trimethylsilylphenyl)methylene group, bis(pentafluorophenyl)methylene group, silanediyl group, disilanediyl group, trisilanediyl group, tetrasilanediyl group, dimethylsilanediyl group, bis(dimethylsilane)diyl group, diethylsilanediyl group, dipropylsilanediyl group, dibutylsilanediyl group, diphenylsilanediyl group, silacyclobutanediyl group and silacyclohexanediyl group.

When $M^2$ is zirconium atom, $X^2$ is chlorine atom and the crosslinking group $Z^2$ is diphenylmethylene group, specific compounds represented by the general formula (16) used in the invention include diphenylmethylene(1-cyclopentadienyl)(9-fluorenyl)zirconium dichloride, diphenylmethylene (2-methyl-1-cyclopentadienyl)(9-fluorenyl)zirconium dichloride, diphenylmethylene(3-methyl-1-cyclopentadienyl)(9-fluorenyl)zirconium dichloride, diphenylmethylene (2,4-dimethyl-1-cyclopentadienyl)(9-fluorenyl)zirconium dichloride, diphenylmethylene(2,5-dimethyl-1-cyclopentadienyl)(9-fluorenyl)zirconium dichloride, diphenylmethylene(3,4-dimethyl-1-cyclopentadienyl)(9-fluorenyl)zirconium dichloride, diphenylmethylene(2,3,4-trimethyl-1-cyclopentadienyl)(9-fluorenyl)zirconium dichloride, diphenylmethylene(2,3,5-trimethyl-1-cyclopentadienyl)(9-fluorenyl)zirconium dichloride, diphenylmethylene(3,4,5-trimethyl-1-cyclopentadienyl)(9-fluorenyl)zirconium dichloride, diphenylmethylene(2,3,4,5-tetramethyl-1-cyclopentadienyl)(9-fluorenyl)zirconium dichloride, diphenylmethylene(2-ethyl-1-cyclopentadienyl)(9-fluorenyl)zirconium dichloride, diphenylmethylene(3-ethyl-1-cyclopentadienyl)(9-fluorenyl)zirconium dichloride, diphenylmethylene(2,4-diethyl-1-cyclopentadienyl)(9-fluorenyl)zirconium dichloride, diphenylmethylene(2,5-diethyl-1-cyclopentadienyl)(9-fluorenyl)zirconium dichloride, diphenylmethylene(3,4-diethyl-1-cyclopentadienyl)(9-fluorenyl)zirconium dichloride, diphenylmethylene(2,3,4-triethyl-1-cyclopentadienyl)(9-fluorenyl)zirconium dichloride, diphenylmethylene(2,3,5-triethyl-1-cyclopentadienyl)(9-fluorenyl)zirconium dichloride, diphenylmethylene(3,4,5-triethyl-1-cyclopentadienyl)(9-fluorenyl)zirconium dichloride, diphenylmethylene(2,3,4,5-tetraethyl-1-cyclopentadienyl)(9-fluorenyl)zirconium dichloride, diphenylmethylene(2-propyl-1-cyclopentadienyl)(9-fluorenyl)zirconium dichloride, diphenylmethylene(3-propyl-1-cyclopentadienyl)(9-fluorenyl)zirconium dichloride, diphenylmethylene(2,4-dipropyl-1-cyclopentadienyl)(9-fluorenyl)zirconium dichloride, diphenylmethylene(2,5-dipropyl-1-cyclopentadienyl)(9-fluorenyl)zirconium dichloride, diphenylmethylene(3,4-dipropyl-1-cyclopentadienyl)(9-fluorenyl)zirconium dichloride, diphenylmethylene(2,3,4-tripropyl-1-cyclopentadienyl)(9-fluorenyl)zirconium dichloride, diphenylmethylene(2,3,5-tripropyl-1-cyclopentadienyl)(9-fluorenyl)zirconium dichloride, diphenylmethylene(3,4,5-tripropyl-1-cyclopentadienyl)(9-fluorenyl)zirconium dichloride, diphenylmethylene(2,3,4,5-tetrapropyl-1-cyclopentadienyl) (9-fluorenyl) zirconium dichloride, diphenylmethylene(2-isopropyl-1-cyclopentadienyl)(9-fluorenyl)zirconium dichloride, diphenylmethylene(3-isopropyl-1-cyclopentadienyl)(9-fluorenyl)zirconium dichloride, diphenylmethylene (2,4-diisopropyl-1-cyclopentadienyl)(9-fluorenyl)zirconium dichloride, diphenylmethylene(2,5-diisopropyl-1-cyclopentadienyl)(9-fluorenyl)zirconium dichloride, diphenylmethylene(3,4-diisopropyl-1-cyclopentadienyl)(9-fluorenyl)zirconium dichloride, diphenylmethylene(2,3,4-triisopropyl-1-cyclopentadienyl)(9-fluorenyl) zirconium dichloride, diphenylmethylene(2,3,5-triisopropyl-1-cyclopentadienyl) (9-fluorenyl)zirconium dichloride, diphenylmethylene(3,4,5-triisopropyl-1-cyclopentadienyl)(9-fluorenyl)zirconium dichloride, diphenylmethylene(2,3,4,5-tetraisopropyl-1-cyclopentadienyl)(9-fluorenyl)zirconium dichloride, diphenylmethylene(1-cyclopentadienyl)(9-fluorenyl)zirconium dichloride, diphenylmethylene(2-phenyl-1-cyclopentadienyl)(9-fluorenyl)zirconium dichloride, diphenylmethylene (3-phenyl-1-cyclopentadienyl)(9-fluorenyl)zirconium dichloride, diphenylmethylene(2,4-diphenyl-1-cyclopentadienyl)(9-fluorenyl)zirconium dichloride, diphenylmethylene(2,5-diphenyl-1-cyclopentadienyl)(9-fluorenyl)zirconium dichloride, diphenylmethylene(3,4-diphenyl-1-cyclopentadienyl)(9-fluorenyl)zirconium dichloride, diphenylmethylene(2,3,4-triphenyl-1-cyclopentadienyl)(9-fluorenyl)zirconium dichloride, diphenylmethylene(2,3,5-triphenyl-1-cyclopentadienyl)(9-fluorenyl) zirconium dichloride, diphenylmethylene(3,4,5-triphenyl-1-cyclopentadienyl)(9-fluorenyl)zirconium dichloride, diphenylmethylene(2,3,4,5-tetraphenyl-1-cyclopentadienyl) (9-fluorenyl) zirconium dichloride, diphenylmethylene(2-trimethylsilyl-1-cyclopentadienyl)(9-fluorenyl) zirconium dichloride, diphenylmethylene(3-trimethylsilyl-1-cyclopentadienyl)(9-fluorenyl)zirconium dichloride, diphenylmethylene(2,4-bis(trimethylsilyl)-1-cyclopentadienyl)(9-fluorenyl)zirconium dichloride, diphenylmethylene (2,5-bis(trimethylsilyl)-1-cyclopentadienyl)(9-fluorenyl)zirconium dichloride, diphenylmethylene(3,4-bis(trimethylsilyl)-1-cyclopentadienyl)(9-fluorenyl) zirconium dichloride, diphenylmethylene(2,3,4-tris(trimethylsilyl)-1-cyclopentadienyl)(9-fluorenyl)zirconium dichloride, diphenylmethylene(2,3,5-tris(trimethylsilyl)-1-cyclopentadienyl) (9-fluorenyl)zirconium dichloride, diphenylmethylene(3,4,5-tris(trimethylsilyl)-1-cyclopentadienyl)(9-fluorenyl) zirconium dichloride, diphenylmethylene(2,3,4,5-tetrakis (trimethylsilyl)-1-cyclopentadienyl)(9-fluorenyl)zirconium dichloride, diphenylmethylene(1-cyclopentadienyl)(2,7-dimethyl-9-fluorenyl)zirconium dichloride, diphenylmethylene(2-methyl-1-cyclopentadienyl)(2,7-dimethyl-9-fluorenyl)zirconium dichloride, diphenylmethylene(3-methyl-1-cyclopentadienyl)(2,7-dimethyl-9-fluorenyl)zirconium dichloride, diphenylmethylene(2,4-dimethyl-1-cyclopentadienyl)(2,7-dimethyl-9-fluorenyl)zirconium dichloride, diphenylmethylene(2,5-dimethyl-1-cyclopentadienyl)(2,7-dimethyl-9-fluorenyl)zirconium dichloride, diphenylmethylene(3,4-dimethyl-1-cyclopentadienyl)(2,7-dimethyl-9-fluorenyl) zirconium dichloride, diphenylmethylene(2,3,4-trimethyl-1-cyclopentadienyl)(2,7-dimethyl-9-fluorenyl) zirconium dichloride, diphenylmethylene(2,3,5-trimethyl-1-cyclopentadienyl)(2,7-dimethyl-9-fluorenyl)zirconium dichloride, diphenylmethylene(3,4,5-trimethyl-1-cyclopentadienyl)(2,7-dimethyl-9-fluorenyl)zirconium dichloride, diphenylmethylene(2,3,4,5-tetramethyl-1-cyclopentadienyl)

(2,7-dimethyl-9-fluorenyl)zirconium dichloride, diphenylmethylene(2-ethyl-1-cyclopentadienyl)(2,7-dimethyl-9-fluorenyl)zirconium dichloride, diphenylmethylene(3-ethyl-1-cyclopentadienyl)(2,7-dimethyl-9-fluorenyl)zirconium dichloride, diphenylmethylene(2,4-diethyl-1-cyclopentadienyl)(2,7-dimethyl-9-fluorenyl)zirconium dichloride, diphenylmethylene(2,5-diethyl-1-cyclopentadienyl)(2,7-dimethyl-9-fluorenyl)zirconium dichloride, diphenylmethylene(3,4-diethyl-1-cyclopentadienyl)(2,7-dimethyl-9-fluorenyl)zirconium dichloride, diphenylmethylene(2,3,4-triethyl-1-cyclopentadienyl)(2,7-dimethyl-9-fluorenyl)zirconium dichloride, diphenylmethylene(2,3,5-triethyl-1-cyclopentadienyl)(2,7-dimethyl-9-fluorenyl)zirconium dichloride, diphenylmethylene(3,4,5-triethyl-1-cyclopentadienyl)(2,7-dimethyl-9-fluorenyl)zirconium dichloride, diphenylmethylene(2,3,4,5-tetraethyl-1-cyclopentadienyl)(2,7-dimethyl-9-fluorenyl)zirconium dichloride, diphenylmethylene(2-propyl-1-cyclopentadienyl)(2,7-dimethyl-9-fluorenyl)zirconium dichloride, diphenylmethylene(3-propyl-1-cyclopentadienyl)(2,7-dimethyl-9-fluorenyl)zirconium dichloride, diphenylmethylene(2,4-dipropyl-1-cyclopentadienyl)(2,7-dimethyl-9-fluorenyl)zirconium dichloride, diphenylmethylene(2,5-dipropyl-1-cyclopentadienyl)(2,7-dimethyl-9-fluorenyl)zirconium dichloride, diphenylmethylene(3,4-dipropyl-1-cyclopentadienyl)(2,7-dimethyl-9-fluorenyl) zirconium dichloride, diphenylmethylene(2,3,4-tripropyl-1-cyclopentadienyl)(2,7-dimethyl-9-fluorenyl)zirconium dichloride, diphenylmethylene(2,3,5-tripropyl-1-cyclopentadienyl)(2,7-dimethyl-9-fluorenyl)zirconium dichloride, diphenylmethylene(3,4,5-tripropyl-1-cyclopentadienyl)(2,7-dimethyl-9-fluorenyl)zirconium dichloride, diphenylmethylene(2,3,4,5-tetrapropyl-1-cyclopentadienyl)(2,7-dimethyl-9-fluorenyl)zirconium dichloride, diphenylmethylene(2-isopropyl-1-cyclopentadienyl)(2,7-dimethyl-9-fluorenyl)zirconium dichloride, diphenylmethylene(3-isopropyl-1-cyclopentadienyl)(2,7-dimethyl-9-fluorenyl)zirconium dichloride, diphenylmethylene(2,4-diisopropyl-1-cyclopentadienyl)(2,7-dimethyl-9-fluorenyl)zirconium dichloride, diphenylmethylene(2,5-diisopropyl-1-cyclopentadienyl)(2,7-dimethyl-9-fluorenyl)zirconium dichloride, diphenylmethylene(3,4-diisopropyl-1-cyclopentadienyl)(2,7-dimethyl-9-fluorenyl)zirconium dichloride, diphenylmethylene(2,3,4-triisopropyl-1-cyclopentadienyl)(2,7-dimethyl-9-fluorenyl)zirconium dichloride, diphenylmethylene(2,3,5-triisopropyl-1-cyclopentadienyl)(2,7-dimethyl-9-fluorenyl)zirconium dichloride, diphenylmethylene(3,4,5-triisopropyl-1-cyclopentadienyl)(2,7-dimethyl-9-fluorenyl)zirconium dichloride, diphenylmethylene(2,3,4,5-tetraisopropyl-1-cyclopentadienyl)(2,7-dimethyl-9-fluorenyl)zirconium dichloride, diphenylmethylene(1-cyclopentadienyl)(2,7-dimethyl-9-fluorenyl)zirconium dichloride, diphenylmethylene(2-phenyl-1-cyclopentadienyl)(2,7-dimethyl-9-fluorenyl)zirconium dichloride, diphenylmethylene(3-phenyl-1-cyclopentadienyl)(2,7-dimethyl-9-fluorenyl)zirconium dichloride, diphenylmethylene(2,4-diphenyl-1-cyclopentadienyl)(2,7-dimethyl-9-fluorenyl)zirconium dichloride, diphenylmethylene(2,5-diphenyl-1-cyclopentadienyl)-(2,7-dimethyl-9-fluorenyl)zirconium dichloride, diphenylmethylene(3,4-diphenyl-1-cyclopentadienyl)(2,7-dimethyl-9-fluorenyl) zirconium dichloride, diphenylmethylene(2,3,4-triphenyl-1-cyclopentadienyl)(2,7-dimethyl-9-fluorenyl)zirconium dichloride, diphenylmethylene(2,3,5-triphenyl-1-cyclopentadienyl)(2,7-dimethyl-9-fluorenyl)zirconium dichloride, diphenylmethylene(3,4,5-triphenyl-1-cyclopentadienyl)(2,7-dimethyl-9-fluorenyl)zirconium dichloride, diphenylmethylene(2,3,4,5-tetraphenyl-1-cyclopentadienyl)(2,7-dimethyl-9-fluorenyl)zirconium dichloride, diphenylmethylene(2-trimethylsilyl-1-cyclopentadienyl)(2,7-dimethyl-9-fluorenyl)zirconium dichloride, diphenylmethylene(3-trimethylsilyl-1-cyclopentadienyl)(2,7-dimethyl-9-fluorenyl)zirconium dichloride, diphenylmethylene(2,4-bis(trimethylsilyl)-1-cyclopentadienyl)(2,7-dimethyl-9-fluorenyl)zirconium dichloride, diphenylmethylene(2,5-bis(trimethylsilyl)-1-cyclopentadienyl)(2,7-dimethyl-9-fluorenyl)zirconium dichloride, diphenylmethylene(3,4-bis(trimethylsilyl)-1-cyclopentadienyl)(2,7-dimethyl-9-fluorenyl)zirconium dichloride, diphenylmethylene(2,3,4-tris(trimethylsilyl)-1-cyclopentadienyl)(2,7-dimethyl-9-fluorenyl)zirconium dichloride, diphenylmethylene(2,3,5-tris(trimethylsilyl)-1-cyclopentadienyl)(2,7-dimethyl-9-fluorenyl)zirconium dichloride, diphenylmethylene(3,4,5-tris(trimethylsilyl)-1-cyclopentadienyl)(2,7-dimethyl-9-fluorenyl)zirconium dichloride, diphenylmethylene(2,3,4,5-tetrakis(trimethylsilyl)-1-cyclopentadienyl)(2,7-dimethyl-9-fluorenyl)zirconium dichloride, diphenylmethylene(1-cyclopentadienyl)(2,7-diethyl-9-fluorenyl)zirconium dichloride, diphenylmethylene(2-methyl-1-cyclopentadienyl)(2,7-diethyl-9-fluorenyl)zirconium dichloride, diphenylmethylene(3-methyl-1-cyclopentadienyl)(2,7-diethyl-9-fluorenyl)zirconium dichloride, diphenylmethylene(2,4-dimethyl-1-cyclopentadienyl)(2,7-diethyl-9-fluorenyl) zirconium dichloride, diphenylmethylene(2,5-dimethyl-1-cyclopentadienyl)(2,7-diethyl-9-fluorenyl)zirconium dichloride, diphenylmethylene(3,4-dimethyl-1-cyclopentadienyl)(2,7-diethyl-9-fluorenyl)zirconium dichloride, diphenylmethylene(2,3,4-trimethyl-1-cyclopentadienyl)(2,7-diethyl-9-fluorenyl)zirconium dichloride, diphenylmethylene(2,3,5-trimethyl-1-cyclopentadienyl)(2,7-diethyl-9-fluorenyl)zirconium dichloride, diphenylmethylene(3,4,5-trimethyl-1-cyclopentadienyl)(2,7-diethyl-9-fluorenyl)zirconium dichloride, diphenylmethylene(2,3,4,5-tetramethyl-1-cyclopentadienyl)(2,7-diethyl-9-fluorenyl)zirconium dichloride, diphenylmethylene(2-ethyl-1-cyclopentadienyl)(2,7-diethyl-9-fluorenyl)zirconium dichloride, diphenylmethylene(3-ethyl-1-cyclopentadienyl)(2,7-diethyl-9-fluorenyl)zirconium dichloride, diphenylmethylene(2,4-diethyl-1-cyclopentadienyl)(2,7-diethyl-9-fluorenyl)zirconium dichloride, diphenylmethylene(2,5-diethyl-1-cyclopentadienyl)(2,7-diethyl-9-fluorenyl) zirconium dichloride, diphenylmethylene(3,4-diethyl-1-cyclopentadienyl)(2,7-diethyl-9-fluorenyl)zirconium dichloride, diphenylmethylene(2,3,4-triethyl-1-cyclopentadienyl)(2,7-diethyl-9-fluorenyl)zirconium dichloride, diphenylmethylene(2,3,5-triethyl-1-cyclopentadienyl)(2,7-diethyl-9-fluorenyl)zirconium dichloride, diphenylmethylene(3,4,5-triethyl-1-cyclopentadienyl)(2,7-diethyl-9-fluorenyl) zirconium dichloride, diphenylmethylene(2,3,4,5-tetraethyl-1-cyclopentadienyl)(2,7-diethyl-9-fluorenyl)zirconium dichloride, diphenylmethylene(2-propyl-1-cyclopentadienyl)(2,7-diethyl-9-fluorenyl)zirconium dichloride, diphenylmethylene(3-propyl-1-cyclopentadienyl)(2,7-diethyl-9-fluorenyl)zirconium dichloride, diphenylmethylene(2,4-dipropyl-1-cyclopentadienyl)(2,7-diethyl-9-fluorenyl)zirconium dichloride, diphenylmethylene(2,5-dipropyl-1-cyclopentadienyl)(2,7-diethyl-9-fluorenyl)zirconium dichloride, diphenylmethylene(3,4-dipropyl-1-cyclopentadienyl)(2,7-diethyl-9-fluorenyl)zirconium dichloride, diphenylmethylene(2,3,4-tripropyl-1-cyclopentadienyl)(2,7-diethyl-9-fluorenyl)zirconium dichloride, diphenylmethylene(2,3,5-tripropyl-1-cyclopentadienyl)(2,7-diethyl-9-fluorenyl)zirconium dichloride, diphenylmethylene(3,4,5-tripropyl-1-cyclopentadienyl)(2,7-diethyl-9-fluorenyl)zirconium dichloride, diphenylmethylene(2,3,4,5-tetrapropyl-1-cyclopentadienyl)(2,7-diethyl-9-fluorenyl)

zirconium dichloride, diphenylmethylene(2-isopropyl-1-cyclopentadienyl)(2,7-diethyl-9-fluorenyl)zirconium dichloride, diphenylmethylene(3-isopropyl-1-cyclopentadienyl)(2,7-diethyl-9-fluorenyl)zirconium dichloride, diphenylmethylene(2,4-diisopropyl-1-cyclopentadienyl)(2,7-diethyl-9-fluorenyl)zirconium dichloride, diphenylmethylene(2,5-diisopropyl-1-cyclopentadienyl)(2,7-diethyl-9-fluorenyl)zirconium dichloride, diphenylmethylene(3,4-diisopropyl-1-cyclopentadienyl)(2,7-diethyl-9-fluorenyl)zirconium dichloride, diphenylmethylene(2,3,4-triisopropyl-1-cyclopentadienyl)(2,7-diethyl-9-fluorenyl)zirconium dichloride, diphenylmethylene(2,3,5-triisopropyl-1-cyclopentadienyl)(2,7-diethyl-9-fluorenyl)zirconium dichloride, diphenylmethylene(3,4,5-triisopropyl-1-cyclopentadienyl)(2,7-diethyl-9-fluorenyl)zirconium dichloride, diphenylmethylene(2,3,4,5-tetraisopropyl-1-cyclopentadienyl)(2,7-diethyl-9-fluorenyl)zirconium dichloride, diphenylmethylene(1-cyclopentadienyl)(2,7-diethyl-9-fluorenyl)zirconium dichloride, diphenylmethylene(2-phenyl-1-cyclopentadienyl)(2,7-diethyl-9-fluorenyl)zirconium dichloride, diphenylmethylene(3-phenyl-1-cyclopentadienyl)(2,7-diethyl-9-fluorenyl)zirconium dichloride, diphenylmethylene(2,4-diphenyl-1-cyclopentadienyl)(2,7-diethyl-9-fluorenyl)zirconium dichloride, diphenylmethylene(2,5-diphenyl-1-cyclopentadienyl)(2,7-diethyl-9-fluorenyl)zirconium dichloride, diphenylmethylene(3,4-diphenyl-1-cyclopentadienyl)(2,7-diethyl-9-fluorenyl)zirconium dichloride, diphenylmethylene(2,3,4-triphenyl-1-cyclopentadienyl)(2,7-diethyl-9-fluorenyl)zirconium dichloride, diphenylmethylene(2,3,5-triphenyl-1-cyclopentadienyl)(2,7-diethyl-9-fluorenyl)zirconium dichloride, diphenylmethylene(3,4,5-triphenyl-1-cyclopentadienyl)(2,7-diethyl-9-fluorenyl) zirconium dichloride, diphenylmethylene(2,3,4,5-tetraphenyl-1-cyclopentadienyl)(2,7-diethyl-9-fluorenyl) zirconium dichloride, diphenylmethylene(2-trimethylsilyl-1-cyclopentadienyl)(2,7-diethyl-9-fluorenyl)zirconium dichloride, diphenylmethylene(3-trimethylsilyl-1-cyclopentadienyl)(2,7-diethyl-9-fluorenyl)zirconium dichloride, diphenylmethylene(2,4-bis(trimethylsilyl)-1-cyclopentadienyl)(2,7-diethyl-9-fluorenyl)zirconium dichloride, diphenylmethylene(2,5-bis(trimethylsilyl)-1-cyclopentadienyl)(2,7-diethyl-9-fluorenyl)zirconium dichloride, diphenylmethylene(3,4-bis(trimethylsilyl)-1-cyclopentadienyl)(2,7-diethyl-9-fluorenyl) zirconium dichloride, diphenylmethylene(2,3,4-tris(trimethylsilyl)-1-cyclopentadienyl)(2,7-diethyl-9-fluorenyl) zirconium dichloride, diphenylmethylene(2,3,5-tris(trimethylsilyl)-1-cyclopentadienyl)(2,7-diethyl-9-fluorenyl) zirconium dichloride, diphenylmethylene(3,4,5-tris(trimethylsilyl)-1-cyclopentadienyl)(2,7-diethyl-9-fluorenyl)zirconium dichloride, diphenylmethylene(2,3,4,5-tetrakis(trimethylsilyl)-1-cyclopentadienyl)(2,7-diethyl-9-fluorenyl)zirconium dichloride, diphenylmethylene(1-cyclopentadienyl)(2,7-di-t-butyl-9-fluorenyl)zirconium dichloride, diphenylmethylene(2-methyl-1-cyclopentadienyl)(2,7-di-t-butyl-9-fluorenyl)zirconium dichloride, diphenylmethylene(3-methyl-1-cyclopentadienyl)(2,7-di-t-butyl-9-fluorenyl)zirconium dichloride, diphenylmethylene(2,4-dimethyl-1-cyclopentadienyl)(2,7-di-t-butyl-9-fluorenyl)zirconium dichloride, diphenylmethylene(2,5-dimethyl-1-cyclopentadienyl)(2,7-di-t-butyl-9-fluorenyl)zirconium dichloride, diphenylmethylene(3,4-dimethyl-1-cyclopentadienyl)(2,7-di-t-butyl-9-fluorenyl)zirconium dichloride, diphenylmethylene(2,3,4-trimethyl-1-cyclopentadienyl)(2,7-di-t-butyl-9-fluorenyl)zirconium dichloride, diphenylmethylene(2,3,5-trimethyl-1-cyclopentadienyl)(2,7-di-t-butyl-9-fluorenyl)zirconium dichloride, diphenylmethylene(3,4,5-trimethyl-1-cyclopentadienyl)(2,7-di-t-butyl-9-fluorenyl)zirconium dichloride, diphenylmethylene(2,3,4,5-tetramethyl-1-cyclopentadienyl)(2,7-di-t-butyl-9-fluorenyl)zirconium dichloride, diphenylmethylene(2-ethyl-1-cyclopentadienyl)(2,7-di-t-butyl-9-fluorenyl)zirconium dichloride, diphenylmethylene(3-ethyl-1-cyclopentadienyl)(2,7-di-t-butyl-9-fluorenyl)zirconium dichloride, diphenylmethylene(2,4-diethyl-1-cyclopentadienyl)(2,7-di-t-butyl-9-fluorenyl)zirconium dichloride, diphenylmethylene(2,5-diethyl-1-cyclopentadienyl)(2,7-di-t-butyl-9-fluorenyl)zirconium dichloride, diphenylmethylene(3,4-diethyl-1-cyclopentadienyl)(2,7-di-t-butyl-9-fluorenyl)zirconium dichloride, diphenylmethylene(2,3,4-triethyl-1-cyclopentadienyl)(2,7-di-t-butyl-9-fluorenyl)zirconium dichloride, diphenylmethylene(2,3,5-triethyl-1-cyclopentadienyl)(2,7-di-t-butyl-9-fluorenyl)zirconium dichloride, diphenylmethylene(3,4,5-triethyl-1-cyclopentadienyl)(2,7-di-t-butyl-9-fluorenyl)zirconium dichloride, diphenylmethylene(2,3,4,5-tetraethyl-1-cyclopentadienyl)(2,7-di-t-butyl-9-fluorenyl)zirconium dichloride, diphenylmethylene(2-propyl-1-cyclopentadienyl)(2,7-di-t-butyl-9-fluorenyl) zirconium dichloride, diphenylmethylene(3-propyl-1-cyclopentadienyl)(2,7-di-t-butyl-9-fluorenyl)zirconium dichloride, diphenylmethylene (2,4-dipropyl-1-cyclopentadienyl)(2,7-di-t-butyl-9-fluorenyl)zirconium dichloride, diphenylmethylene (2,5-dipropyl-1-cyclopentadienyl)(2,7-di-t-butyl-9-fluorenyl)zirconium dichloride, diphenylmethylene(3,4-dipropyl-1-cyclopentadienyl) (2,7-di-t-butyl-9-fluorenyl)zirconium dichloride, diphenylmethylene (2,3,4-tripropyl-1-cyclopentadienyl) (2,7-di-t-butyl-9-fluorenyl)zirconium dichloride, diphenylmethylene(2,3,5-tripropyl-1-cyclopentadienyl) (2,7-di-t-butyl-9-fluorenyl) zirconium dichloride, diphenylmethylene(3,4,5-tripropyl-1-cyclopentadienyl) (2,7-di-t-butyl-9-fluorenyl)zirconium dichloride, diphenylmethylene (2,3,4,5-tetrapropyl-1-cyclopentadienyl) (2,7-di-t-butyl-9-fluorenyl)zirconium dichloride, diphenylmethylene (2-isopropyl-1-cyclopentadienyl) (2,7-di-t-butyl-9-fluorenyl)zirconium dichloride, diphenylmethylene(3-isopropyl-1-cyclopentadienyl) (2,7-di-t-butyl-9-fluorenyl)zirconium dichloride, diphenylmethylene (2,4-diisopropyl-1-cyclopentadienyl)(2,7-di-t-butyl-9-fluorenyl)zirconium dichloride, diphenylmethylene (2,5-diisopropyl-1-cyclopentadienyl) (2,7-di-t-butyl-9-fluorenyl)zirconium dichloride, diphenylmethylene(3,4-diisopropyl-1-cyclopentadienyl) (2,7-di-t-butyl-9-fluorenyl) zirconium dichloride, diphenylmethylene(2,3,4-triisopropyl-1-cyclopentadienyl) (2,7-di-t-butyl-9-fluorenyl) zirconium dichloride, diphenylmethylene (2,3,5-triisopropyl-1-cyclopentadienyl) (2,7-di-t-butyl-9-fluorenyl) zirconium dichloride, diphenylmethylene(3,4,5-triisopropyl-1-cyclopentadienyl) (2,7-di-t-butyl-9-fluorenyl)zirconium dichloride, diphenylmethylene(2,3,4,5-tetraisopropyl-1-cyclopentadienyl)(2,7-di-t-butyl-9-fluorenyl)zirconium dichloride, diphenylmethylene(1-cyclopentadienyl)(2,7-di-t-butyl-9-fluorenyl)zirconium dichloride, diphenylmethylene(2-phenyl-1-cyclopentadienyl)(2,7-di-t-butyl-9-fluorenyl)zirconium dichloride, diphenylmethylene(3-phenyl-1-cyclopentadienyl)(2,7-di-t-butyl-9-fluorenyl)zirconium dichloride, diphenylmethylene(2,4-diphenyl-1-cyclopentadienyl)(2,7-di-t-butyl-9-fluorenyl)zirconium dichloride, diphenylmethylene(2,5-diphenyl-1-cyclopentadienyl)(2,7-di-t-butyl-9-fluorenyl)zirconium dichloride, diphenylmethylene(3,4-diphenyl-1-cyclopentadienyl)(2,7-di-t-butyl-9-fluorenyl)zirconium dichloride, diphenylmethylene(2,3,4-triphenyl-1-cyclopentadienyl)(2,7-di-t-butyl-9-fluorenyl) zirconium dichloride, diphenylmethylene(2,3,5-triphenyl-1-cyclopentadienyl)(2,7-di-t-butyl-9-fluorenyl)zirconium dichloride, diphenylmethylene(3,4,5-triphenyl-1-cyclopentadienyl)(2,7-di-t-butyl-9-fluorenyl)zirconium dichloride, diphenylmethylene(2,3,4,5-tetraphenyl-1-cyclopentadienyl)(2,7-di-t-butyl-9-fluorenyl)zirconium dichloride, diphenylmethylene(2-trimethylsilyl-1-cyclopentadienyl)(2,7-di-t-butyl-9-fluorenyl)zirconium dichloride, diphenylmethylene(3-trimethylsilyl-1-cyclopentadienyl)(2,7-di-t-butyl-9-fluorenyl)zirconium dichloride, diphenylmethylene(2,4-bis(trimethylsilyl)-1-cyclopentadienyl)(2,7-di-t-butyl-9-fluorenyl)zirconium dichloride, diphenylmethylene(2,5-bis(trimethylsilyl)-1-cyclopentadienyl)(2,7-di-t-butyl-9-fluorenyl)zirconium dichloride, diphenylmethylene(3,4-bis(trimethylsilyl)-1-cyclopentadienyl)(2,7-di-t-butyl-9-fluorenyl) zirconium dichloride, diphenylmethylene(2,3,4-tris(trimethylsilyl)-1-cyclopentadienyl)(2,7-di-t-butyl-9-fluorenyl)zirconium dichloride, diphenylmethylene(2,3,5-tris(trimethylsilyl)-1-cyclopentadienyl)(2,7-di-t-butyl-9-fluorenyl)zirconium dichloride, diphenylmethylene(3,4,5-tris(trimethylsilyl)-1-cyclopentadienyl)(2,7-di-t-butyl-9-fluorenyl)zirconium dichloride, diphenylmethylene(2,3,4,5-tetrakis(trimethylsilyl)-1-cyclopentadienyl)(2,7-di-t-butyl-9-fluorenyl)zirconium dichloride, diphenylmethylene(1-indenyl)(9-fluorenyl)zirconium dichloride, diphenylmethylene(2-methyl-1-indenyl)(9-fluorenyl)zirconium dichloride, diphenylmethylene(3-methyl-1-indenyl)(9-fluorenyl)zirconium dichloride, diphenylmethylene(4-methyl-1-indenyl)(9-fluorenyl)zirconium dichloride, diphenylmethylene(5-methyl-1-indenyl)(9-fluorenyl)zirconium dichloride, diphenylmethylene(6-methyl-1-indenyl)(9-fluorenyl)zirconium dichloride, diphenylmethylene(7-methyl-1-indenyl)(9-fluorenyl)zirconium dichloride, diphenylmethylene(2-phenyl-1-indenyl)(9-fluorenyl)zirconium dichloride, diphenylmethylene(3-phenyl-1-indenyl)(9-fluorenyl)zirconium dichloride, diphenylmethylene(4-phenyl-1-indenyl)(9-fluorenyl)zirconium dichloride, diphenylmethylene(5-phenyl-1-indenyl)(9-fluorenyl)zirconium dichloride, diphenylmethylene(6-phenyl-1-indenyl)(9-fluorenyl)zirconium dichloride, diphenylmethylene(7-phenyl-1-indenyl)(9-fluorenyl)zirconium dichloride, diphenylmethylene(2,3-dimethyl-1-indenyl)(9-fluorenyl) zirconium dichloride, diphenylmethylene(2,4-dimethyl-1-indenyl)(9-fluorenyl)zirconium dichloride, diphenylmethylene(2,5-dimethyl-1-indenyl)(9-fluorenyl)zirconium dichloride, diphenylmethylene(2,6-dimethyl-1-indenyl)(9-fluorenyl)zirconium dichloride, diphenylmethylene(2,7-dimethyl-1-indenyl)(9-fluorenyl)zirconium dichloride, diphenylmethylene(3,4-dimethyl-1-indenyl)(9-fluorenyl) zirconium dichloride, diphenylmethylene(3,5-dimethyl-1-indenyl)(9-fluorenyl)zirconium dichloride, diphenylmethylene(3,6-dimethyl-1-indenyl)(9-fluorenyl) zirconium dichloride, diphenylmethylene(3,7-dimethyl-1-indenyl)(9-fluorenyl)zirconium dichloride, diphenylmethylene(4,5-dimethyl-1-indenyl)(9-fluorenyl)zirconium dichloride, diphenylmethylene(4,6-dimethyl-1-indenyl)(9-fluorenyl)zirconium dichloride, diphenylmethylene(4,7-dimethyl-1-indenyl)(9-fluorenyl)zirconium dichloride, diphenylmethylene(5,6-dimethyl-1-indenyl)(9-fluorenyl) zirconium dichloride, diphenylmethylene(5,7-dimethyl-1-indenyl)(9-fluorenyl)zirconium dichloride, diphenylmethylene(6,7-dimethyl-1-indenyl)(9-fluorenyl)zirconium dichloride, diphenylmethylene(2-methyl-4-phenyl-1-indenyl)(9-fluorenyl)zirconium dichloride, diphenylmethylene(2-methyl-4,5-benzo-1-indenyl)(9-fluorenyl)zirconium dichloride, diphenylmethylene(2-methyl-5,6-benzo-1-indenyl)(9-fluorenyl)zirconium dichloride, diphenylmethylene(2-methyl-4-(α-naphthyl)-1-indenyl)(9-fluorenyl)zirconium dichloride, diphenylmethylene(2-methyl-4-(β-naphthyl)-1- indenyl)(9-fluorenyl)zirconium dichloride, diphenylmethylene(1-indenyl)(2,7-dimethyl-9-fluorenyl)zirconium dichloride, diphenylmethylene(2-methyl-1-indenyl)(2,7-dimethyl-9-fluorenyl)zirconium dichloride, diphenylmethylene(3-methyl-1-indenyl)(2,7-dimethyl-9-fluorenyl)zirconium dichloride, diphenylmethylene(4-methyl-1-indenyl)(2,7-dimethyl-9-fluorenyl)zirconium dichloride, diphenylmethylene(5-methyl-1-indenyl)(2,7-dimethyl-9-fluorenyl)zirconium dichloride, diphenylmethylene(6-methyl-1-indenyl)(2,7-dimethyl-9-fluorenyl)zirconium dichloride, diphenylmethylene(7-methyl-1-indenyl)(2,7-dimethyl-9-fluorenyl)zirconium dichloride, diphenylmethylene(2-phenyl-1-indenyl)(2,7-dimethyl-9-fluorenyl)zirconium dichloride, diphenylmethylene(3-phenyl-1-indenyl)(2,7-dimethyl-9-fluorenyl)zirconium dichloride, diphenylmethylene(4-phenyl-1-indenyl)(2,7-dimethyl-9-fluorenyl)zirconium dichloride, diphenylmethylene(5-phenyl-1-indenyl)(2,7-dimethyl-9-fluorenyl)zirconium dichloride, diphenylmethylene(6-phenyl-1-indenyl)(2,7-dimethyl-9-fluorenyl)zirconium dichloride, diphenylmethylene(7-phenyl-1-indenyl)(2,7-dimethyl-9-fluorenyl)zirconium dichloride, diphenylmethylene(2,3-dimethyl-1-indenyl)(2,7-dimethyl-9-fluorenyl)zirconium dichloride, diphenylmethylene(2,4-dimethyl-1-indenyl)(2,7-dimethyl-9-fluorenyl)zirconium dichloride, diphenylmethylene(2,5-dimethyl-1-indenyl)(2,7-dimethyl-9-fluorenyl)zirconium dichloride, diphenylmethylene(2,6-dimethyl-1-indenyl)(2,7-dimethyl-9-fluorenyl)zirconium dichloride, diphenylmethylene(2,7-dimethyl-1-indenyl)(2,7-dimethyl-9-fluorenyl)zirconium dichloride, diphenylmethylene(3,4-dimethyl-1-indenyl)(2,7-dimethyl-9-fluorenyl)zirconium dichloride, diphenylmethylene(3,5-dimethyl-1-indenyl)(2,7-dimethyl-9-fluorenyl)zirconium dichloride, diphenylmethylene(3,6-dimethyl-1-indenyl)(2,7-dimethyl-9-fluorenyl)zirconium dichloride, diphenylmethylene(3,7-dimethyl-1-indenyl)(2,7-dimethyl-9-fluorenyl)zirconium dichloride, diphenylmethylene(4,5-dimethyl-1-indenyl)(2,7-dimethyl-9-fluorenyl)zirconium dichloride, diphenylmethylene(4,6-dimethyl-1-indenyl)(2,7-dimethyl-9-fluorenyl)zirconium dichloride, diphenylmethylene(4,7-dimethyl-1-indenyl)(2,7-dimethyl-9-fluorenyl)zirconium dichloride, diphenylmethylene(5,6-dimethyl-1-indenyl)(2,7-dimethyl-9-fluorenyl)zirconium dichloride, diphenylmethylene(5,7-dimethyl-1-indenyl)(2,7-dimethyl-9-fluorenyl)zirconium dichloride, diphenylmethylene(6,7-dimethyl-1-indenyl)(2,7-dimethyl-9-fluorenyl)zirconium dichloride, diphenylmethylene(2-methyl-4-phenyl-1-indenyl)(2,7-dimethyl-9-fluorenyl)zirconium dichloride, diphenylmethylene(2-methyl-4,5-benzo-1-indenyl)(2,7-dimethyl-9-fluorenyl)zirconium dichloride, diphenylmethylene(2-methyl-5,6-benzo-1-indenyl)(2,7-dimethyl-9-fluorenyl)zirconium dichloride, diphenylmethylene(2-methyl-4-(α-naphthyl)-1-indenyl)(2,7-dimethyl-9-fluorenyl)zirconium dichloride, diphenylmethylene(2-methyl-4-(β-naphthyl)-indenyl)(2,7-dimethyl-9-fluorenyl) zirconium dichloride, diphenylmethylene(1-indenyl)(2,7-diethyl-9-fluorenyl)zirconium dichloride, diphenylmethylene(2-methyl-1-indenyl)(2,7-diethyl-9-fluorenyl)zirconium dichloride, diphenylmethylene(3-methyl-1-indenyl)(2,7-diethyl-9-fluorenyl)zirconium dichloride, diphenylmethylene(4-methyl-1-indenyl)(2,7-diethyl-9-fluorenyl)zirconium dichloride, diphenylmethylene(5-methyl-1-indenyl)(2,7-diethyl-9-fluorenyl)zirconium dichloride, diphenylmethylene(6-methyl-1-indenyl)(2,7-diethyl-9-fluorenyl)zirconium dichloride, diphenylmethylene(7-methyl-1-indenyl)(2,7-diethyl-9-fluorenyl)zirconium dichloride, diphenylmethylene(2-phenyl-1-indenyl)(2,7-diethyl-9-fluorenyl)zirconium dichloride, diphenylmethylene(3-phenyl-1- indenyl)(2,7-diethyl-9-fluorenyl)zirconium dichloride, diphenylmethylene(4-phenyl-1-indenyl)(2,7-diethyl-9-fluorenyl)zirconium dichloride, diphenylmethylene(5-phenyl-1-indenyl)(2,7-diethyl-9-fluorenyl)zirconium dichloride, diphenylmethylene(6-phenyl-1-indenyl)(2,7-diethyl-9-fluorenyl)zirconium dichloride, diphenylmethylene(7-phenyl-1-indenyl)(2,7-diethyl-9-fluorenyl)zirconium dichloride, diphenylmethylene(2,3-dimethyl-1-indenyl)(2,7-diethyl-9-fluorenyl)zirconium dichloride, diphenylmethylene(2,4-dimethyl-1-indenyl)(2,7-diethyl-9-fluorenyl)zirconium dichloride, diphenylmethylene(2,5-dimethyl-1-indenyl)(2,7-diethyl-9-fluorenyl)zirconium dichloride, diphenylmethylene(2,6-dimethyl-1-indenyl)(2,7-diethyl-9-fluorenyl)zirconium dichloride, diphenylmethylene(2,7-dimethyl-1-indenyl)(2,7-diethyl-9-fluorenyl)zirconium dichloride, diphenylmethylene(3,4-dimethyl-1-indenyl)(2,7-diethyl-9-fluorenyl)zirconium dichloride, diphenylmethylene(3,5-dimethyl-1-indenyl)(2,7-diethyl-9-fluorenyl)zirconium dichloride, diphenylmethylene(3,6-dimethyl-1-indenyl)(2,7-diethyl-9-fluorenyl)zirconium dichloride, diphenylmethylene(3,7-dimethyl-1-indenyl)(2,7-diethyl-9-fluorenyl)zirconium dichloride, diphenylmethylene(4,5-dimethyl-1-indenyl)(2,7-diethyl-9-fluorenyl)zirconium dichloride, diphenylmethylene(4,6-dimethyl-1-indenyl)(2,7-diethyl-9-fluorenyl)zirconium dichloride, diphenylmethylene(4,7-dimethyl-1-indenyl)(2,7-diethyl-9-fluorenyl)zirconium dichloride, diphenylmethylene(5,6-dimethyl-1-indenyl)(2,7-diethyl-9-fluorenyl)zirconium dichloride, diphenylmethylene(5,7-dimethyl-1-indenyl)(2,7-diethyl-9-fluorenyl)zirconium dichloride, diphenylmethylene(6,7-dimethyl-1-indenyl)(2,7-diethyl-9-fluorenyl)zirconium dichloride, diphenylmethylene(2-methyl-4-phenyl-1-indenyl)(2,7-diethyl-9-fluorenyl)zirconium dichloride, diphenylmethylene(2-methyl-4,5-benzo-1-indenyl)(2,7-diethyl-9-fluorenyl)zirconium dichloride, diphenylmethylene(2-methyl-5,6-benzo-1-indenyl)(2,7-diethyl-9-fluorenyl)zirconium dichloride, diphenylmethylene(2-methyl-4-(α-naphthyl)-1-indenyl)(2,7-diethyl-9-fluorenyl)zirconium dichloride, diphenylmethylene(2-methyl-4-(β-naphthyl)-1-indenyl)(2,7-diethyl-9-fluorenyl)zirconium dichloride, diphenylmethylene(1-indenyl)(2,7-di-t-butyl-9-fluorenyl)zirconium dichloride, diphenylmethylene(2-methyl-1-indenyl)(2,7-di-t-butyl-9-fluorenyl)zirconium dichloride, diphenylmethylene(3-methyl-1-indenyl)(2,7-di-t-butyl-9-fluorenyl)zirconium dichloride, diphenylmethylene(4-methyl-1-indenyl)(2,7-di-t-butyl-9-fluorenyl)zirconium dichloride, diphenylmethylene(5-methyl-1-indenyl)(2,7-di-t-butyl-9-fluorenyl)zirconium dichloride, diphenylmethylene(6-methyl-1-indenyl)(2,7-di-t-butyl-9-fluorenyl)zirconium dichloride, diphenylmethylene(7-methyl-1-indenyl)(2,7-di-t-butyl-9-fluorenyl)zirconium dichloride, diphenylmethylene(2-phenyl-1-indenyl)(2,7-di-t-butyl-9-fluorenyl)zirconium dichloride, diphenylmethylene(3-phenyl-1-indenyl)(2,7-di-t-butyl-9-fluorenyl)zirconium dichloride, diphenylmethylene(4-phenyl-1-indenyl)(2,7-di-t-butyl-9-fluorenyl)zirconium dichloride, diphenylmethylene(5-phenyl-1-indenyl)(2,7-di-t-butyl-9-fluorenyl)zirconium dichloride, diphenylmethylene(6-phenyl-1-indenyl)(2,7-di-t-butyl-9-fluorenyl)zirconium dichloride, diphenylmethylene(7-phenyl-1-indenyl)(2,7-di-t-butyl-9-fluorenyl)zirconium dichloride, diphenylmethylene(2,3-dimethyl-1-indenyl)(2,7-di-t-butyl-9-fluorenyl)zirconium dichloride, diphenylmethylene(2,4-dimethyl-1-indenyl)(2,7-di-t-butyl-9-fluorenyl)zirconium dichloride, diphenylmethylene(2,5-dimethyl-1-indenyl)(2,7-di-t-butyl-9-fluorenyl)zirconium dichloride, diphenylmethylene(2,6-dimethyl-1-indenyl)(2,7-di-t-butyl-9-fluorenyl)zirconium dichloride, diphenylmethylene(2,7-dimethyl-1-indenyl)(2,7-di-t-butyl-9-fluorenyl)zirconium dichloride, diphenylmethylene(3,4-dimethyl-1-indenyl)(2,7-di-t-butyl-9-fluorenyl) zirconium dichloride, diphenylmethylene(3,5-dimethyl-1-indenyl)(2,7-di-t-butyl-9-fluorenyl)zirconium dichloride, diphenylmethylene(3,6-dimethyl-1-indenyl)(2,7-di-t-butyl-9-fluorenyl) zirconium dichloride, diphenylmethylene(3,7-dimethyl-1-indenyl)(2,7-di-t-butyl-9-fluorenyl)zirconium dichloride, diphenylmethylene(4,5-dimethyl-1-indenyl)(2,7-di-t-butyl-9-fluorenyl)zirconium dichloride, diphenylmethylene(4,6-dimethyl-1-indenyl)(2,7-di-t-butyl-9-fluorenyl)zirconium dichloride, diphenylmethylene(4,7-dimethyl-1-indenyl)(2,7-di-t-butyl-9-fluorenyl)zirconium dichloride, diphenylmethylene(5,6-dimethyl-1-indenyl)(2,7-di-t-butyl-9-fluorenyl)zirconium dichloride, diphenylmethylene(5,7-dimethyl-1-indenyl)(2,7-di-t-butyl-9-fluorenyl)zirconium dichloride, diphenylmethylene(6,7-dimethyl-1-indenyl)(2,7-di-t-butyl-9-fluorenyl) zirconium dichloride, diphenylmethylene(2-methyl-4-phenyl-1-indenyl)(2,7-di-t-butyl-9-fluorenyl)zirconium dichloride, diphenylmethylene(2-methyl-4,5-benzo-1-indenyl)(2,7-di-t-butyl-9-fluorenyl)zirconium dichloride, diphenylmethylene(2-methyl-5,6-benzo-1-indenyl)(2,7-di-t-butyl-9-fluorenyl)zirconium dichloride, diphenylmethylene(2-methyl-4-(α-naphthyl)-1-indenyl)(2,7-di-t-butyl-9-fluorenyl)zirconium dichloride, and diphenylmethylene(2-methyl-4-(β-naphthyl)-1-indenyl)(2,7-di-t-butyl-9-fluorenyl)zirconium dichloride. The examples further include compounds in which $X^2$ of the transition metal compound is substituted with fluorine atom, bromine atom or iodine atom. The examples further include compounds in which $Z^2$ of the transition metal compound is substituted with methylene group, ethylene group, isopropylidene group, methylphenylmethylene group, dimethylsilanediyl group, diphenylsilanediyl group, silacyclobutanediyl group, silacyclohexanediyl group or the like. The examples further include compounds in which $M^2$ of the transition metal compound is substituted with titanium atom or hafnium atom.

The amount of the component (b) to the component (a) in the invention is not particularly limited, and is preferably from 0.0001 to 100 times by mole, and particularly preferably from 0.001 to 10 times by mole.

Examples of the catalyst for ethylene polymer production containing the component (a) and the component (b) as the main component in the invention include catalysts comprising the component (a), the component (b), and an active co-catalyst and/or an organic metal compound.

The catalyst comprising the component (a), the component (b), and an active co-catalyst and/or an organic metal compound is described below.

Such a catalyst includes a catalyst comprising the component (a), the component (b) and a modified clay mineral treated with an organic compound (component (c)).

The clay mineral that can be used as the component (c) in the invention is fine particles comprising microcrystalline silicate as the main component. Most of clay mineral has the characteristic on its structure to have a layered structure and has various sizes of negative charge in the layer. The clay mineral greatly differs from a metal oxide having a three-dimensional structure such as silica or alumina in this point. Those clay minerals are generally classified into pyrophyllite, kaolinite, deckite and talc groups (negative charge per the chemical formula is nearly 0), smectite groups (negative charge per the chemical formula is from about 0.25 to 0.6), vermiculite groups (negative charge per the chemical formula is from about 0.6 to 0.9), mica groups (negative charge per the chemical formula is about 1), and brittle mica groups (negative charge per the chemical formula is about 2), depending on the size of layer charge. The above each group includes the respective various clay minerals. Examples of the clay mineral belonging to the smectite groups include montmorillonite, beidellite, saponite and hectorite. Examples of those clay minerals include naturally-occurring clay minerals, and clay minerals containing small amount of impurities obtained by artificial synthesis. The invention can use all of the natural clay minerals and clay minerals obtained by artificial synthesis described here, and further can use all materials belonging to the definition of clay mineral, even though not indicated above. Of those, clay minerals belonging to smectite groups and mica groups are preferred.

Those clay minerals can be used as mixtures of two or more thereof. Those clay minerals may be used directly, or may be used by newly adding and adsorbing water, or after heat dehydration treatment.

The organic compound treatment in the component (c) means that organic ions are introduced between the clay mineral layers to form an ion complex. A compound represented by the following general formula (21), (24) or (25) can be used as the organic compound used in the organic compound treatment, and of those, the compound represented by the general formula (21) is particularly preferably used.

$$[R^6R^7{}_{g-1}M^4H]_h[A]_i \quad (21)$$

$$[C]_h[A]_i \quad (24)$$

$$[M^5L^2{}_j]_h[A]_i \quad (25)$$

[A] in the compounds represented by the general formulae (21), (24) and (25) is an anion, and examples thereof include fluorine ion, chlorine ion, bromine ion, iodine ion, sulfate ion, nitrate ion, phosphate ion, perchlorate ion, oxalate ion, citrate ion, succinate ion, tetrafluoroborate ion, and hexafluorophosphate ion.

h and i in the compounds represented by the general formulae (21), (24) and (25) are an integer selected such that charge is balanced.

$[R^6R^7{}_{g-1}M^4H]$ in the compound represented by the general formula (21) is a cation, wherein $M^4$ is an element selected from group 15 and group 16 in the periodic table, $R^6$ represents a $C_{1-30}$ hydrocarbon group, $R^7$ each independently represents hydrogen atom or a $C_{1-30}$ hydrocarbon group, and g is 3 when $M^4$ is an element of group 15, and is 2 when $M^4$ is an element of group 16.

$M^4$ is an element selected from group 15 and group 16 in the periodic table, and examples thereof include oxygen, nitrogen, sulfur and phosphor. Examples of the $C_{1-30}$ hydrocarbon group used in $R^6$ and $R^7$ include methyl group, ethyl group, n-propyl group, isopropyl group, allyl group, n-butyl group, isobutyl group, sec-butyl group, tert-butyl group, n-pentyl group, isopentyl group, 2-methylbutyl group, 1-methylbutyl group, 1-ethylpropyl group, neopentyl group, tert-pentyl group, cyclopentyl group, n-hexyl group, isohexyl group, 3-methylpentyl group, 4-methylpentyl group, neohexyl group, 2,3-dimethylbutyl group, 2,2-dimethylbutyl group, 4-methyl-2-pentyl, 3,3-dimethyl-2-butyl group, 1,1-dimethylbutyl group, 2,3-dimethyl-2-butyl group, cyclohexyl group, n-heptyl group, cycloheptyl group, 2-methylcyclohexyl group, 3-methylcyclohexyl group, 4-methylcyclohexyl group, n-octyl group, isooctyl group, 1,5-dimethylhexyl group, 1-methylheptyl group, 2-ethylhexyl group, tert-octyl group, 2,3-dimethylcyclohexyl group, 2-(1-cyclohexenyl)ethyl group, n-nonyl group, n-decyl group, isodecyl group, geranyl group, n-undecyl group, n-dodecyl group, cyclododecyl group, n-tridecyl group, n-tetradecyl group, n-pentadecyl group, n-hexadecyl group, n-heptadecyl group, n-octadecyl group, n-nonadecyl group, n-eicosyl group, n-heneicosyl group, n-docosyl group, n-tricosyl group, oleyl group, vehenyl group, phenyl group, o-tolyl group, m-tolyl group, p-tolyl group, 2-ethylphenyl group, 3-ethylphenyl group, 4-ethylphenyl group, 3-isopropylphenyl group, 2-isopropylphenyl group, 4-isopropylphenyl group, 2-tert-butylphenyl group, 4-n-butylphenyl group, 4-sec-butylphenyl group, 4-tert-butylphenyl group, 2,3-xylyl group, 2,4-xylyl group, 2,5-xylyl group, 2,6-xylyl group, 3,4-xylyl group, 3,5-xylyl group, 2,6-diethylphenyl group, 2-isopropyl-6-methylphenyl group, 2-chlorophenyl group, 3-chlorophenyl group, 4-chlorophenyl group, 2-bromophenyl group, 3-bromophenyl group, 4-bromophenyl group, 2-methoxyphenyl group, 3-methoxyphenyl group, 4-methoxyphenyl group, 2-ethoxyphenyl group, 3-ethoxyphenyl group, 4-ethoxyphenyl group, 1-naphthyl group, 2-naphthyl group, 1-fluorenyl group, 2-fluorenyl group, 3-fluorenyl group, 4-fluorenyl group, 2,3-dihydroindene-5-yl group, 2-biphenyl group, 4-biphenyl group and p-trimethylsilylphenyl group. $R^6$ and $R^7$ may be bonded each other.

Of the specific compounds represented by the general formula (21), examples of the compound when $M^4$ is nitrogen atom include aliphatic amine hydrochlorides such as methylamine hydrochloride, ethylamine hydrochloride, n-propylamine hydrochloride, isopropylamine hydrochloride, n-butylamine hydrochloride, isobutylamine hydrochloride, tert-butylamine hydrochloride, n-pentylamine hydrochloride, isopentylamine hydrochloride, 2-methylbutylamine hydrochloride, neopentylamine hydrochloride, tert-pentylamine hydrochloride, n-hexylamine hydrochloride, isohexylamine hydrochloride, n-heptylamine hydrochloride, n-octylamine hydrochloride, n-nonylamine hydrochloride, n-decylamine hydrochloride, n-undecylamine hydrochloride, n-dodecylamine hydrochloride, n-tetradecylamine hydrochloride, n-hexadecylamine hydrochloride, n-octadecylamine hydrochloride, allylamine hydrochloride, cyclopentylamine hydrochloride, dimethylamine hydrochloride, diethylamine hydrochloride, diallylamine hydrochloride, trimethylamine hydrochloride, tri-n-butylamine hydrochloride, triallylamine hydrochloride, hexylamine hydrochloride, 2-aminoheptane hydrochloride, 3-aminoheptane hydrochloride, n-heptylamine hydrochloride, 1,5-dimethylhexylamine hydrochloride, 1-methylheptylamine hydrochloride, n-octylamine hydrochloride, tert-octylamine hydrochloride, nonylamine hydrochloride, decylamine hydrochloride, undecylamine hydrochloride, dodecylamine hydrochloride, tridecylamine hydrochloride, tetradecylamine hydrochloride, pentadecylamine hydrochloride, hexadecylamine hydrochloride, heptadecylamine hydrochloride, octadecylamine hydrochloride, nonadecylamine hydrochloride, cyclohexylamine hydrochloride, cycloheptylamine hydrochloride, 2-methylcyclohexylamine hydrochloride, 3-methylcyclohexylamine hydrochloride, 4-methylcyclohexylamine hydrochloride, 2,3-dimethylcyclohexylamine hydrochloride, cyclododecylamine hydrochloride, 2-(1-cyclohexenyl)ethylamine hydrochloride, geranylamine hydrochloride, N-methylhexylamine hydrochloride, dihexylamine hydrochloride, bis(2-ethylhexyl)amine hydrochloride, dioctylamine hydrochloride, didecylamine hydrochloride, N-methylcyclohexylamine hydrochloride, N-ethylcyclohexylamine hydrochloride, N-isopropylcyclohexylamine hydrochloride, N-tert-butylcyclohexylamine hydrochloride, N-allylcyclohexylamine hydrochloride, N,N-dimethyloctylamine hydrochloride, N,N-dimethylundecylamine hydrochloride, N,N-dimethyldodecylamine hydrochloride, N,N-dimethyl-n-tetradecylamine hydrochloride, N,N-dimethyl-n-hexadecylamine hydrochloride, N,N-dimethyl-n-octadecylamine hydrochloride, N,N-dimethyl-n-eicosylamine hydrochloride, N,N-dimethyl-n-docosylamine hydrochloride, N,N-dimethyloleylamine hydrochloride, N,N-dimethyl-vehenylamine hydrochloride, trihexylamine hydrochloride, triisooctylamine hydrochloride, trioctylamine hydrochloride, triisodecylamine hydrochloride, tridodecylamine hydrochloride, N-methyl-N-octadecyl-1-octadecylamine hydrochloride, N,N-dimethylcyclohexylamine hydrochloride, N,N-dimethylcyclohexylmethylamine hydrochloride, N,N-diethylcyclohexylamine hydrochloride, N-methyldioctylamine hydrochloride, N-methyldiundecylamine hydrochloride, N-methyldidodecylamine hydrochloride, N-methyl-di(n-tetradecyl)amine hydrochloride, N-methyl-di(n-hexadecylamine) hydrochloride, N-methyl-di(n-octadecylamine) hydrochloride, N-methyl-di(n-eicosyl)amine hydrochloride, N-methyl-di(n-docosyl)amine hydrochloride, N-methyldioleylamine hydrochloride, N,N-methyldivehenylamine hydrochloride, pyrrolidine hydrochloride, piperidine hydrochloride, 2,5-dimethylpyrrolidine hydrochloride, 2-methylpiperidine hydrochloride, 3-methylpiperidine hydrochloride, 4-methylpiperidine hydrochloride, 2,6-dimethylpiperidine hydrochloride, 3,3-dimethylpiperidine hydrochloride, 3,5-dimethylpiperidine hydrochloride, 2-ethylpiperidine hydrochloride, 2,2,6,6-tetramethylpiperidine hydrochloride, 1-methylpyrrolidine hydrochloride, 1-methylpiperidine hydrochloride, 1-ethylpiperidine hydrochloride, 1-butylpyrrolidine hydrochloride and 1,2,2,6,6-pentamethylpiperidine hydrochloride; aromatic amine hydrochlorides such as aniline hydrochloride, N-methylaniline hydrochloride, N-ethylaniline hydrochloride, N-allylaniline hydrochloride, o-toluidine hydrochloride, m-toluidine hydrochloride, p-toluidine hydrochloride, N,N-dimethylaniline hydrochloride, N-methyl-o-toluidine hydrochloride, N-methyl-m-toluidine hydrochloride, N-methyl-p-toluidine hydrochloride, N-ethyl-o-toluidine hydrochloride, N-ethyl-m-toluidine hydrochloride, N-ethyl-p-toluidine hydrochloride, N-allyl-o-toluidine hydrochloride, N-allyl-m-toluidine hydrochloride, N-allyl-p-toluidine hydrochloride, N-propyl-o-toluidine hydrochloride, N-propyl-m-toluidine hydrochloride, N-propyl-p-toluidine hydrochloride, 2,3-dimethylaniline hydrochloride, 2,4-dimethylaniline hydrochloride, 2,5-dimethylaniline hydrochloride, 2,6-dimethylaniline hydrochloride, 3,4-dimethylaniline hydrochloride, 3,5-dimethylaniline hydrochloride, 2-ethylaniline hydrochloride, 3-ethylaniline hydrochloride, 4-ethylaniline hydrochloride, N,N-diethylaniline hydrochloride, 2-isopropylaniline hydrochloride, 4-isopropylaniline hydrochloride, 2-tert-butylaniline hydrochloride, 4-n-butylaniline hydrochloride, 4-sec-butylaniline hydrochloride, 4-tert-butylaniline hydrochloride, 2,6-diethylaniline hydrochloride, 2-isopropyl-6-methylaniline hydrochloride, 2-chloroaniline hydrochloride, 3-chloroaniline hydrochloride, 4-chloroaniline hydrochloride, 2-bromoaniline hydrochloride, 3-bromoaniline hydrochloride, 4-bromoaniline hydrochloride, o-anisidine hydrochloride, m-anisidine hydrochloride, p-anisidine hydrochloride, o-phenetidine hydrochloride, m-phenetidine hydrochloride, p-phenetidine hydrochloride, 1-aminonaphthalene hydrochloride, 2-aminonaphthalene hydrochloride, 1-aminofluorene hydrochloride, 2-aminofluorene hydrochloride, 3-aminofluorene hydrochloride, 4-aminofluorene hydrochloride, 5-aminoindane hydrochloride, 2-aminobiphenyl hydrochloride, 4-aminobiphenyl hydrochloride, N,2,3-trimethylaniline hydrochloride, N,2,4-trimethylaniline hydrochloride, N,2,5-trimethylaniline hydrochloride, N,2,6-trimethylaniline hydrochloride, N,3,4-trimethylaniline hydrochloride, N,3,5-trimethylaniline hydrochloride, N-methyl-2-ethylaniline hydrochloride, N-methyl-3-ethylaniline hydrochloride, N-methyl-4-ethylaniline hydrochloride, N-methyl-6-ethyl-o-toluidine hydrochloride, N-methyl-2-isopropylaniline hydrochloride, N-methyl-4-isopropylaniline hydrochloride, N-methyl-2-tert-butylaniline hydrochloride, N-methyl-4-n-butylaniline hydrochloride, N-methyl-4-sec-butylaniline hydrochloride, N-methyl-4-tert-butylaniline hydrochloride, N-methyl-2,6-diethylaniline hydrochloride, N-methyl-2-isopropyl-6-methylaniline hydrochloride, N-methyl-p-anisidine hydrochloride, N-ethyl-2,3-anisidine hydrochloride, N,N-dimethyl-o-toluidine hydrochloride, N,N-dimethyl-m-toluidine hydrochloride, N,N-dimethyl-p-toluidine hydrochloride, N,N,2,3-tetramethylaniline hydrochloride, N,N,2,4-tetramethylaniline hydrochloride, N,N,2,5-tetramethylaniline hydrochloride, N,N,2,6-tetramethylaniline hydrochloride, N,N,3,4-tetramethylaniline hydrochloride, N,N,3,5-tetramethylaniline hydrochloride, N,N-dimethyl-2-ethylaniline hydrochloride, N,N-dimethyl-3-ethylaniline hydrochloride, N,N-dimethyl-4-ethylaniline hydrochloride, N,N-dimethyl-6-ethyl-o-toluidine hydrochloride, N,N-dimethyl-2-isopropylaniline hydrochloride, N,N-dimethyl-4-isopropylaniline hydrochloride, N,N-dimethyl-2-tert-butylaniline hydrochloride, N,N-dimethyl-4-n-butylaniline hydrochloride, N,N-dimethyl-4-sec-butylaniline hydrochloride, N,N-dimethyl-4-tert-butylaniline hydrochloride, N,N-dimethyl-2,6-diethylaniline hydrochloride, N,N-dimethyl-2-isopropyl-6-methylaniline hydrochloride, N,N-dimethyl-2-chloroaniline hydrochloride, N,N-dimethyl-3-chloroaniline hydrochloride, N,N-dimethyy-4-chloroaniline hydrochloride, N,N-dimethyl-2-bromoaniline hydrochloride, N,N-dimethyl-3-bromoaniline hydrochloride, N,N-dimethyl-4-bromoaniline hydrochloride, N,N-dimethyl-o-anisidine hydrochloride, N,N-dimethyl-m-anisidine hydrochloride, N,N-dimethyl-p-anisidine hydrochloride, N,N-dimethyl-o-phenetidine hydrochloride, N,N-dimethyl-m-phenetidine hydrochloride, N,N-dimethyl-p-phenetidine hydrochloride, N,N-dimethyl-1-aminonaphthalene hydrochloride, N,N-dimethyl-2-aminonaphthalene hydrochloride, N,N-dimethyl-1-aminofluorene hydrochloride, N,N-dimethyl-2-aminofluorene hydrochloride, N,N-dimethyl-3-aminofluorene hydrochloride, N,N-dimethyl-4-aminofluorene hydrochloride, N,N-dimethyl-5-aminoindane hydrochloride, N,N-dimethyl-2-aminobiphenyl hydrochloride, N,N-dimethyl-4-aminobiphenyl hydrochloride or N,N-dimethyl-p-trimethylsilylaniline hydrochloride; and compounds in which the hydrochloride of the above compounds is substituted with hydrofluoride, hydrobromide, hydroiodide or sulfate.

Of the compounds represented by the general formula (21), examples of the compound wherein $M^4$ is oxygen atom include compounds such as methyl ether hydrochloride, ethyl ether hydrochloride, n-butyl ether hydrochloride, tetrahydrofuran hydrochloride and phenyl ether hydrochloride; and compounds in which the hydrochloride of the above compounds is substituted with hydrofluoride, hydrobromide, hydroiodide or sulfate.

Of the compounds represented by the general formula (21), examples of the compound wherein $M^4$ is sulfur atom include diethyl sulfonium fluoride, diethyl sulfonium chloride, diethyl sulfonium bromide, diethyl sulfonium iodide, dimethyl sulfonium fluoride, dimethyl sulfonium chloride, dimethyl sulfonium bromide and dimethyl sulfonium iodide.

Of the compounds represented by the general formula (21), examples of the compound wherein $M^4$ is phosphor atom include compounds such as triphenylphosphine hydrochloride, tri(o-tolyl)phosphine hydrochloride, tri(p-tolyl)phosphine hydrochloride and trimesylphosphine hydrochloride; and compounds in which the hydrochloride of the above compounds is substituted with hydrofluoride, hydrobromide, hydroiodide or sulfate.

[C] in the compound represented by the general formula (24) is a carbonium cation or a tropylium cation. Specific examples of the compound represented by the general formula (24) include trityl bromide, trityl chloride, trityl tetrafluoroborate, trityl hexafluorophosphate, tropylium bromide, tropylium chloride, tropylium tetrafluoroborate and tropylium hexafluorophosphate.

$M^4$ in the compound represented by the general formula (25) is a cation such as lithium atom, iron atom or silver atom, $L^2$ is a Lewis base such as ethers, aliphatic amines, aromatic amines or phosphines, or a substituted or unsubstituted cyclopentadienyl group, and j is $0 \leq j \leq 2$. Specific examples of the compound represented by the general formula (25) include ferrocenium bromide, ferrocenium chloride, ferrocenium tetrafluoroborate and ferrocenium hexafluorophosphate.

The organic compound treatment in the component (C) is preferably conducted by selecting the conditions that the concentration of clay mineral is from 0.1 to 30% by weight and the treatment temperature is from 0 to 150° C. The organic compound may be used by preparing as a solid and dissolving the solid in a solvent, or may be directly used by preparing a solution of the organic compound by chemical reaction in a solvent. The reaction amount ratio between the clay mineral and the organic compound is preferably that the organic compound is used in an amount of equivalent or more to the exchangeable cation in clay mineral. Examples of the treatment solvent that can be used include aliphatic hydrocarbons such as pentane, hexane or heptane; aromatic hydrocarbons such as benzene or toluene; alcohols such as ethyl alcohol or methyl alcohol; ethers such as ethyl ether or n-butyl ether; halogenated hydrocarbons such as methylene chloride or chloroform; acetone; 1,4-dioxane; tetrahydrofuran; and water. Of those, alcohols or water can preferably be used alone or as one component of a solvent.

The catalyst comprising the component (a), the component (b) and the component (c) used in the invention is obtained by, for example, contacting the component (a), the component (b) and the component (c) in an organic solvent. The contact method includes a method of adding the component (b) to a contact product of the component (a) and the component (c), a method of adding the component (a) to a contact product of the component (b) and the component (c), a method of adding the component (c) to a contact product of the component (a) and the component (b), a method of adding a contact product of the component (a) and the component (b) to the component (c), and a method of simultaneously contacting the component (a), the component (b) and the component (c).

Examples of the solvent used when contacted include aliphatic hydrocarbons such as butane, pentane, hexane, heptane, octane, nonane, decane, cyclopentane or cyclohexane; aromatic hydrocarbons such as benzene, toluene or xylene; ethers such as ethyl ether or n-butyl ether; halogenated hydrocarbons such as methylene chloride or chloroform; 1,4-dioxane; acetonitrile; and tetrahydrofuran.

The temperature when contacted is preferably selected from a range of from 0 to 200° C.

The amount of each component used is that the component (a) is preferably from 0.0001 to 100 mmol, and particularly preferably from 0.001 to 10 mmol, per 1 g of the component (c). Furthermore, the component (b) is preferably from 0.0001 to 100 mmol, and particularly preferably from 0.001 to 10 mmol, per 1 g of the component (c).

The contact product of the component (a), the component (b) and the component (c) thus prepared may be used without cleaning, or may be used after cleaning. When the component (a) or the component (b) is a dichloro form, it is preferred to further add an organoaluminum compound (component (d)) represented by the following general formula (22).

$$AlR^8_3 \quad (22)$$

Furthermore, the component (d) can be added for the purpose of removing impurities in the component (c), a polymerization solvent and an olefin.

$R^8$ in the formula (22) each independently represents a $C_{1-20}$ hydrocarbon group. Examples of the $C_{1-20}$ hydrocarbon group used in $R^8$ include methyl group, ethyl group, n-propyl group, isopropyl group, n-butyl group, isobutyl group, sec-butyl group, tert-butyl group, n-pentyl group, isopentyl group, 2-methylbutyl group, neopentyl group, tert-pentyl group, n-hexyl group, isohexyl group, 3-methylpentyl group, 4-methylpentyl group, neohexyl group, 2,3-dimethylbutyl group, 2,2-dimethylbutyl group, 4-methyl-2-pentyl, 3,3-dimethyl-2-butyl group, 1,1-dimethylbutyl group, 2,3-dimethyl-2-butyl group, n-pentyl group, isopentyl group, n-octyl group, n-nonyl group, n-decyl group, n-dodecyl group, n-tetradecyl group, n-hexadecyl group, n-octadecyl group, phenyl group and cyclohexyl group.

Specific examples of the component (d) include trimethylaluminum, dimethylaluminum hydride, triethylaluminum, diethylaluminum hydride, tri-n-propylaluminum, di-n-propylaluminum hydride, triisopropylaluminum, diisopropylaluminum hydride, tri-n-butylaluminum, di-n-butylaluminum hydride, triisobutylaluminum, diisobutylaluminum hydride, tri-tert-butylaluminum, di-tert-butylaluminum hydride, tri-n-hexylaluminum, di-n-hexylaluminum hydride, triisohexylaluminum, diisohexylaluminum hydride, tri-n-octylaluminum, di-n-octylaluminum hydride, triisooctylaluminum and diisooctylaluminum hydride.

The catalyst comprising the component (a), the component (b), the component (c) and the component (d) is obtained by contacting the component (a), the component (b), the component (c) and the component (d) in an organic solvent, and the following methods are exemplified. A method of adding a contact product of the component (a) and the component (d) to the component (c) and then adding the component (b); a method of adding the component (a) to the component (c) and then adding a contact product of the component (b) and the component (d); a method of adding a contact product of the component (a) and the component (d) to the component (c) and then adding a contact product of the component (b) and the component (d); a method of adding the component (a) to a contact product of the component (c) and the component (d) and then adding the component (b); a method of adding a contact product of the component (a) and (d) to a contact product of the component (c) and the component (d) and then adding the component (b); a method of adding the component (a) to a contact product of the component (c) and the component (d) and then adding a contact product of the component (b) and the component (d); a method of adding a contact product of the component (a) and the component (d) to a contact product of the component (c) and the component (d) and then adding a contact product of the component (b) and the component (d); a method of adding the component (b) to a contact product of the component (a) and the component (d) and then adding the component (c); a method of adding a contact product of the component (b) and the component (d) to the component (a) and then adding the component (c); a method of adding a contact product of the component (b) and the component (d) to a contact product of the component (a) and the component (d) and then adding the component (c); a method of adding the component (b) to the component (a) and then adding a contact product of the component (c) and the component (d); a method of adding the component (b) to a contact product of the component (a) and the component (d) and then adding a contact product of the component (c) and the component (d); a method of adding a contact product of the component (b) and the component (d) to the component (a) and then adding a contact product of the component (c) and the component (d); a method of adding a contact product of the component (b) and the component (d) to a contact product of the component (a) and the component (d) and then adding a contact product of the component (c) and the component (d); a method of adding the component (b) to a contact product of the component (a) and the component (c) and then adding the component (d); a method of adding the component (a) to a contact product of the component (b) and the component (c) and then adding the component (d); a method of adding the component (c) to a contact product of the component (a) and the component (b) and then adding the component (d); a method of adding a contact product of the component (a) and the component (b) to the component (c) and then adding the component (d); a method of adding a contact product of the component (a) and the component (c) to the component (b) and then adding the component (d); a method of adding a contact product of the component (b) and the component (c) to the component (a) and then adding the component (d); and a method of adding a contact product of the component (b) and the component (c) to a contact product of the component (a) and the component (c) and then adding the component (d).

The amount of the component (d) used in the invention is preferably from 0.1 to 10,000 moles, and particularly preferably from 1 to 1,000 moles, per 1 mole of the sum of mole number of the component (a) and the component (b).

Examples of the catalyst containing the component (a) and the component (b) as the main component of the invention include, in addition to the catalyst comprising the component (a), the component (b) and the component (c), a catalyst comprising the component (a), the component (b) and the component (d); a catalyst further comprising water; a catalyst comprising the component (a), the component (b) and an organomagnesium compound (component (e)) represented by the following general formula (26);

$$MgR^9_2 \tag{26}$$

a catalyst further comprising the component (d); a catalyst comprising the component (a), the component (b) and an organolithium compound (component (f)) represented by the following general formula (27);

$$LiR^{10} \tag{27}$$

a catalyst further comprising the component (d); a catalyst comprising the component (a), the component (b) and aluminooxane (component (g)) represented by the following general formula (28)

[Chem. 8]

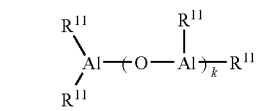

(28)

and/or the following general formula (29);

[Chem. 9]

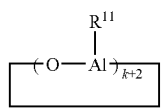

(29)

a catalyst further comprising the component (d), the component (e) and/or the component (f); a catalyst comprising the component (a), the component (b) and at least one salt selected from a protonic acid salt (component (h)) represented by the following general formula (30)

$$[R^{12}R^{13}_{m-1}M^5H][M^6Ar_4] \tag{30}$$

a Lewis acid salt (component (i)) represented by the following formula (31)

$$[C][M^6Ar_4] \tag{31}$$

and a metal salt (component (j)) represented by the following general formula (32);

$$[M^7L^3_n][M^6Ar_4] \tag{32}$$

a catalyst further comprising the component (d) and/or the component (g); a catalyst comprising the component (a) and a Lewis acid (component (k)) represented by the following general formula (33);

$$M^8Ar_3 \tag{33}$$

a catalyst further comprising the component (d) and/or the component (g); a catalyst comprising the component (a), the component (b), the component (k) and at least one salt selected from the component (h), the component (i) and the component (j); a catalyst further comprising the component (d) and/or the component (g); a catalyst comprising the component (a), the component (b) and magnesium chloride (component (l)); a catalyst further comprising the component (d) and/or the component (g); a catalyst comprising the component (a), the component (b) and a sulfonate (component (m)); a catalyst further comprising the component (d) and/or the component (g); a catalyst comprising the component (a), the component (b) and carboxylic acid (component (n)); a catalyst further comprising the component (d) and/or the component (g); a catalyst comprising the component (a), the component (b), the component (g) and an inorganic oxide (component (o)); a catalyst further comprising the component (d), the component (e) and/or the component (f); a catalyst comprising the component (a), the component (b), the component (o) and at least one salt selected from the component (h), the component (i) and the component (j); a catalyst further comprising the component (d), the component (e) and/or the component (f); a catalyst comprising the component (a), the component (b), an inorganic halide (component (p)) and at least one salt selected from the component (h), the component (i) and the component (j); a catalyst further comprising the component (d), the component (e) and/or the component (f); and a catalyst comprising the component (a), the component (b), clay mineral (component (q)) and the component (d).

$R^9$ in the component (e) represented by the general formula (26) used in the invention each independently represents a halogen atom or a $C_{1-20}$ hydrocarbon group, with the proviso that at least one $R^9$ is a $C_{1-20}$ hydrocarbon group.

Examples of the halogen atom used in $R^9$ in the component (e) include fluorine atom, chlorine atom, bromine atom and iodine atom. Examples of the $C_{1-20}$ hydrocarbon group include methyl group, ethyl group, n-propyl group, isopropyl group, n-butyl group, isobutyl group, sec-butyl group, tert-butyl group, n-pentyl group, isopentyl group, 2-methylbutyl group, neopentyl group, tert-pentyl group, n-hexyl group, isohexyl group, 3-methylpentyl group, 4-methylpentyl group, neohexyl group, 2,3-dimethylbutyl group, 2,2-dimethylbutyl group, 4-methyl-2-pentyl, 3,3-dimethyl-2-butyl group, 1,1-dimethylbutyl group, 2,3-dimethyl-2-butyl group, n-pentyl group, isopentyl group, n-octyl group, n-nonyl group, n-decyl group, n-dodecyl group, n-tetradecyl group, n-hexadecyl group, n-octadecyl group, phenyl group and cyclohexyl group.

Specific examples of the component (e) include dimethylmagnesium, diethylmagnesium, dibutylmagnesium, ethylbutylmagnesium, methylmagnesium chloride, methylmagnesium bromide, ethylmagnesium chloride, ethylmagnesium bromide, isopropylmagnesium chloride, isopropylmagnesium bromide, butylmagnesium chloride and butylmagnesium bromide.

The amount of the component (e) used in the invention is preferably from 0.1 to 10,000 moles, and particularly preferably from 1 to 1,000 moles, per 1 mole of the sum of mole number of the component (a) and the component (b).

$R^{10}$ in the component (f) represented by the general formula (27) used in the invention is a $C_{1-20}$ hydrocarbon group.

Examples of the $C_{1-20}$ hydrocarbon group used in $R^{10}$ in the component (f) include methyl group, ethyl group, n-propyl group, isopropyl group, n-butyl group, isobutyl group, sec-butyl group, tert-butyl group, n-pentyl group, isopentyl group, 2-methylbutyl group, neopentyl group, tert-pentyl group, n-hexyl group, isohexyl group, 3-methylpentyl group, 4-methylpentyl group, neohexyl group, 2,3-dimethylbutyl group, 2,2-dimethylbutyl group, 4-methyl-2-pentyl, 3,3-dimethyl-2-butyl group, 1,1-dimethylbutyl group, 2,3-dimethyl-2-butyl group, n-pentyl group, isopentyl group, n-octyl group, n-nonyl group, n-decyl group, n-dodecyl group, n-tetradecyl group, n-hexadecyl group, n-octadecyl group, phenyl group and cyclohexyl group.

Specific examples of the component (f) include methyllithium, ethyllithium and butyllithium.

The amount of the component (f) used in the invention is preferably from 0.1 to 10,000 moles, and particularly preferably from 1 to 1,000 moles, per 1 mole of the sum of mole number of the component (a) and the component (b).

$R^{11}$ in the component (g) represented by the general formula (28) or (29) used in the invention each independently represents hydrogen atom or a $C_{1-20}$ hydrocarbon group, and k is from 2 to 60.

Examples of the $C_{1-20}$ hydrocarbon group used in $R^1$ in the component (g) include methyl group, ethyl group, propyl group, isopropyl group, isobutyl group and t-butyl group. The component (g) may contain a monomer, a dimer and an oligomer of an organoaluminum compound.

The component (g) can generally be obtained by reacting an organoaluminum compound and water in an organic solvent, or reacting an organoaluminum compound and a salt or a hydrate of an oxide in an organic solvent. Materials produced by the conventional methods can also be used.

The amount of the component (g) used in the invention is preferably from 0.01 to 1,000,000 moles, and particularly preferably from 1 to 100,000 moles, per 1 mole of the sum of mole number of the component (a) and the component (b).

$[R^{12}R^{13}_{k-1}M^5H]$ in the component (h) represented by the general formula (30) used in the invention is a cation, and $[M^6Ar_4]$ is an anion.

$M^5$ in the component (h) is an element selected from group 15 or group 16 in the periodic table, and $R^{12}$ is a $C_{1-30}$ hydrocarbon group, $R^{13}$ each independently is hydrogen atom or a $C_{1-30}$ hydrocarbon group, m is 3 when $M^5$ is an element of group 15 and is 2 when $M^5$ is an element of group 16, $M^6$ is boron, aluminum or gallium, and Ar each independently is a $C_{6-20}$ halogen-substituted aryl group.

Examples of the $C_{1-30}$ hydrocarbon group used in $R^{12}$ and $R^{13}$ in the component (h) include methyl group, ethyl group, n-propyl group, isopropyl group, allyl group, n-butyl group, isobutyl group, sec-butyl group, tert-butyl group, n-pentyl group, isopentyl group, 2-methlbutyl group, 1-methylbutyl group, 1-ethylpropyl group, neopentyl group, tert-pentyl group, cyclopentyl group, n-hexyl group, isohexyl group, 3-methylpentyl group, 4-methylpentyl group, heohexyl group, 2,3-dimethylbutyl group, 2,2-dimethylbutyl group, 4-methyl-2-pentyl, 3,3-dimethyl-2-butyl group, 1,1-dimethylbutyl group, 2,3-dimethyl-2-butyl group, cyclohexyl group, n-heptyl group, cycloheptyl group, 2-methylcyclohexyl group, 3-methylcyclohexyl group, 4-methylcyclohexyl group, n-octyl group, isooctyl group, 1,5-dimethylhexyl group, 1-methylheptyl group, 2-ethylhexyl group, tert-octyl group, 2,3-dimethylcyclohexyl group, 2-(1-cyclohexenyl) ethyl group, n-nonyl group, n-decyl group, isodecyl group, geranyl group, n-undecyl group, n-dodecyl group, cyclododecyl group, n-tridecyl group, n-tetradecyl group, n-pentadecyl group, n-hexadecyl group, n-heptadecyl group, n-octadecyl group, n-nonadecyl group, n-eicosyl group, n-heneicosyl group, n-docosyl group, n-tricosyl group, oleyl group, vehenyl group, phenyl group, o-tolyl group, m-tolyl group, p-tolyl group, 2-ethylphenyl group, 3-ethylphenyl group, 4-ethylphenyl group, 2-isoproppylphenyl group, 3-isopropylphenyl group, 4-isopropylphenyl group, 2-tert-butylphenyl group, 4-n-butylphenyl group, 4-sec-butylphenyl group, 4-tert-butylphenyl group, 2,3-xylyl group, 2,4-xylyl group, 2,5-xylyl group, 2,6-xylyl group, 3,4-xylyl group, 3,5-xylyl group, 2,6-diethylphenyl group, 2-isopropyl-6-methylphenyl group, 2-chlorophenyl group, 3-chlorophenyl group, 4-chlorophenyl group, 2-bromophenyl group, 3-bromophenyl group, 4-bromophenyl group, 2-methoxyphenyl group, 3-methoxyphenyl group, 4-methoxyphenyl group, 2-ethoxyphenyl group, 3-ethoxyphenyl group, 4-ethoxyphenyl group, 1-naphthyl group, 2-naphthyl group, 1-fluorenyl group, 2-fluorenyl group, 3-fluorenyl group, 4-fluorenyl group, 2,3-dihydroindene-5-yl group, 2-biphenyl group, 4-biphenyl group and p-trimethylsilylphenyl group. $R^{12}$ and $R^{13}$ may be bonded with each other.

The $C_{6-20}$ halogen-substituted aryl group used in Ar in the component (h) includes pentafluorophenyl group.

Specific examples of the component (h) include diethyloxoniumtetrakis(pentafluorophenyl)borate, dimethyloxoniumtetrakis(pentafluorophenyl)borate, tetramethylene-oxoniumtetrakis(pentafluorophenyl)borate, hydroniumtetrakis(pentafluorophenyl)borate, trimethylammoniumtetrakis(pentafluorophenyl)borate, tri(n-butyl)ammoniumtetrakis(pentafluorophenyl)borate, N,N-dimethylaniliniumtetrakis(pentafluorophenyl)borate, diethyloxoniumtetrakis (pentafluorophenyl)aluminate, dimethyloxoniumtetrakis (pentafluorophenyl)aluminate, tetramethyleneoxoniumtetrakis(pentafluorophenyl)aluminate, hydroniumtetrakis(pentafluorophenyl)aluminate, N,N-dimethylaniliniumtetrakis (pentafluorophenyl)aluminate, and tri(n-butyl) ammoniumtetrakis(pentafluorophenyl)aluminate.

[C] in the component (i) represented by the general formula (31) used in the invention is a carbonium cation or a tropilium cation.

Specific examples of the component (i) include trityltetrakis(pentafluorophenyl)borate, trityltetrakis(pentafluorophenyl)aluminate, tropiliumtetrakis(pentafluorophenyl) borate and tropiliumtetrakis(pentafluorophenyl)aluminate.

$M^7$ in the component (j) represented by the general formula (32) used in the invention is a cation of lithium atom, iron atom and silver atom. $L^3$ is a Lewis base such as ethers, aliphatic amines, aromatic amines or phosphines; or a substituted or unsubstituted cyclopentadienyl group, and m is $0 \leq m \leq 2$.

Specific examples of the component (j) include a lithium salt such as lithiumtetrakis(pentafluorophenyl)borate or lithiumtetrakis(pentafluorophenyl)aluminate; its ether complex; a ferrocenium salt such as ferroceniumtetrakis(pentafluorophenyl)borate or ferroceniumtetrakis(pentafluorophenyl) aluminate; and a silver salt such as silvertetrakis(pentafluorophenyl)borate or silvertetrakis(pentafluorophenyl) aluminate.

$M^9$ in the component (k) represented by the general formula (33) used in the invention is boron or aluminum. Specific example of the component (k) include tris(pentafluorophenyl)borane, tris(2,3,5,6-tetrafluorophenyl)borane, tris (2,3,4,5-tetraphenylphenyl)borane, tris(3,4,5-trifluorophenyl)borane, phenylbis(pentafluorophenyl)borane and tris(3,4,5-trifluorophenyl)aluminum.

The component (m) used in the invention is a silfonate, and examples of the sulfonate include lithium trifluoromethanesulfonate, sodium trifluoromethanesulfonate, potassium trifluoromethanesulfonate, calcium bis(trifluoromethanesulfonate), barium bis(trifluoromethanesulfonate), titanium tris(trifluoromethanesulfonate), titanium tetrakis(trifluoromethanesulfonate), zirconium tetrakis(trifluoromethanesulfonate), hafnium tetrakis(trifluoromethanesulfonate), niobium pentakis(trifluoromethanesulfonate), tantalum pentakis (trifluoromethanesulfonate), iron tris (trifluoromethanesulfonate), silver trifluoromethanesulfonate, boron tris(trifluoromethanesulfonate), aluminum tris(trifluoromethanesulfonate), gallium tris(trifluoromethanesulfonate), tin tetrakis(trifluoromethanesulfonate), lithium pentafluorobenzenesulfonate, sodium pentafluorobenzenesulfonate, potassium pentafluorobenzenesulfonate, magnesium bis(pentafluorobenzenesulfonate), calcium bis(pentafluorobenzenesulfonate), barium bis(pentafluorobenzenesulfonate), titanium tris(pentafluorobenzenesulfonate), zirconium tetrakis(pentafluorobenzenesulfonate), hafnium tetrakis(pentafluorobenzenesulfonate), niobium pentakis(pentafluorobenzenesulfonate), tantalum pentakis(pentafluorobenzenesulfonate), iron tris (pentafluorobenzenesulfonate), silver pentafluorobenzenesulfonate, boron tris(pentafluorobenzenesulfonate), aluminum tris(pentafluorobenzenesulfonate), gallium tris (pentafluorobenzenesulfonate), tin tetrakis (pentafluorobenzenesulfonate), magnesium bis (triflluoromethanesulfonate), niobium pentakis (trifluoromethanesulfonate), magnesium bis (pentafluorobenzenesulfonate), titanium pentakis (pentafluorobenzenesulfonate) and niobium pentakis (pentafluorobenzenesulfonate).

The component (n) used in the invention is carboxylic acid. Examples of the carboxylic acid include trifluoroacetic acid, trichloroacetic acid, tribromoacetic acid, pentafluorobenzoic acid, tetrafluorotoluic acid, 2,4-(trifluoromethyl)benzoic acid and pentafluorophenylacetic acid.

The amount of the component (h), the component (i), the component (j), the component (k), the component (m) and the component (n) used in the invention is preferably from 0.1 to 1,000 moles, and particularly preferably from 0.3 to 100 moles, per 1 mole of the sum of mole number of the component (a) and the component (b).

The component (o) used in the invention is magnesium chloride. The magnesium chloride is prepared by the conventional method. The amount of the component (o) is preferably from 0.01 to 10,000 kg, and particularly preferably from 0.1 to 1,000 kg, per mole of the sum of mole number of the component (a) and the component (b). Furthermore, the magnesium chloride can be formed in a system at the time of polymerization or catalyst preparation using a halogenated organoaluminum, organomagnesium and the like, and used in polymerization.

The component (p) used in the invention is an inorganic oxide. The inorganic oxide preferably has a particle size of from 1 to 300 μm. In particular, porous fine granular particles having a particle size in a range of from 3 to 200 μm are preferred in that such particles are easy to handle at the time of catalyst preparation and polymerization process. Specific examples of the inorganic oxide include inorganic oxides of typical elements, such as silica, alumina or magnesia; inorganic oxides of transition metal elements, such as titania or zirconia; and mixtures such as silica-alumina or silica-magnesia. Those inorganic oxides generally contain salts of an alkali metal and an alkaline earth metal, such as $Na_2O$, $K_2CO_3$ or $BaSO_4$, as impurities. The fine granular inorganic oxide may be used in the state of containing those impurities, but it is preferred to use inorganic oxides having previously been subjected to operation for removing those impurities. Such porous fine granular inorganic oxides have different properties depending on its kind and production method. In the invention, inorganic oxides having a specific surface area of from 10 to 1,000 $m^2/g$, particularly from 50 to 800 $m^2/g$, and a pore volume of from 0.1 to 3 ml/g are preferred in that such inorganic oxides can support a large amount of supporting component of the transition metal compound. According to need, those inorganic oxides are burned at 100 to 1,000° C. under reduced pressure or under gas stream, and used.

Hydroxyl group of those inorganic oxides can be substituted with a halogen. A method of substituting hydroxyl group of the inorganic oxide with a halogen is preferably a method of reacting with a reactant having a halogen exchangeable with a surface hydroxyl group. Examples of the reactant include a halogen such as fluorine, chlorine, bromine or iodine; hydrogen halide such as hydrogen fluoride, hydrogen chloride, hydrogen bromide or hydrogen iodide; and a halogen-containing compound such as phosgene, thionyl chloride, ammonium fluoride, ammonium chloride, ammonium iodide, carbon tetrachloride, chloroform or Freon. Those inorganic compounds may be heat-treated at 100 to 1,000° C. under reduced pressure or under gas stream for the purpose of removing $H_2O$ as a by-product after a part or the whole of hydroxyl groups is substituted with a halogen.

Prior to the contact with other catalyst component, the inorganic oxide may previously be contacted with a metal compound for the purpose of post-treatment of —OH residue. The metal compound used is not particularly limited, and the component (d), the component (e) and/or the component (f) are preferably used. A method of contacting the inorganic oxide with the metal compound is not particularly limited. Examples of the method include a method of contacting in a suspension state in an organic solvent in which an oxide is insoluble and a metal compound is soluble; a method of contacting in an organic solvent in which the oxide and the metal oxide are soluble; and a method of contacting by means of ball mill or the like under substantially solvent-free state.

Examples of the method of preparing the catalyst comprising the component (a), the component (b), the component (g) and the component (p) used in the invention include a method of contacting the component (g) and the component (p) and then adding the component (a) and the component (b); a method of contacting the component (a), the component (b) and the component (g) and then adding the component (p); and a method of contacting the component (a), the component (g) and the component (p) and then adding the component (b).

The amount of the component (a) in the catalyst comprising the component (a), the component (b), the component (g) and the component (p) is preferably from 0.005 to 1 mmol, and particularly preferably from 0.05 to 0.5 mmol, per 1 g of the component (p). When the amount of Al atom contained in the component (g) is in a proportion of from 10 to 200 moles per 1 mole of the component (a), better polymerization activity is obtained, which is preferred.

Examples of the method of preparing the catalyst comprising the component (a), the component (b), the component (p) and at least one salt selected from the component (h), the component (i) and the component (j) used in the invention include a method of contacting the component (p) and at least one salt selected from the component (h), the component (i) and the component (j) and then adding the component (a) and the component (b); a method of contacting the component (a), the component (b) and at least one salt selected from the component (h), the component (i) and the component (j) and then adding the component (p); and a method of contacting the component (a), the component (p) and at least one salt selected from the component (h), the component (i) and the component (j) and then adding the component (b).

When the amount of an anion component in at least one salt selected from the component (h), the component (i) and the component (j) in the catalyst comprising the component (a), the component (b), the component (p) and at least one salt selected from the component (h), the component (i) and the component (j) is from 0.01 to 1,000 mol per 1 mole of the component (a), good polymerization activity is obtained, which is preferred. The particularly preferred amount is from 0.2 to 500 mol. The amount of the component (a) to 1 kg of the component (p) is in a range of preferably from 0.001 to 1 mol, particularly preferably from 0.001 to 0.5 mol, and further preferably from 0.001 to 0.3 mol.

The component (q) used in the invention is an inorganic halide. Examples of the inorganic halide include a halide of an alkaline earth metal, such as magnesium chloride; and a halide of an element of group 13 of the periodic table, such as aluminum chloride.

Examples of the method of preparing a catalyst comprising the component (a), the component (b), the component (q) and at least one salt selected from the component (h), the component (i) and the component (j) used in the invention include a method of contacting the component (q) and at least one salt selected from the component (h), the component (i) and the component (j) and then adding the component (a) and the component (b); a method of contacting the component (a), the component (b) and at least one salt selected from the component (h), the component (i) and the component (j) and then adding the component (q); and a method of contacting the component (a), the component (q) and at least one salt selected from the component (h), the component (i) and the component (j) and then adding the component (b).

When the amount of an anion component in at least one salt selected from the component (h), the component (i) and the component (j) in the catalyst comprising the component (a), the component (b), the component (q) and at least one salt selected from the component (h), the component (i) and the component (j) is from 0.01 to 1,000 mol per 1 mole of the component (a), good polymerization activity is obtained, which is preferred. The particularly preferred amount is from 0.2 to 500 mol. The amount of the component (a) to 1 kg of the component (q) is in a range of preferably from 0.001 to 1 mol, particularly preferably from 0.001 to 0.5 mol, and further preferably from 0.001 to 0.3 mol.

The component (q) in the invention is clay mineral. The clay mineral is fine particles comprising microcrystalline silicate as the main component. Most of the clay mineral has the characteristic on its structure to have a layered structure and have various sizes of negative charge in the layer. The clay mineral greatly differs from a metal oxide having a three-dimensional structure such as silica or alumina in this point. Those clay minerals are generally classified into pyrophyllite, kaolinite, deckite and talc groups (negative charge per the chemical formula is nearly 0), smectite groups (negative charge per the chemical formula is from about 0.25 to 0.6), vermiculite groups (negative charge per the chemical formula is from about 0.6 to 0.9), mica groups (negative charge per the chemical formula is about 1), and brittle mica groups (negative charge per the chemical formula is about 2), depending on the size of layer charge. The above each group includes the respective various clay minerals. Examples of the clay mineral belonging to the smectite groups include montmorillonite, beidellite, saponite and hectorite. Those clay minerals are naturally present, but clay minerals containing small impurities can be obtained by artificial synthesis. The invention can use all of the natural clay minerals and clay minerals obtained by artificial synthesis described here, and further can use all materials belonging to the definition of clay mineral, even though not indicated above. Those clay minerals can be used as mixtures of two or more thereof.

The component (q) in the invention may be used directly, or may be used after newly adding and adsorbing water or after being subjected to heat dehydration treatment.

The component (q) is preferably subjected to a chemical treatment such as acid treatment, alkali treatment or salts treatment. The acid treatment removes impurities on the surface of the component (q) using an acid such as hydrochloric acid, sulfuric acid, nitric acid, acetic acid or oxalic acid, and additionally increases a surface area by dissolving out a part or the whole of cation such as Al, Fe or Mg in the crystal structure. The alkali treatment ruptures crystal structure of the component (q) using an alkali such as sodium hydroxide to bring about structural change. The salts treatment increases swellability and interlayer distance by substituting exchangeable ion between layers of a component (r) with other ion using salts such as lithium chloride, sodium phosphate, sodium sulfate, sodium acetate, sodium formate, sodium citrate, sodium nitrate, sodium oxalate, magnesium chloride, magnesium sulfate, magnesium phosphate, magnesium perchlorate, magnesium oxalate, magnesium nitrate, magnesium acetate, magnesium succinate, aluminum sulfate, aluminum phosphate, aluminum oxalate or aluminum nitrate.

The catalyst comprising the component (a), the component (b), the component (q) and the component (d) used in the invention is obtained by contacting the component (a) and the component (b) with a contact product of the component (q) and the component (d) in an organic solvent. The amount of each component used is that the component (a) is preferably from 0.0001 to 100 mmol, and particularly preferably from 0.001 to 10 mmol, per 1 g of the component (q); the component (b) is preferably from 0.0001 to 100 mmol, and particularly preferably from 0.001 to 10 mmol, per 1 g of the component (c); and the component (d) is preferably from 0.1 to 10,000 mol, and particularly preferably from 1 to 1,000 mol, per 1 mole of the sum of the mole number of the component (a) and the component (b).

In the invention, the ethylene polymer can be produced by a method (method 1) of polymerizing ethylene and optionally an olefin having 3 or more carbon atoms in a single stage polymerization or a multistage polymerization using a catalyst component containing the component (a) and the component (b). Alternatively, the ethylene polymer can be produced by a method (method 2) of (step I) polymerizing ethylene and optionally an olefin having 3 or more carbon atoms using a catalyst component containing the component (a) as the main component to produce an ethylene polymer, and (step II) then continuously adding a catalyst component containing the component (b) as the main component to polymerize ethylene and optionally an olefin having 3 or more carbon atoms in the presence of the ethylene polymer obtained in step I.

Examples of the olefin having 3 or more carbon atoms used in the production method of the invention include α-olefins such as propylene, 1-butene, 1-hexene, 1-octene, 1-decene, 1-dodecene, 1-tetradecene, 1-hexadecene, 1-octadecene, 1-eicosene, 4-methyl-1-pentene, 3-methyl-1-butene or vinylcycloalkane; cyclic olefins such as norbornene or norbornadiene; dienes such as butadiene or 1,4-hexadiene; and styrene. Those olefins can be used as mixtures of two or more thereof.

The embodiment of the method 1 used in the production method of the invention is described below.

Polymerization conditions such as polymerization temperature, polymerization time, polymerization pressure and monomer concentration in the method 1 are not particularly limited. The polymerization temperature is preferably from −100 to 120° C. Particularly considering productivity, it is preferred to conduct the polymerization in a range of from 20 to 120° C., and further from 60 to 120° C. The polymerization time is preferably in a range of from 10 seconds to 20 hours. The polymerization pressure is preferably in a range of from ordinary pressures to 300 MPa. It is possible to control a molecular weight using hydrogen or the like at the time of polymerization. The polymerization can be conducted in any method of a batch method, a semi-continuous method or a continuous method, and can be conducted in two or more stages by changing the polymerization conditions. The ethylene polymer can be obtained by separating and recovering from a polymerization solvent by the conventional method after completion of the polymerization, and then drying.

The polymerization in the method 1 can be conducted in a solution state, a suspension state or a gas phase state. In particular, when the polymerization is conducted in a suspension state, an olefin polymer having uniform particle shape can be produced with good efficiency in a stable manner. The solvent used can be any solvent so long as it is the organic solvent generally used. Specific examples of the organic solvent include benzene, toluene, xylene, propane, isobutane, pentane, hexane, heptane, cyclohexane and gasoline. The olefin itself such as propylene, 1-butene, 1-hexene or 1-octene can also be used as a solvent.

The embodiment of the method 2 used in the production method of the invention is described below.

Examples of the catalyst containing the component (a) as the main component include a catalyst comprising the component (a) and the component (d); a catalyst further comprising water; a catalyst comprising the component (a) and the component (e); a catalyst further comprising the component (d); a catalyst comprising the component (a) and the component (g); a catalyst further comprising the component (d); a catalyst comprising the component (a) and at least one salt selected from the component (h), the component (i) and the component (j); a catalyst further comprising the component (d); a catalyst comprising the component (a) and the component (k); a catalyst further comprising the component (d); a catalyst comprising the component (a) and magnesium chloride (component (l)); a catalyst further comprising the component (d); a catalyst comprising the component (a), the component (g) and the component (o); a catalyst further comprising the component (d); a catalyst comprising the component (a), the component (l) and at least one salt selected from the component (h), the component (i) and the component (j); a catalyst further comprising the component (d); a catalyst comprising the component (a), the component (q) and the component (d); a catalyst comprising the component (a) and the component (c); and a catalyst further comprising the component (d). A catalyst comprising the component (a) and the component (c), and a catalyst further comprising the component (d) can preferably be used.

The catalyst comprising the component (a) and the component (c) can be obtained by contacting the component (a) and the component (c) in an organic solvent. Either of a method of adding the component (c) to the component (a) and a method of adding the component (a) to the component (c) can be used.

Examples of the contact solvent include aliphatic hydrocarbons such as butane, pentane, hexane, heptane, octane, nonane, decane, cyclopentane or cyclohexane; aromatic hydrocarbons such as benzene, toluene or xylene; ethers such as ethyl ether or n-butyl ether; halogenated hydrocarbons such as methylene chloride or chloroform; 1,4-dioxane; acetonitrile and tetrahydrofuran.

The contact temperature is preferably selected between 0° C. and 200° C.

The amount of each component used is that the component (a) is from 0.0001 to 100 mmol, and preferably from 0.001 to 10 mmol, per 1 g of the component (c).

The contact product of the component (a) and the component (c) thus prepared may directly be used without cleaning, and may be used after cleaning. When the component (a) is a dichloro form, it is preferred that the component (d) is further added. Furthermore, the component (d) can be added for the purpose of removing impurities in the component (c), polymerization solvent and olefin.

The catalyst comprising the component (a), the component (c) and the component (d) is obtained by contacting the component (a), the component (c) and the component (d) in an organic solvent. Examples of the contact method include a method of adding the component (d) to a contact product of the component (a) and the component (c); a method of adding a contact product of the component (a) and the component (c) to the component (d); a method of adding the component (c) to a contact product of the component (a) and the component (d); a method of adding a contact product of the component (a) and the component (d) to the component (c); a method of adding a contact product of the component (c) and the component (d) to a contact product of the component (a) and the component (d); a method of adding the component (a) to a contact product of the component (c) and the component (d); and a method of adding a contact product of the component (a) and the component (d) to a contact product of the component (c) and the component (d).

In the step I of the method 2, the polymerization temperature is preferably from −100 to 120° C. Particularly considering productivity, it is preferred to conduct the polymerization in a range of from 20 to 120° C., and further from 60 to 120° C. The polymerization time is preferably in a range of from 10 seconds to 20 hours. The polymerization pressure is preferably in a range of from ordinary pressures to 300 MPa. The feed proportion of ethylene and the olefin having 3 or more carbon atoms is that ethylene/olefin having 3 or more carbon atoms (molar ratio) is from 0 to 200, preferably from 3 to 100, and more preferably from 5 to 50. It is possible to control a molecular weight using hydrogen or the like at the time of polymerization. The polymerization can be conducted in any method of a batch method, a semi-continuous method or a continuous method, and can be conducted in two or more stages by changing the polymerization conditions.

In the step I of the method 2, the polymerization can be conducted in a solution state, a suspension state or a gas phase state. In particular, when the polymerization is conducted in a suspension state, a long-chain branched ethylene copolymer having uniform particle shape can be produced with good efficiency in a stable manner. The solvent used can be any solvent so long as it is the organic solvent generally used. Specific examples of the organic solvent include benzene, toluene, xylene, propane, isobutane, pentane, hexane, heptane, cyclohexane and gasoline. The olefin itself such as propylene, 1-butene, 1-hexene or 1-octene can also be used as a solvent.

Examples of the catalyst containing the component (b) as the main component include a catalyst comprising the component (b) and the component (d); a catalyst further comprising water; a catalyst comprising the component (b) and the component (e); a catalyst further comprising the component (d); a catalyst comprising the component (b) and the component (g); a catalyst further comprising the component (d); a catalyst comprising the component (b) and at least one salt selected from the component (h), the component (i) and the component (j); a catalyst further comprising the component (d); a catalyst comprising the component (b) and the component (k); a catalyst further comprising the component (d); a catalyst comprising the component (b) and the component (l); a catalyst further comprising the component (d); a catalyst comprising the component (b), the component (g) and the component (o); a catalyst further comprising the component (d); a catalyst comprising the component (b), the component (l) and at least one salt selected from the component (h), the component (i) and the component (j); a catalyst further comprising the component (d); a catalyst comprising the component (b), the component (q) and the component (d); a catalyst comprising the component (b) and the component (c); and a catalyst further comprising the component (d). A catalyst comprising the component (b) and the component (d) can preferably be used.

In the method 2 that can be used in the production method of the invention, a method of adding a catalyst comprising the above-described combination containing the component (b) as the main component to the polymerization system in step II after production of the ethylene polymer in step I is not particularly limited. Examples of the method include a method of removing residual pressure in the polymerization system after production of the ethylene polymer, substituting the inside of the system with an inert gas and then adding each component to the respective system; a method of removing residual pressure in the polymerization system after production of the ethylene polymer, substituting the inside of the system with an inert gas, previously contacting each component and then adding to the system; a method of removing residual pressure in the polymerization system after production of the ethylene polymer and then adding each component to the respective system without substituting the inside of the system with an inert gas; a method of removing residual pressure in the polymerization system after production of the ethylene polymer, previously contacting each component without substituting the inside of the system with an inert gas and then adding to the system; a method of directly adding each component to the respective system without removing residual gas after production of the ethylene polymer; and a method of previously contacting each component directly without removing residual gas after production of the ethylene polymer and then adding to the system. The temperature when added is not particularly limited, and the addition can be conducted in a range of from −50° C. to the boiling point of a solvent.

In the method 2, the time until polymerizing ethylene and optionally an olefin having 3 or more carbon atoms after adding the catalyst containing the component (b) as the main component to the polymerization system in the step II after production of the ethylene polymer in the step I is not particularly limited, and is from 1 second to 24 hours. A method of adding the catalyst containing the component (b) as the main component to the polymerization system and immediately polymerizing ethylene and optionally an olefin having 3 or more carbon atoms; and a method of adding the catalyst containing the component (b) as the main component to the polymerization system and after passing the above time, polymerizing ethylene and optionally an olefin having 3 or more carbon atoms can be exemplified. The temperature in such a case is not particularly limited, and the method can be conducted in a range of from −50° C. to the boiling point of a solvent.

In the step II, the polymerization temperature is preferably from −100 to 120° C. Particularly considering productivity, it is preferred to conduct the polymerization in a range of from 20 to 120° C., and further from 60 to 120° C. The polymerization time is preferably in a range of from 10 seconds to 20 hours. The polymerization pressure is preferably in a range of from ordinary pressures to 300 MPa. The feed proportion of ethylene and the olefin having 3 or more carbon atoms is that ethylene/olefin having 3 or more carbon atoms (molar ratio) is from 0 to 200, preferably from 0.05 to 100, and more preferably from 0.1 to 50. It is possible to control a molecular weight using hydrogen or the like at the time of polymerization. The polymerization can be conducted in any method of a batch method, a semi-continuous method or a continuous method, and can be conducted in two or more stages by changing the polymerization conditions. The ethylene polymer to be obtained can be obtained by separating and recovering from the polymerization solvent by the conventional method after completion of the polymerization, and then drying.

The component (a) used in the catalyst for ethylene polymer production and the production method of the invention can preferably produce an ethylene polymer having high molecular weight in terms of a weight average molecular weight, narrow molecular weight distribution and terminal vinyl by copolymerizing ethylene or ethylene and an olefin having 3 or more carbon atoms in the presence thereof. The ethylene polymer produced in the presence of such a component (a) can preferably function as a high molecular weight macromonomer in the production of the ethylene polymer of the invention.

Of the ethylene polymers obtained by the catalyst for ethylene polymer production and the production method of the invention, the ethylene polymer obtained by the component (b) is preferably an ethylene polymer a part of which has a long chain branch by incorporating a part of the high molecular weight macromonomer obtained by the component (a) as a comonomer.

In general, when the molecular weight of a macromonomer is low, the number of macromonomer is increased. As a result, the amount of long chain branch is increased and processability is excellent. However, a number average molecular weight becomes low and mechanical strength becomes low. On the other hand, when the molecular weight of a macromonoer is high, mechanical strength becomes high, but long chain branch is not formed and processability deteriorates. The ethylene polymer produced by the catalyst for production and the production method of the invention is preferably an ethylene polymer having long chain branch structure, high number average molecular weight and narrow molecular weight distribution, and has high mechanical strength while having excellent processability.

An ethylene polymer obtained by the catalyst method of the ethylene polymer of the invention has a density (kg/m$^3$) of from 890 to 980 kg/m$^3$ in terms of a value measured by a density gradient tube method according to JIS K6760 (1995).

An ethylene polymer obtained by the catalyst method of the ethylene polymer of the invention has a weight average molecular weight (Mw) of from 30,000 to 10,000,000, preferably from 40,000 to 8,000,000, and more preferably from 50,000 to 5,000,000. Mw/Mn is from 2 to 20, preferably from 2 to 15, and more preferably from 2 to 10.

The melt strength ($MS_{160}$ (mN)) of the ethylene polymer obtained by the catalyst method of the ethylene polymer of the invention is a value measured at a measurement temperature of 160° C. under the conditions of an inflow angle of 90°, shear velocity of 10.8 s$^{-1}$ and draw ratio of 47 using a die having a length (L) of 8 mm and a diameter (D) of 2.095 mm. Where the maximum draw ratio is less than 47, a value measured at the maximum draw ratio at which breakage does not occur was used as $MS_{160}$.

The melt flow rate (MFR (g/10 min)) of the ethylene copolymer obtained by the catalyst method of the ethylene polymer of the invention is a value measured at 190° C. under a load of 2.16 kg, and is preferably from 0.1 to 50.

The $MS_{160}$ and MFR of the ethylene copolymer obtained by the catalyst method of the ethylene polymer of the invention have the relationship that:

MFR is satisfied with the following formula (23)

$$MS_{160} > 90 - 130 \times \log(MFR) \quad (23)$$

preferably the following formula (34)

$$MS_{160} > 110 - 130 \times \log(MFR) \quad (34)$$

and more preferably the following formula (35)

$$MS_{160} > 130 - 110 \times \log(MFR) \quad (35)$$

The powder bulk density of the ethylene copolymer obtained by the catalyst method of the ethylene polymer of the invention measured by the method according to JIS K6760 (1995) is preferably from 0.15 to 0.70 g/cm$^3$, particularly preferably from 0.17 to 0.70 g/cm$^3$, and further preferably from 0.20 to 0.70 g/cm$^3$.

The non-linear parameter ($\lambda$) of elongation viscosity of the ethylene copolymer obtained by the catalyst method of the ethylene polymer of the invention is in a range of preferably from 2.5 to 100, and particularly preferably from 2.5 to 30.

The $\lambda$ is a value obtained by dividing the maximum value of an elongation viscosity measured at 160° C. under the condition of a strain rate of from 0.07 to 0.1 s$^{-1}$ using a Meissner uniaxial elongation viscometer by an elongation viscosity in a linear region at that time, and the elongation viscosity in a linear region can be calculated by a dynamic viscoelasticity as described in M. Yamaguchi et al., Polymer Journal 32, 164 (2000).

The ethylene polymer obtained by the catalyst method of the ethylene polymer of the invention can contain conventional additives such as heat-resistant stabilizers, weather-proof stabilizers, antistatic agents, antifogging agents, anti-blocking agents, slip agents, lubricating agents, nucleating agents, inorganic fillers or reinforcing agents such as pigment, carbon black, talc, glass powder or glass fiber; organic filler or reinforcing agents, flame retardants or neutron shielding agents.

The ethylene polymer produced in the invention can be used by mixing with other thermoplastic resins. For example, the ethylene polymer can be mixed with HDPE, LLDPE, LDPE, polypropylene, poly-1-butene, poly-4-methyl-1-pentene, ethylene-vinyl acetate copolymer, ethylene-vinyl alcohol copolymer, polystyrene, maleic anhydride-grafted products of those, and the like.

The present invention is specifically described below by the Examples, but the invention is not construed as being limited thereto. Unless otherwise indicated, reagents and the like used are commercially available products.

Preparation of the component (c), preparation of the solid catalyst component, preparation of the catalyst for ethylene polymer production, production of the ethylene polymer and solvent purification were all conducted in an inert gas atmosphere. Solvents and the like used in preparation of the component (c), preparation of the catalyst for ethylene polymer production and production of the ethylene polymer were all previously subjected to purification, drying and deoxidation by the conventional methods. The component (a) and the component (b) used were synthesized and identified by the conventional methods. A hexane solution (0.714M) of tri-isobutylaluminum and a toluene solution of methylaluminoxane (trade name: PMAO; Al: 2.39M) used are products of Tosoh Finechem Corporation.

Various properties of the ethylene polymer in the Examples were measured by the following methods.

Weight average molecular weight (Mw), number average molecular weight (Mn) and ratio of weight average molecular weight and number average molecular weight (Mw/Mn) were measured by gel permeation chromatography (GPC). GPC apparatus used was HLC-8121GPC/HT, a product of Tosoh Corporation, and a column used was TSKgel GMHhr-H(20) HT, a product of Tosoh Corporation. Column temperature was set to 140° C., and 1,2,4-trichlorobenzene was used as an eluent. A measurement sample was prepared in a concentration of 1.0 mg/ml, and 0.3 ml of the sample was injected for measurement. Calibration curve of a molecular weight is corrected using the known polystyrene sample. Mw and Mn were obtained as a value in terms of a linear polystyrene.

Density (d) was measured by a density gradient tube method according to JIS K6760 (1995).

Terminal vinyl number was obtained by heat pressing an ethylene polymer using Fourier transform infrared spectrophotometer (FT-IR), SPECTRUM ONE, a product of Perkin Elmer, ice cooling the same to prepare a film, measuring the film in a range of from 4,000 to 400 cm$^{-1}$, and calculating using the following formula.

Terminal vinyl number per 1,000 carbon atoms(number/1000 C)=$a \times A/L/d$ wherein a is an absorbance index, A is absorbance at 909 cm$^{-1}$ assigned to terminal vinyl, L is thickness of a film, and d is density. a was obtained from a calibration curve prepared using a sample in which the terminal vinyl number per 1,000 carbon atoms had been confirmed by $^1$H-NMR measurement. $^1$H-NMR measurement was carried out at 130° C. in a mixed solvent of deuterated benzene and o-dichlorobenzene using GSX400, a product of JEOL Ltd. The terminal vinyl number per 1,000 carbon atoms was calculated from an integral ratio of a peak assigned to methylene and a peak assigned to terminal vinyl. Each peak was that a peak in which chemical shift is 1.3 ppm is assigned to methylene, and a peak of from 4.8 to 5.0 ppm is assigned to terminal vinyl, using tetramethylsilane as the standard (0 ppm).

Ethylene polymers used for the measurement of melt strength ($MS_{160}$, $MS_{190}$), maximum draw ratio (DR), elongation viscosity, nominal tensile strain at break and fluidized activation energy ($E_a$) were polymers obtained by kneading polymers having previously added thereto 1,500 ppm of Irganox 1010™ (a product of Ciba Specialty Chemicals) and 1,500 ppm of Ingafox 168™ (a product of Ciba Specialty Chemicals) as heat-resistant stabilizers using an internal mixer (trade name: Laboplast Mill, a product of Toyo Seiki Seisaku-Sho, Ltd.) in a nitrogen stream at 190° C. with the number of revolution of 30 rpm for 30 minutes.

Fluidized activation energy ($E_a$) was obtained by obtaining shear storage elastic modulus G' and shear loss elastic modulus G" at an angular velocity in a range of from 0.1 to 100 rad/s at each temperature of 150° C., 170° C. and 190° C. using a disc-disc rheometer (trade name: MCR-300, a product of Anton Paar), obtaining shift factor of a horizontal axis at the standard temperature of 150° C., and calculating by the following Arrhenius equation.

$$\text{Viscosity}(\eta_0) = A \exp(E_a/RT)$$

wherein R is a gas coefficient.

Movement of a vertical axis is not made.

The melt strength was measured by mounting a die having a length of 8 mm and a diameter of 2.095 mm to a capillary viscometer having a barrel diameter of 9.55 mm (trade name: Capillograph, a product of Toyo Seiki Seisaku-Sho, Ltd.) such that an inflow angle is 90°. $MS_{160}$ was that temperature is set to 160° C., piston drop rate is set to 10 mm/min, and draw ratio is set to 47. Load (mN) necessary for pick-up is used as $MS_{160}$. Where the maximum draw ratio is less than 47, load (mN) necessary for pick-up at the maximum draw ratio at which breakage does not occur was used as $MS_{160}$. Load (mN) measured by the same method except for setting the temperature to 190° C. was used as $MS_{190}$.

The elongation viscosity was measured using a Meissner uniaxial elongation viscometer (trade name: Melten Rheometer, a product of Toyo Seiki Seisaku-Sho, Ltd.) having temperature set to 160° C. The non-linear parameter ($\lambda$) was obtained by dividing the maximum value of an elongation viscosity measured under the condition of a strain rate of from 0.07 to 0.1 s$^{-1}$ by an elongation viscosity in a linear region at that time. The value of the elongation viscosity in a linear region was calculated using an approximation formula from a dynamic viscoelasticity according to the method described in M. Yamaguchi et al., Polymer Journal 32, 164 (2000).

The nominal tensile strain at break was measured using a tensile tester (TENSILON ATM-500, a product of Orientec Co., Ltd., according to JIS K6922-2.

The thermal stability of the ethylene polymer was evaluated as follows. An ethylene polymer without addition of a heat-resistant stabilizer was kneaded in nitrogen stream at 190° C. with the number of revolution of 30 rpm for 30 minutes using an internal mixer (trade name: Laboplast Mill, a product of Toyo Seiki Seisaku-Sho, Ltd.), and pelletized. The pellets were allowed to stand in an oven set to 120° C. for 96 hours, and degree of yellowing ($\Delta YI$) was calculated by the method described in JIS K7105. $\Delta YI$ is variation of yellowness obtained by the following formula, and thermal stability becomes good as $\Delta YI$ is decreased.

$$\Delta YI = YI - YI_0$$

(wherein YI is yellowness after heat treatment in an oven, and $YI_0$ is yellowness before heating in an oven.)

Example 1

Preparation of Component (c)

60 ml of ethanol and 2.0 ml of 37% concentrated hydrochloric acid were added to 60 ml of water. 6.6 g (0.022 mol) of N,N-dimethyl-octadecylamine was added to the solution obtained, and the resulting mixture was heated to 60° C. to prepare a hydrochloride solution. 20 g of hectorite was added to the solution. The resulting suspension was stirred at 60° C. for 3 hours. The supernatant liquid was removed, followed by washing with 1 liter of water of 60° C. The material was dried at 60° C. under 10$^{-3}$ torr for 24 hours, and the resulting solid was pulverized with a jet mill to obtain modified hectorite having an average particle size of 5.2 μm (component (c)). As a result of elemental analysis, ion amount per 1 g of the modified hectorite was 0.85 mmol.

(Preparation of Catalyst for Ethylene Copolymer Production)

53 mg (160 mmol) of propane-1,3-diylbis(cyclopentadienyl)zirconium dichloride (component (a)) was suspended in 17.6 ml of hexane, and 22.4 ml of a hexane solution (0.714M) of triisobutylaluminum (component (c)) was added thereto to obtain a contact product of the component (a) and the component (c). 4.0 g of the modified hectorite (component (c)) was added to the contact product, and the resulting mixture was stirred at 60° C. for 3 hours. The mixture was allowed to stand to remove supernatant liquid, and washed with a hexane solution (0.03M) of triisobutylaluminum. A hexane solution (0.15M) of triisobutylaluminum was further added to prepare a catalyst slurry (100 g/liter).

A solution comprising 3.3 mg (4.9 μmol) of 3 mol % of diphenylmethylene(1-cyclopentadienyl)(2,7-di-tert-butyl-9-fluorenyl)zirconium dichloride (component (b)) to propane-1,3-diylbis(cyclopentadienyl)zirconium dichloride, 7.2 ml of hexane and 0.69 ml of a hexane solution (0.714M) of triisobutylaluminum was added to the catalyst slurry prepared above, and the resulting mixture was stirred at room temperature for 6 hours. The mixture was allowed to stand to remove supernatant liquid, followed by washing with a hexane solution (0.03M) of triisobutylaluminum. A hexane solution (0.15M) of triisobutylaluminum was further added to finally obtain a catalyst slurry of 100 g/liter.

(Production of Ethylene Copolymer)

1,200 ml of hexane, 36 g of 1-butene and 1.0 ml of a hexane solution (0.714M) of triisobutylaluminum were introduced into a 2 liters autoclave, and the inner temperature of the autoclave was elevated to 75° C. 0.25 ml of the catalyst slurry obtained above was added to the autoclave, and an ethylene/hydrogen mixed gas (containing 700 ppm of hydrogen) was introduced until partial pressure reaches 1.2 MPa, thereby initiating polymerization. During the polymerization, the ethylene/hydrogen mixed gas was continuously introduced such that the partial pressure of 1.2 MPa is maintained. The polymerization temperature was controlled to 75° C. After 60 minutes from the initiation of polymerization, inner pressure of the autoclave was released, and the contents were suction filtered. After drying, 45 g of a polymer was obtained. Density, MFR, terminal vinyl number, Mw/Mn, $MS_{160}$, $MS_{190}$, $E_a$ and $\Delta YI$ of the ethylene copolymer obtained are shown in Table 1.

Example 2

Production of Ethylene Copolymer

Polymerization was conducted in the same manner as in Example 1 except that 72 g of 1-butene was used and the polymerization time was changed to 25 minutes. As a result, 46 g of a polymer was obtained. Density, MFR, terminal vinyl number, Mw/Mn, $MS_{160}$, $MS_{190}$, $E_a$ and $\Delta YI$ of the ethylene copolymer obtained are shown in Table 1.

Example 3

Preparation of Catalyst for Ethylene Polymer Production 63 mg (160 µmol) of 1,1,3,3-tetramethyldisiloxane-1,3-diylbis(cyclopentadienyl)zirconium dichloride (component (a)) was suspended in 17.6 ml of hexane, and 22.4 ml of a hexane solution (0.714M) of triisobutylaluminum (component (d)) was added thereto to obtain a contact product of the component (a) and the component (d). 4.0 g of the modified hectorite (component (c)) prepared in Example 1 (Preparation of component (c)) was added to the contact product, and the resulting mixture was stirred at 60° C. for 3 hours. The mixture was allowed to stand to remove supernatant liquid, and washed with a hexane solution (0.03M) of triisobutylaluminum. A hexane solution (0.15M) of triisobutylaluminum was further added to prepare a catalyst slurry (100 g/liter).

A solution comprising 5.6 mg (8.4 µmol) of 5 mol % of diphenylmethylene(1-cyclopentadienyl)(2,7-di-tert-butyl-9-fluorenyl)zirconium dichloride (component (b)) to 1,1,3,3-tetramethyldisiloxane-1,3-diylbis(cyclopentadienyl)zirconium dichloride, 6.7 ml of hexane and 1.18 ml of a hexane solution (0.714M) of triisobutylaluminum was added to the catalyst slurry prepared above, and the resulting mixture was stirred at room temperature for 6 hours. The mixture was allowed to stand to remove supernatant liquid, followed by washing with a hexane solution (0.03M) of triisobutylaluminum. A hexane solution (0.15M) of triisobutylaluminum was further added to finally obtain a catalyst slurry of 100 g/liter.

(Production of Ethylene Copolymer)

1,200 ml of hexane and 1.0 ml of a hexane solution (0.714M) of triisobutylaluminum were introduced into a 2 liters autoclave, and the inner temperature of the autoclave was elevated to 85° C. 0.075 ml of the catalyst slurry obtained above was added to the autoclave, and an ethylene/hydrogen mixed gas (containing 1,000 ppm of hydrogen) was introduced until partial pressure reaches 1.2 MPa, thereby initiating polymerization. During the polymerization, the ethylene/hydrogen mixed gas was continuously introduced such that the partial pressure of 1.2 MPa is maintained. The polymerization temperature was controlled to 85° C. After 90 minutes from the initiation of polymerization, inner pressure of the autoclave was released, and the contents were suction filtered. After drying, 90 g of a polymer was obtained. Density, MFR, terminal vinyl number, Mw/Mn, $MS_{160}$, $MS_{190}$, $E_a$ and $\Delta YI$ of the ethylene polymer obtained are shown in Table 1.

Example 4

Preparation of Catalyst for Ethylene Polymer Production

Preparation was conducted in the same manner as in Example 3 (Preparation of catalyst for ethylene polymer production), except that a solution comprising 9.7 mg (17.8 µmol) of 10 mol % of isopropylidene(1-cyclopentadienyl)(2,7-di-tert-butyl-9-fluorenyl)zirconium dichloride (component (b)) to 1,1,3,3-tetramethyldisiloxane-1,3-diylbis(cyclo-pentadienyl)zirconium dichloride, 5.4 ml of hexane and 2.5 ml of a hexane solution (0.714M) of triisobutylaluminum was added.

(Production of Ethylene Polymer)

1,200 ml of hexane and 1.0 ml of a hexane solution (0.714M) of triisobutylaluminum were introduced into a 2 liters autoclave, and the inner temperature of the autoclave was elevated to 85° C. 0.075 ml of the catalyst slurry obtained above was added to the autoclave, and an ethylene/hydrogen mixed gas (containing 2,500 ppm of hydrogen) was introduced until partial pressure reaches 1.2 MPa, thereby initiating polymerization. During the polymerization, the ethylene/hydrogen mixed gas was continuously introduced such that the partial pressure of 1.2 MPa is maintained. The polymerization temperature was controlled to 85° C. After 90 minutes from the initiation of polymerization, inner pressure of the autoclave was released, and the contents were suction filtered. After drying, 91 g of a polymer was obtained. Density, MFR, terminal vinyl number, Mw/Mn, $MS_{160}$, $MS_{190}$, $E_a$ and $\Delta YI$ of the ethylene polymer obtained are shown in Table 1.

Comparative Example 1

Production of Ethylene Polymer 1,200 ml of hexane and 0.08 ml of a hexane solution (0.714M) of triisobutylaluminum were introduced into a 2 liters autoclave, and the inner temperature of the autoclave was elevated to 90° C. 72.5 mg of Cr catalyst (EP350), a product of INEOS Silicas, was added to the autoclave, and a hydrogen gas was introduced until partial pressure reaches 1.0 MPa, and an ethylene gas was then introduced until partial pressure reaches 1.0 MPa, thereby initiating polymerization. During the polymerization, the ethylene gas was continuously introduced such that the ethylene partial pressure is maintained. The polymerization temperature was controlled to 90° C. After 90 minutes from the initiation of polymerization, inner pressure of the autoclave was released, and the contents were suction filtered. After drying, 143 g of a polymer was obtained. Density, MFR, terminal vinyl number, Mw/Mn, $MS_{160}$, $MS_{190}$, $E_a$ and $\Delta YI$ of the ethylene polymer obtained are shown in Table 1. It was confirmed that the ethylene polymer has the terminal vinyl number per 1,000 carbon atoms exceeding 0.2, and as a result of evaluation of $\Delta YI$, thermal stability is poor.

Comparative Example 2

Density, MFR, terminal vinyl number, Mw/Mn, $MS_{160}$, $MS_{190}$ and $E_a$ of the metallocene catalyst type ethylene/-1-octene copolymer (AF1840) commercially available from Dow Chemical Company are shown in Table 1. This ethylene copolymer is fallen outside the requirements of the formulae (1) and (3).

Comparative Example 3

Density, MFR, terminal vinyl number, Mw/Mn, $MS_{160}$, $MS_{190}$ and $E_a$ of the high pressure LDPE (Petrocene 176R) commercially available from Tosoh Corporation are shown in Table 1. This ethylene polymer is fallen outside the requirements of the formulae (2) and (3).

Comparative Example 4

Density, MFR, terminal vinyl number, Mw/Mn, $MS_{160}$, $MS_{190}$ and $E_a$ of the high pressure LDPE (Petrocene 360) commercially available from Tosoh Corporation are shown in Table 1. This ethylene polymer is fallen outside the requirements of the formulae (2) and (3).

at 60° C. under $10^{-3}$ torr for 24 hours, and the resulting solid was pulverized with a jet mill to obtain modified hectorite having an average particle size of 5.2 μm (component (c)). As a result of elemental analysis, ion amount per 1 g of the modified hectorite was 0.85 mmol.

(Preparation of Catalyst for Ethylene Polymer Production)

63 mg (160 μmol) of (1,1,3,3-tetramethyldisiloxane-1,3-diyl-biscyclopentadienyl)zirconium dichloride (component (a)) was suspended in 17.6 ml of hexane, and 22.4 ml of a hexane solution (0.714M) of triisobutylaluminum (component (d)) was added thereto to obtain a contact product of the component (a) and the component (d). 4.0 g of the modified hectorite (component (c)) obtained above was added to the contact product, and the resulting mixture was stirred at 60° C. for 3 hours. The mixture was allowed to stand to remove supernatant liquid, and washed with a hexane solution

TABLE 1

| | Catalyst | | Density | MFR | Terminal vinyl number | Mw | |
|---|---|---|---|---|---|---|---|
| | Catalyst (a) | Catalyst (b) | (kg/m³) | (g/10 min) | (/1,000 carbons) | (×10⁴) | Mw/Mn |
| Example 1 | a-1 | b-1 | 928 | 4.8 | 0.07 | 7.0 | 3.0 |
| Example 2 | a-1 | b-1 | 919 | 5.6 | 0.09 | 6.8 | 3.5 |
| Example 3 | a-2 | b-1 | 961 | 1.0 | 0.04 | 10.8 | 6.7 |
| Example 4 | a-2 | b-2 | 963 | 2.0 | 0.04 | 8.9 | 5.4 |
| Comparative Example 1 | | | 953 | 0.11 | 0.48 | 11.4 | 7.2 |
| Comparative Example 2 | | | 913 | 1.0 | 0 | 9.0 | 2.2 |
| Comparative Example 3 | | | 924 | 1.0 | 0 | 6.9 | 3.8 |
| Comparative Example 4 | | | 919 | 1.6 | 0 | 20.0 | 9.1 |

| | $MS_{160}$ (mN) | Right side of formula (1) | $MS_{190}$ (mN) | $MS_{160}/MS_{190}$ | $E_a$ (kJ/mol) | Left side of formula (3) | Right side of formula (3) | ΔYI |
|---|---|---|---|---|---|---|---|---|
| Example 1 | 57 | 1 | 34 | 1.68 | 29.5 | 27.7 | 32.3 | 7.5 |
| Example 2 | 59 | −7 | 35 | 1.69 | 30.5 | 28.7 | 32.9 | 7.6 |
| Example 3 | 170 | 90 | 96 | 1.77 | 24.7 | 24.2 | 30.3 | 7.2 |
| Example 4 | 77 | 51 | 45 | 1.71 | 29.5 | 24.0 | 30.2 | 7.0 |
| Comparative Example 1 | 255 | 215 | 150 | 1.70 | 27.0 | 25.0 | 30.8 | 19.0 |
| Comparative Example 2 | 60 | 90 | 35 | 1.71 | 41.1 | 29.3 | 33.2 | |
| Comparative Example 3 | 180 | 90 | 75 | 2.40 | 56.0 | 28.1 | 32.6 | |
| Comparative Example 4 | 295 | 63 | 145 | 2.03 | 53.0 | 28.7 | 32.9 | | a-1: Propane-1,3-diylbis(cyclopentadienyl)zirconium dichloride
a-2: 1,1,3,3-Tetramethyldisiloxane-1,3-diyl-bis(cyclopentadienyl)zirconium dichloride
b-1: Diphenylmethylene(1-cyclopentadienyl)(2,7-di-tert-butyl-9-fluorenyl)zirconium dichloride
b-2: Isopropylidene(1-cyclopentadienyl)(2,7-di-tert-butyl-9-fluorenyl)zirconium dichloride Example 5

Preparation of Component (c)

60 ml of ethanol and 2.0 ml of 37% concentrated hydrochloric acid were added to 60 ml of water. 6.6 g (0.022 mol) of N,N-dimethyloctadecylamine was added to the solution obtained, and the resulting mixture was heated to 60° C. to prepare a hydrochloride solution. 20 g of hectorite was added to the solution. The resulting suspension was stirred at 60° C. for 3 hours. The supernatant liquid was removed, followed by washing with 1 liter of water of 60° C. The material was dried (0.03M) of triisobutylaluminum. A hexane solution (0.15M) of triisobutylaluminum was further added to prepare a catalyst slurry (100 g/liter).

A solution comprising 5.6 mg (8.4 μmol) of 5.3 mol % of diphenylmethylene(1-cyclopentadienyl)(2,7-di-tert-butyl-9-fluorenyl)zirconium dichloride (component (b)) to (1,1,3,3-tetramethyldisiloxane-1,3-diyl-biscyclopentadienyl)zirconium dichloride, 7.2 ml of hexane and 1.2 ml of a hexane solution (0.714M) of triisobutylaluminum was added to the catalyst slurry prepared above, and the resulting mixture was stirred at room temperature for 6 hours. The mixture was allowed to stand to remove supernatant liquid, followed by washing with a hexane solution (0.03M) of triisobutylaluminum. A hexane solution (0.15M) of triisobutylaluminum was further added to finally obtain a catalyst slurry of 100 g/liter.

(Production of Ethylene Polymer)

1,200 ml of hexane and 1.0 ml of a hexane solution (0.714M) of triisobutylaluminum were introduced into a 2 liters autoclave, and the inner temperature of the autoclave was elevated to 85° C. 0.18 ml of the catalyst slurry obtained above was added to the autoclave, and ethylene was introduced until partial pressure reaches 1.2 MPa, thereby initiating polymerization. During the polymerization, an ethylene/hydrogen mixed gas (containing 1,300 ppm of hydrogen) was continuously introduced such that the partial pressure of 1.2 MPa is maintained. The polymerization temperature was controlled to 85° C. After 90 minutes from the initiation of polymerization, inner pressure of the autoclave was released, and the contents were suction filtered. After drying, 216 g of an ethylene polymer was obtained. The ethylene polymer obtained had bulk density of 310 kg/m$^3$, density of 960 kg/m$^3$, Mw of 108,000, and Mw/Mn of 6.70. Further, MFR was 1.0 g/10 min, and MS$_{160}$ was 170 mN. As a result of measurement of elongation viscosity, λ was 4.8. Nominal tensile strain at break was 690% or more. When a double bond was measured with FT-IR, the terminal vinyl was 0.04 per 1,000 carbon atoms.

Comparative Example 5

Preparation of Catalyst for Ethylene Polymer Production 63 mg (160 μmol) of (1,1,3,3-tetramethyldisiloxane-1,3-diyl-biscyclopentadienyl)zirconium dichloride was suspended in 17.6 ml of hexane, and 22.4 ml of a hexane solution (0.714M) of triisobutylaluminum (component (d)) was added thereto to obtain a contact product of the component (a) and the component (d). 4.0 g of the modified hectorite (component (c)) prepared in (Preparation of component (c)) in Example 1 was added to the contact product, and the resulting mixture was stirred at 60° C. for 3 hours. The mixture was allowed to stand to remove supernatant liquid, and washed with a hexane solution (0.03M) of triisobutylaluminum. A hexane solution (0.15M) of triisobutylaluminum was further added to prepare a catalyst slurry (100 g/liter).

(Production of Ethylene Polymer)

1,200 ml of hexane and 1.0 ml of a hexane solution (0.714M) of triisobutylaluminum were introduced into a 2 liters autoclave, and the inner temperature of the autoclave was elevated to 85° C. 0.10 ml of the catalyst slurry obtained above was added to the autoclave, and ethylene was introduced until partial pressure reaches 1.2 MPa, thereby initiating polymerization. During the polymerization, an ethylene/hydrogen mixed gas (containing 1,200 ppm of hydrogen) was continuously introduced such that the partial pressure of 1.2 MPa is maintained. The polymerization temperature was controlled to 85° C. After 90 minutes from the initiation of polymerization, inner pressure of the autoclave was released, and the contents were suction filtered. After drying, 100 g of an ethylene polymer was obtained. The ethylene polymer obtained had bulk density of 282 kg/m$^3$, density of 952 kg/m$^3$, Mw of 73,400, and Mw/Mn of 2.97. Further, MFR was 5.2 g/10 min, and MS$_{160}$ was 11 mN. As a result of measurement of elongation viscosity, λ was 2.2.

Comparative Example 6

Preparation of Catalyst for Ethylene Polymer Production

A catalyst was prepared in the same manner as in (Preparation of catalyst for ethylene polymer production) of Comparative Example 5, except for using 107 mg (160 μmol) of diphenylmethylene(1-cyclopentadienyl)(2,7-di-tert-butyl-9-fluorenyl)zirconium chloride in place of (1,1,3,3-tetramethyldisiloxane-1,3-diyl-biscyclopentadienyl)zirconium dichloride, and a catalyst slurry of 100 g/liter was obtained.

(Production of Ethylene Polymer)

1,200 ml of hexane and 1.0 ml of a hexane solution (0.714M) of triisobutylaluminum were introduced into a 2 liters autoclave, and the inner temperature of the autoclave was elevated to 85° C. 0.10 ml of the catalyst slurry obtained above was added to the autoclave, and ethylene was introduced until partial pressure reaches 1.2 MPa, thereby initiating polymerization. During the polymerization, an ethylene/hydrogen mixed gas (containing 6,000 ppm of hydrogen) was continuously introduced such that the partial pressure of 1.2 MPa is maintained. The polymerization temperature was controlled to 85° C. After 90 minutes from the initiation of polymerization, inner pressure of the autoclave was released, and the contents were suction filtered. After drying, 155 g of an ethylene polymer was obtained. The ethylene polymer obtained had bulk density of 225 kg/m$^3$, density of 954 kg/m$^3$, Mw of 112,000, and Mw/Mn of 3.18. Further, MFR was 0.88 g/10 min, and MS$_{160}$ was 92 mN. As a result of measurement of elongation viscosity, λ was 2.1.

Example 6

Preparation of Component (c))

Component (c) was prepared in the same manner as in (Preparation of component (c)) of Example 5, except for using 7.8 g (0.022 mol) of N,N-dimethyl-vehenylamine in place of N,N-dimethyl-octadecylamine, and a modified hectorite having an average particle size of 5.5 μm (component (c)) was obtained. As a result of elemental analysis, ion amount per 1 g of the modified hectorite was 0.91 mmol.

(Preparation of Catalyst for Ethylene Polymer Production)

53 mg (160 μmol) of propane-1,3-diylbis(cyclopentadienyl)zirconium dichloride (component (a)) was suspended in 17.6 ml of hexane, and 22.4 ml of a hexane solution (0.714M) of triisobutylaluminum (component (d)) was added thereto to obtain a contact product of the component (a) and the component (d). 4.0 g of the modified hectorite (component (c)) obtained above was added to the contact product, and the resulting mixture was stirred at 60° C. for 3 hours. The mixture was allowed to stand to remove supernatant liquid, and washed with a hexane solution (0.03M) of triisobutylaluminum. A hexane solution (0.15M) of triisobutylaluminum was further added to prepare a catalyst slurry (100 g/liter).

A solution comprising 12 mg (28 μmol) of 18 mol % of isopropylidene(1-cyclopentadienyl)(9-fluorenyl)zirconium dichloride (component (b)) to propane-1,3-diylbis(cyclopentadienyl)zirconium dichloride, 7.2 ml of hexane and 1.2 ml of a hexane solution (0.714M) of triisobutylaluminum was added to the catalyst slurry prepared above, and the resulting mixture was stirred at room temperature for 6 hours. The mixture was allowed to stand to remove supernatant liquid, followed by washing with a hexane solution (0.03M) of triisobutylaluminum. A hexane solution (0.15M) of triisobutylaluminum was further added to finally obtain a catalyst slurry of 100 g/liter.

(Production of Ethylene Polymer)

1,200 ml of hexane and 1.0 ml of a hexane solution (0.714M) of triisobutylaluminum were introduced into a 2 liters autoclave, and the inner temperature of the autoclave was elevated to 85° C. 0.18 ml of the catalyst slurry obtained above was added to the autoclave, and ethylene was introduced until partial pressure reaches 1.2 MPa, thereby initiating polymerization. During the polymerization, an ethylene/hydrogen mixed gas (containing 1,000 ppm of hydrogen) was continuously introduced such that the partial pressure of 1.2 MPa is maintained. The polymerization temperature was controlled to 85° C. After 90 minutes from the initiation of polymerization, inner pressure of the autoclave was released, and the contents were suction filtered. After drying, 155 g of an ethylene polymer was obtained. The ethylene polymer obtained had bulk density of 325 kg/m$^3$, density of 958 kg/m$^3$, Mw of 87,500, and Mw/Mn of 4.27. Further, MFR was 3.4 g/10 min, and MS$_{160}$ was 90 mN. As a result of measurement of elongation viscosity, λ was 5.1. Nominal tensile strain at break was 400%. When a double bond was measured with FT-IR, the terminal vinyl was 0.04 per 1,000 carbon atoms.

Comparative Example 7

Preparation of Catalyst for Ethylene Polymer Production

A catalyst was prepared in the same manner as in Example 2, except that in (Preparation of catalyst for ethylene polymer production) of Example 6, 47 mg (160 μmol) of bis(cyclopentadienyl)zirconium dichloride was used in place of propane-1,3-diylbis(cyclopentadienyl)zirconium dichloride, and a catalyst slurry of 100 g/liter was obtained.

(Production of Ethylene Polymer)

1,200 ml of hexane and 1.0 ml of a hexane solution (0.714M) of triisobutylaluminum were introduced into a 2 liters autoclave, and the inner temperature of the autoclave was elevated to 85° C. 0.15 ml of the catalyst slurry obtained above was added to the autoclave, and ethylene was introduced until partial pressure reaches 1.2 MPa, thereby initiating polymerization. During the polymerization, an ethylene/hydrogen mixed gas (containing 800 ppm of hydrogen) was continuously introduced such that the partial pressure of 1.2 MPa is maintained. The polymerization temperature was controlled to 85° C. After 90 minutes from the initiation of polymerization, inner pressure of the autoclave was released, and the contents were suction filtered. After drying, 185 g of an ethylene polymer was obtained. The ethylene polymer obtained had bulk density of 275 kg/m$^3$, density of 961 kg/m$^3$, Mw of 92,000, and Mw/Mn of 7.60. Further, MFR was 2.2 g/10 min, and MS$_{160}$ was 46 mN. As a result of measurement of elongation viscosity, λ was 2.1.

Comparative Example 8

Preparation of Catalyst for Ethylene Polymer Production

A catalyst was prepared in the same manner as in Example 6, except that in (Preparation of catalyst for ethylene polymer production) of Example 2, 63 mg (160 μmol) of bis(indenyl) zirconium dichloride was used in place of propane-1,3-diylbis(cyclopentadienyl)zirconium dichloride, and a catalyst slurry of 100 g/liter was obtained.

(Production of Ethylene Polymer)

1,200 ml of hexane and 1.0 ml of a hexane solution (0.714M) of triisobutylaluminum were introduced into a 2 liters autoclave, and the inner temperature of the autoclave was elevated to 85° C. 0.15 ml of the catalyst slurry obtained above was added to the autoclave, and ethylene was introduced until partial pressure reaches 1.2 MPa, thereby initiating polymerization. During the polymerization, an ethylene/hydrogen mixed gas (containing 1,200 ppm of hydrogen) was continuously introduced such that the partial pressure of 1.2 MPa is maintained. The polymerization temperature was controlled to 85° C. After 90 minutes from the initiation of polymerization, inner pressure of the autoclave was released, and the contents were suction filtered. After drying, 207 g of an ethylene polymer was obtained. The ethylene polymer obtained had bulk density of 290 kg/m$^3$, density of 960 kg/m$^3$, Mw of 112,000, and Mw/Mn of 9.91. Further, MFR was 0.95 g/10 min, and MS$_{160}$ was 92 mN. As a result of measurement of elongation viscosity, λ was 2.0.

Example 7

Preparation of Component (c)

60 ml of ethanol and 2.0 ml of 37% concentrated hydrochloric acid were added to 60 ml of water. 6.6 g (0.022 mol) of N,N-dimethyl-octadecylamine was added to the solution obtained, and the resulting mixture was heated to 60° C. to prepare a hydrochloride solution. 20 g of montmorillonite was added to the solution. The resulting suspension was stirred at 60° C. for 3 hours. The supernatant liquid was removed, followed by washing with 1 liter of water of 60° C. The material was dried at 60° C. under 10$^{-3}$ ton for 24 hours, and the resulting solid was pulverized with a jet mill to obtain modified montmorillonite having an average particle size of 5.8 μm (component (c)). As a result of elemental analysis, ion amount per 1 g of the modified montmorillonite was 0.85 mmol.

(Preparation of Catalyst for Ethylene Polymer Production)

58 mg (160 μmol) of (1,1-dimethyl-1-silaethane-1,2-diyl-biscyclopentadienyl) zirconium dichloride (component (a)) was suspended in 17.6 ml of hexane, and 22.4 ml of a hexane solution (0.714M) of triisobutylaluminum (component (d)) was added thereto to obtain a contact product of the component (a) and the component (d). 4.0 g of the modified montmorillonite (component (c)) obtained above was added to the contact product, and the resulting mixture was stirred at 60° C. for 3 hours. The mixture was allowed to stand to remove supernatant liquid, and washed with a hexane solution (0.03M) of triisobutylaluminum. A hexane solution (0.15M) of triisobutylaluminum was further added to prepare a catalyst slurry (100 g/liter).

A solution comprising 2.8 mg (4.9 μmol) of 3.1 mol % of diphenylmethylene(1-cyclopentadienyl)(9-fluorenyl)zirconium dichloride (component (b)) to (1,1-dimethyl-1-silaethane-1,2-diyl-biscyclopentadienyl)zirconium dichloride, 7.2 ml of hexane and 1.2 ml of a hexane solution (0.714M) of triisobutylaluminum was added to the catalyst slurry prepared above, and the resulting mixture was stirred at room temperature for 6 hours. The mixture was allowed to stand to remove supernatant liquid, followed by washing with a hexane solution (0.03M) of triisobutylaluminum. A hexane solution (0.15M) of triisobutylaluminum was further added to finally obtain a catalyst slurry of 100 g/liter.

(Production of Ethylene Polymer)

1,200 ml of hexane and 1.0 ml of a hexane solution (0.714M) of triisobutylaluminum were introduced into a 2 liters autoclave, and the inner temperature of the autoclave was elevated to 85° C. 0.50 ml of the catalyst slurry obtained above was added to the autoclave, and ethylene was introduced until partial pressure reaches 1.2 MPa, thereby initiating polymerization. During the polymerization, an ethylene/hydrogen mixed gas (containing 1,000 ppm of hydrogen) was continuously introduced such that the partial pressure of 1.2 MPa is maintained. The polymerization temperature was controlled to 85° C. After 90 minutes from the initiation of polymerization, inner pressure of the autoclave was released, and the contents were suction filtered. After drying, 165 g of an ethylene polymer was obtained. The ethylene polymer obtained had bulk density of 265 kg/m$^3$, density of 957 kg/m$^3$, Mw of 82,000, and Mw/Mn of 4.23. Further, MFR was 5.2 g/10 min, and MS$_{160}$ was 62 mN. As a result of measurement of elongation viscosity, λ was 5.5. Nominal tensile strain at break was 320%.

Example 8

Preparation of Contact Product of Component (o) and Component (j)

53 g of silica (Davison 948, calcined at 200° C. under reduced pressure for 5 hours), 1 liter of toluene and 20 g (91 mmol) of (p-N,N-dimethylaminophenyl)trimethoxysilane were added to a 3 liters flask, and the resulting mixture was stirred at 110° C. for 16 hours. After completion of the reaction, the mixture was washed with toluene four times. A silane compound-modified silica (component (o)) obtained had a carbon content of 4.2 wt %. 18.7 g of the silane compound-modified silica was suspended in 500 ml of ether, and hydrogen chloride gas was blown at room temperature for 30 minutes. The suspension was washed with hexane, and dried under reduced pressure. The material thus obtained was suspended in 600 ml of methylene chloride, and a methylene chloride solution (400 ml) of 6.0 g (8.7 mmol) of lithium tetrakis(pentafluorophenyl)borate (component (j)) was added, followed by stirring at room temperature for 3 hours. The mixture was washed with methylene chloride three times, and vacuum dried to obtain a solid catalyst. Carbon content in the solid catalyst component obtained was 10.8 wt %.

(Preparation of Catalyst for Ethylene Polymer Production)

1.0 g of the contact product of the component (o) and the component (j) prepared above was dispersed in 100 ml of hexane, and 1.4 ml of a hexane solution (0.714M) of triisobutylaluminum, 18.1 mg (50 μmol) of (1,1-dimethyl-1-silaethane-1,2-diylbiscyclopentadienyl)zirconium dichloride (component (a)), and 2.1 mg (3.8 μmol) of 7.5 mol % of dipehylmethylene(1-cyclopentadienyl)(9-fluorenyl)zirconium dichloride (component (b)) to 1,1-dimethyl-1-silaethane-1,2-diyl-biscyclopentadienyl)zirconium dichloride were added. The resulting mixture was stirred at room temperature for 1 hour to prepare a catalyst slurry.

(Production of Ethylene Polymer)

1,200 ml of hexane and 1.0 ml of a hexane solution (0.714M) of triisobutylaluminum were introduced into a 2 liters autoclave, and the inner temperature of the autoclave was elevated to 85° C. 100 mg in terms of a solid component of the catalyst slurry obtained above was added to the autoclave, and ethylene was introduced until partial pressure reaches 1.2 MPa. During the polymerization, an ethylene/hydrogen mixed gas (containing 850 ppm of hydrogen) was continuously introduced such that the partial pressure of 1.2 MPa is maintained. The polymerization temperature was controlled to 85° C. After 90 minutes from the initiation of polymerization, inner pressure of the autoclave was released, and the contents were suction filtered. After drying, 96 g of a polymer was obtained. The ethylene polymer obtained had bulk density of 232 kg/m$^3$, density of 957 kg/m$^3$, Mw of 90,000, and Mw/Mn of 4.25. Further, MFR was 1.9 g/10 min, and MS$_{160}$ was 128 mN. As a result of measurement of elongation viscosity, λ was 4.5. Nominal tensile strain at break was 690% or more.

Example 9

Preparation of Contact Product of Component (o) and Component (g)

30 g of silica (Davison 948, calcined at 200° C. under reduced pressure for 5 hours), 1 liter of toluene and 250 ml (0.60 mol) of a toluene solution of methyl aminoxane (trade name: PMAO; Al: 2.39M) were added to a 3 liters flask, and the resulting mixture was stirred at 80° C. for 3 hours. After completion of the reaction, the mixture was washed with toluene four times. An aluminooxane-modified silica (component (o)) obtained had an aluminum content of 6.5 wt %.

(Preparation of Catalyst for Ethylene Polymer Production)

1.0 g of the contact product of the component (o) and the component (g) prepared above was dispersed in 100 ml of hexane, and 1.4 ml of a hexane solution (0.714M) of triisobutylaluminum, 14.5 mg (40 μmol) of (1,1-dimethyl-1-silaethane-1,2-diyl-biscyclopentadienyl)zirconium dichloride (component (a)), and 2.2 mg (4.0 μmol) of 9.9 mol % of dipehylmethylene(1-cyclopentadienyl)(9-fluorenyl)zirconium dichloride (component (b)) to 1,1-dimethyl-1-silaethane-1,2-diylbiscyclopentadienyl)zirconium dichloride were added. The resulting mixture was stirred at room temperature for 2 hour to prepare a catalyst slurry.

(Production of Ethylene Polymer)

1,200 ml of hexane and 1.0 ml of a hexane solution (0.714M) of triisobutylaluminum were introduced into a 2 liters autoclave, and the inner temperature of the autoclave was elevated to 85° C. 100 mg in terms of a solid component of the catalyst slurry obtained above was added to the autoclave, and ethylene was introduced until partial pressure reaches 1.2 MPa. During the polymerization, an ethylene/hydrogen mixed gas (containing 1,200 ppm of hydrogen) was continuously introduced such that the partial pressure of 1.2 MPa is maintained. The polymerization temperature was controlled to 85° C. After 90 minutes from the initiation of polymerization, inner pressure of the autoclave was released, and the contents were suction filtered. After drying, 74 g of a polymer was obtained. The ethylene polymer obtained had bulk density of 228 kg/m$^3$, density of 956 kg/m$^3$, Mw of 105,000, and Mw/Mn of 6.75. Further, MFR was 1.1 g/10 min, and MS$_{160}$ was 131 mN. As a result of measurement of elongation viscosity, λ was 4.8. Nominal tensile strain at break was 690% or more.

Example 10

Preparation of Catalyst for Ethylene Copolymer Production 58 mg (160 µmol) of 1,1-dimethyl-1-silaethane-1,2-diyl-bis(cyclopentadienyl) zirconium dichloride (component (a)) was suspended in 17.6 ml of hexane, and 22.4 ml of a hexane solution (0.714M) of triisobutylaluminum (component (d)) was added thereto to obtain a contact product of the component (a) and the component (d). 4.0 g of the modified hectorite (component (c)) prepared in (Preparation of component (c)) of Example 5 was added to the contact product, and the resulting mixture was stirred at 60° C. for 3 hours. The mixture was allowed to stand to remove supernatant liquid, and washed with a hexane solution (0.03M) of triisobutylaluminum. A hexane solution (0.15M) of triisobutylaluminum was further added to prepare a catalyst slurry (100 g/liter).

A solution comprising 2.2 mg (3.3 µmol) of 2.0 mol % of diphenylmethylene(1-cyclopentadienyl)(2,7-di-tert-butyl-9-fluorenyl)zirconium dichloride (component (b)) to 1,1-dimethyl-1-silaethane-1,2-diylbis(cyclopentadienyl)zirconium dichloride, 7.2 ml of hexane and 0.34 ml of a hexane solution (0.714M) of triisobutylaluminum was added to the catalyst slurry prepared above, and the resulting mixture was stirred at room temperature for 6 hours. The mixture was allowed to stand to remove supernatant liquid, followed by washing with a hexane solution (0.03M) of triisobutylaluminum. A hexane solution (0.15M) of triisobutylaluminum was further added to finally obtain a catalyst slurry of 100 g/liter.

(Production of Ethylene Copolymer)

1,200 ml of hexane, 36 g of 1-butene and 1.0 ml of a hexane solution (0.714M) of triisobutylaluminum were introduced into a 2 liters autoclave, and the inner temperature of the autoclave was elevated to 75° C. 0.25 ml of the catalyst slurry obtained above was added to the autoclave, and ethylene was introduced until partial pressure reaches 1.2 MPa, thereby initiating polymerization. During the polymerization, an ethylene/hydrogen mixed gas (containing 300 ppm of hydrogen) was continuously introduced such that the partial pressure of 1.2 MPa is maintained. The polymerization temperature was controlled to 75° C. After 35 minutes from the initiation of polymerization, inner pressure of the autoclave was released, and the contents were suction filtered. After drying, 58 g of a polymer was obtained. The ethylene polymer obtained had density of 924 kg/m$^3$, Mw of 93,000, and Mw/Mn of 4.68. Further, MFR was 1.8 g/10 min, and MS$_{160}$ was 138 mN. As a result of measurement of elongation viscosity, λ was 4.7. When a double bond was measured with FT-IR, the terminal vinyl was 0.08 per 1,000 carbon atoms.

Example 11

Preparation of Catalyst for Ethylene Copolymer Production 53 mg (160 µmol) of propane-1,3-diylbis(cyclopentadienyl)zirconium dichloride (component (a)) was suspended in 17.6 ml of hexane, and 22.4 ml of a hexane solution (0.714M) of triisobutylaluminum (component (d)) was added thereto to obtain a contact product of the component (a) and the component (d). 4.0 g of the modified hectorite (component (c)) prepared in (Preparation of component (c)) of Example 6 was added to the contact product, and the resulting mixture was stirred at 60° C. for 3 hours. The mixture was allowed to stand to remove supernatant liquid, and washed with a hexane solution (0.03M) of triisobutylaluminum. A hexane solution (0.15M) of triisobutylaluminum was further added to prepare a catalyst slurry (100 g/liter).

A solution comprising 3.3 mg (4.9 µmol) of 3.1 mol % of diphenylmethylene(1-cyclopentadienyl)(2,7-di-tert-butyl-9-fluorenyl)zirconium dichloride (component (b)) to propane-1,3-diylbis(cyclopentadienyl)zirconium dichloride, 7.2 ml of hexane and 0.34 ml of a hexane solution (0.714M) of triisobutylaluminum was added to the catalyst slurry prepared above, and the resulting mixture was stirred at room temperature for 6 hours. The mixture was allowed to stand to remove supernatant liquid, followed by washing with a hexane solution (0.03M) of triisobutylaluminum. A hexane solution (0.15M) of triisobutylaluminum was further added to finally obtain a catalyst slurry of 100 g/liter.

(Production of Ethylene Copolymer)

1,200 ml of hexane, 36 g of 1-butene and 1.0 ml of a hexane solution (0.714M) of triisobutylaluminum were introduced into a 2 liters autoclave, and the inner temperature of the autoclave was elevated to 75° C. 0.25 ml of the catalyst slurry obtained above was added to the autoclave, and ethylene was introduced until partial pressure reaches 1.2 MPa, thereby initiating polymerization. During the polymerization, an ethylene/hydrogen mixed gas (containing 1,100 ppm of hydrogen) was continuously introduced such that the partial pressure of 1.2 MPa is maintained. The polymerization temperature was controlled to 75° C. After 65 minutes from the initiation of polymerization, inner pressure of the autoclave was released, and the contents were suction filtered. After drying, 46 g of a polymer was obtained. The ethylene polymer obtained had density of 929 kg/m$^3$, Mw of 82,000, and Mw/Mn of 4.52. Further, MFR was 6.2 g/10 min, and MS$_{160}$ was 47 mN. As a result of measurement of elongation viscosity, λ was 5.6. When a double bond was measured with FT-IR, the terminal vinyl was 0.06 per 1,000 carbon atoms.

Example 12

Preparation of Catalyst for Ethylene Polymer Production 63 mg (160 µmol) of (1,1,3,3-tetramethyldisiloxane-1,3-diyl-biscyclopentadienyl)zirconium dichloride was suspended in 17.6 ml of hexane, and 22.4 ml of a hexane solution (0.714M) of triisobutylaluminum (component (d)) was added thereto to obtain a contact product of the component (a) and the component (d). 4.0 g of the modified hectorite (component (c)) synthesized in Example 6 was added to the contact product, and the resulting mixture was stirred at 60° C. for 3 hours. The mixture was allowed to stand to remove supernatant liquid, and washed with a hexane solution (0.03M) of triisobutylaluminum. A hexane solution (0.15M) of triisobutylaluminum was further added to prepare a catalyst slurry (100 g/liter).

A solution comprising 5.2 mg (12 µmol) of 7.5 mol % of isopropylidene(1-cyclopentadienyl)(9-fluorenyl)zirconium dichloride (component (b)) to (1,1,3,3-tetramethyldisiloxane-1,3-diyl-biscyclopentadienyl)zirconium dichloride, 7.2 ml of hexane and 1.2 ml of a hexane solution (0.714M) of triisobutylaluminum was added to the catalyst slurry prepared above, and the resulting mixture was stirred at room temperature for 6 hours. The mixture was allowed to stand to remove supernatant liquid, followed by washing with a hexane solution (0.03M) of triisobutylaluminum. A hexane solution (0.15M) of triisobutylaluminum was further added to finally obtain a catalyst slurry of 100 g/liter.

(Production of Ethylene Polymer)

1,200 ml of hexane and 1.0 ml of a hexane solution (0.714M) of triisobutylaluminum were introduced into a 2 liters autoclave, and the inner temperature of the autoclave was elevated to 85° C. 0.1 ml of the catalyst slurry obtained above was added to the autoclave, and ethylene was introduced until partial pressure reaches 1.2 MPa, thereby initiating polymerization. During the polymerization, an ethylene/hydrogen mixed gas (containing 600 ppm of hydrogen) was continuously introduced such that the partial pressure of 1.2 MPa is maintained. The polymerization temperature was controlled to 85° C. After 90 minutes from the initiation of polymerization, inner pressure of the autoclave was released, and the contents were suction filtered. After drying, 100 g of an ethylene polymer was obtained. The ethylene polymer obtained had bulk density of 316 kg/m$^3$, density of 957 kg/m$^3$, Mw of 175,000, and Mw/Mn of 3.30. Further, MFR was 0.17 g/10 min, and MS$_{160}$ was 290 mN. As a result of measurement of elongation viscosity, λ was 5.9. Nominal tensile strain at break was 690% or more.

Example 13

Preparation of Catalyst Component (I) for Ethylene Polymer Production 63 mg (160 μmol) of (1,1,3,3-tetramethyldisiloxane-1,3-diyl-biscyclopentadienyl)zirconium dichloride was suspended in 17.6 ml of hexane, and 22.4 ml of a hexane solution (0.714M) of triisobutylaluminum (component (d)) was added thereto to obtain a contact product of the component (a) and the component (d). 4.0 g of the modified hectorite (component (c)) synthesized in Example 6 was added to the contact product, and the resulting mixture was stirred at 60° C. for 3 hours. The mixture was allowed to stand to remove supernatant liquid, and washed with a hexane solution (0.03M) of triisobutylaluminum. A hexane solution (0.15M) of triisobutylaluminum was further added to prepare a catalyst slurry (100 g/liter).

(Preparation of Catalyst Component (II) for Ethylene Polymer Production)

15.4 mg (23 μmol) of diphenylmethylene(1-cyclopentadienyl)(2,7-di-tert-butyl-9-fluorenyl)zirconium dichloride (component (b)) was suspended in 111 ml of hexane, and 4.5 ml of a hexane solution (0.714M) of triisobutylaluminum (component (d)) was added thereto to obtain a hexane solution (concentration of component (b): 0.2 mmol/liter) of a contact product of the component (b) and the component (d).

(Production of Ethylene Polymer)

1,200 ml of hexane and 1.0 ml of a hexane solution (0.714M) of triisobutylaluminum were introduced into a 2 liters autoclave, and the inner temperature of the autoclave was elevated to 85° C. 0.1 ml of the catalyst component (I) obtained above was added to the autoclave, and ethylene was introduced until partial pressure reaches 1.2 MPa, thereby initiating polymerization. During the polymerization, an ethylene/hydrogen mixed gas (containing 2,850 ppm of hydrogen) was continuously introduced such that the partial pressure of 1.2 MPa is maintained. The polymerization temperature was controlled to 85° C. After 90 minutes from the initiation of polymerization, the autoclave was cooled to 55° C., and the inside thereof was substituted with nitrogen five times. The autoclave was elevated to 90° C. 6 ml of the catalyst component (II) obtained above was added to the autoclave, and ethylene was introduced therein until partial pressure reaches 0.3 MPa, thereby initiating polymerization. During the polymerization, an ethylene/hydrogen mixed gas (containing 5,200 ppm of hydrogen) was continuously introduced such that the partial pressure of 1.2 MPa is maintained. After 105 minutes from the initiation of polymerization, inner pressure of the autoclave was released, and the contents were suction filtered. After drying, 122 g of an ethylene polymer was obtained. The ethylene polymer obtained had bulk density of 267 kg/m$^3$, density of 960 kg/m$^3$, Mw of 78,000, and Mw/Mn of 3.71. Further, MFR was 4.1 g/10 min, and MS$_{160}$ was 51 mN. As a result of measurement of elongation viscosity, λ was 6.2. Nominal tensile strain at break was 690% or more.

Example 14

Production of Ethylene Polymer 1,200 ml of hexane and 1.0 ml of a hexane solution (0.714M) of triisobutylaluminum were introduced into a 2 liters autoclave, and the inner temperature of the autoclave was elevated to 85° C. 0.1 ml of the catalyst component (I) prepared in (Preparation of catalyst component (I) for ethylene polymer production) of Example 13 was added to the autoclave, and ethylene was introduced until partial pressure reaches 1.2 MPa, thereby initiating polymerization. During the polymerization, an ethylene/hydrogen mixed gas (containing 700 ppm of hydrogen) was continuously introduced such that the partial pressure of 1.2 MPa is maintained. The polymerization temperature was controlled to 85° C. After 90 minutes from the initiation of polymerization, the autoclave was cooled to 55° C., and the inside thereof was substituted with nitrogen five times. At this time, 10 g of a polymer was collected, and its molecular weight was measured. As a result, Mw was 136,000 and Mw/Mn was 2.98. Furthermore, when a double bond was measured with FT-IR, the terminal vinyl was 0.04 per 1,000 carbon atoms. Thereafter, the autoclave was elevated to 90° C. 6 ml of the catalyst component (II) prepared in (Preparation of catalyst component (II) for ethylene polymer production) of Example 13 was added to the autoclave, and ethylene was introduced therein until partial pressure reaches 0.3 MPa, thereby initiating polymerization. During the polymerization, an ethylene/hydrogen mixed gas (containing 12,000 ppm of hydrogen) was continuously introduced such that the partial pressure of 1.2 MPa is maintained. After 105 minutes from the initiation of polymerization, inner pressure of the autoclave was released, and the contents were suction filtered. After drying, 128 g of an ethylene polymer was obtained. The ethylene polymer obtained had bulk density of 313 kg/m$^3$, density of 958 kg/m$^3$, Mw of 173,000, and Mw/Mn of 3.49. Further, MFR was 0.17 g/10 min, and MS$_{160}$ was 690 mN. As a result of measurement of elongation viscosity, λ was 6.6. Nominal tensile strain at break was 690% or more.

The results obtained in the above Examples and Comparative Examples are shown in Table 2.

TABLE 2

|  | Yield g | Bulk density kg/m³ | Density (ρ) kg/m³ | Mw ×10⁴ | Qw | MI g/10 min | MS₁₆₀ mN | Non-linear parameter of elongation viscosity (λ) | Nominal tensile strain at break % |
|---|---|---|---|---|---|---|---|---|---|
| Example 5 | 216 | 310 | 960 | 10.8 | 6.70 | 1.0 | 170 | 4.8 | >690 |
| Example 6 | 155 | 325 | 958 | 8.75 | 4.27 | 3.4 | 90 | 5.1 | 400 |
| Example 7 | 165 | 265 | 957 | 8.20 | 4.23 | 5.2 | 62 | 5.5 | 320 |
| Example 8 | 96 | 232 | 957 | 9.00 | 4.25 | 1.9 | 128 | 4.5 | >690 |
| Example 9 | 74 | 228 | 956 | 10.5 | 6.75 | 1.1 | 131 | 4.8 | >690 |
| Example 10 | 58 |  | 924 | 9.30 | 4.68 | 1.8 | 138 | 4.7 |  |
| Example 11 | 46 |  | 929 | 8.20 | 4.52 | 6.2 | 47 | 5.6 |  |
| Example 12 | 100 | 316 | 957 | 17.5 | 3.30 | 0.17 | 290 | 5.9 | >690 |
| Example 13 | 122 | 267 | 960 | 7.8 | 3.71 | 4.1 | 51 | 6.2 | 340 |
| Example 14 | 138 | 313 | 958 | 17.3 | 3.49 | 0.17 | 690 | 6.6 | >690 |
| Comparative Example 5 | 100 | 282 | 952 | 7.34 | 2.97 | 5.2 | 11 | 2.2 |  |
| Comparative Example 6 | 155 | 225 | 954 | 11.2 | 3.18 | 0.88 | 92 | 2.1 |  |
| Comparative Example 7 | 185 | 275 | 961 | 9.20 | 7.60 | 2.2 | 46 | 2.1 |  |
| Comparative Example 8 | 207 | 290 | 960 | 11.2 | 9.91 | 0.95 | 92 | 2 |  |

While the invention has been described in detail and with reference to specific embodiments thereof, it will be apparent to one skilled in the art that various changes and modifications can be made therein without departing the spirit and scope thereof.

This application is based on Japanese patent application filed Dec. 19, 2005 (Patent Application No. 2005-365428) and Japanese patent application filed Dec. 19, 2005 (Patent Application No. 2005-365430), the entire contents being hereby incorporated by reference.

INDUSTRIAL APPLICABILITY

An ethylene polymer having excellent thermal stability and excellent molding processability in a wide molding processing temperature range is obtained by the present invention. Furthermore, an ethylene polymer having excellent mechanical strength and excellent molding processability in a wide molding processing temperature range can be produced by using the catalyst for ethylene polymer production and the production method of the invention. The industrial value of the invention is remarkable.

The invention claimed is:

1. An ethylene polymer comprising a repeating unit derived from ethylene, or a repeating unit derived from ethylene and a repeating unit derived from a $C_{3-8}$ α-olefin, the ethylene polymer being satisfied with the following (A) to (F);

(A) Density (d (kg/m³)) is from 910 to 970, (B) melt flow rate (MFR (g/10 min)) measured at 190° C. under a load of 2.16 kg is from 0.01 to 50, (C) terminal vinyl number is 0.2 or less per 1,000 carbon atoms, (D) melt strength ($MS_{160}$ (mN)) measured at 160° C. and MFR are satisfied with the following formula (1):

$$MS_{160} > 90 - 130 \times \log(MFR) \tag{1}$$

(E) melt strength ($MS_{190}$ (mN)) measured at 190° C. and $MS_{160}$ are satisfied with the following formula (2):

$$MS_{160}/MS_{190} < 1.8 \tag{2}$$

(F) fluidized activation energy ($E_a$ (kJ/mol)) and d are satisfied with the following formula (3):

$$127 - 0.107d < E_a < 88 - 0.060d \tag{3}$$

2. The ethylene polymer as claimed in claim 1, wherein (G) the ratio (Mw/Mn) of a weight average molecular weight (Mw) and a number average molecular weight (Mn) is from 2 to 6.

3. The ethylene polymer as claimed in claim 1, wherein (A) d is from 910 to 940.

* * * * *